(12) United States Patent
Horimoto et al.

(10) Patent No.: US 11,592,515 B2
(45) Date of Patent: Feb. 28, 2023

(54) CONTROL DEVICE

(71) Applicant: Mitsubishi Electric Corporation, Chiyoda-ku (JP)

(72) Inventors: Masanobu Horimoto, Chiyoda-ku (JP); Fumiyoshi Murase, Chiyoda-ku (JP); Makoto Yamaguchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 223 days.

(21) Appl. No.: 16/639,213

(22) PCT Filed: Aug. 22, 2018

(86) PCT No.: PCT/JP2018/031017
§ 371 (c)(1),
(2) Date: Feb. 14, 2020

(87) PCT Pub. No.: WO2019/039514
PCT Pub. Date: Feb. 28, 2019

(65) Prior Publication Data
US 2020/0200853 A1 Jun. 25, 2020

(30) Foreign Application Priority Data
Aug. 23, 2017 (JP) .............................. JP2017-160264

(51) Int. Cl.
*G01S 5/02* (2010.01)
*G01S 3/48* (2006.01)
(Continued)

(52) U.S. Cl.
CPC ................. *G01S 3/48* (2013.01); *H01Q 3/08* (2013.01); *G01S 3/06* (2013.01); *G01S 3/38* (2013.01); *G01S 3/72* (2013.01); *H01Q 25/02* (2013.01)

(58) Field of Classification Search
CPC ..... G01S 3/48; G01S 3/08; G01S 3/38; G01S 3/02; G01S 3/06; G01S 3/72; G01S 19/13; H01Q 25/02
(Continued)

(56) References Cited

U.S. PATENT DOCUMENTS

| 5,043,737 A | 8/1991 | Dell-Imagine |
| 6,061,022 A * | 5/2000 | Menegozzi ............... G01S 3/48 |
| | | 342/442 |

(Continued)

FOREIGN PATENT DOCUMENTS

| JP | 58-216970 A | 12/1983 |
| JP | 7-234276 A | 9/1995 |

(Continued)

OTHER PUBLICATIONS

Partial Supplementary European Search Report dated Jul. 10, 2020 in corresponding European Patent Application 18847572.7, citing documents AA and AX therein, 18 pages.

(Continued)

*Primary Examiner* — Chuong P Nguyen
(74) *Attorney, Agent, or Firm* — Oblon, McClelland, Maier & Neustadt, L.L.P.

(57) ABSTRACT

The present disclosure obtains a correction value that corrects measurement angle error signals more accurately than conventional methods even in a case where a radio wave signal-to-noise ratio is low, and thus tracks a communication counterpart more accurately than the conventional methods. The present disclosure includes a program controller 28 that generates a command value of an orientation direction of an antenna 1 and outputs the generated command value to an antenna drive controller 27, the command value being changed in accordance with a predetermined change scenario 54; a correction value calculator 32 that calculates a (Continued)

phase correction value γ, based on at least three pieces of error measurement data 55 including (i) an arrival direction error obtained from a sum signal and a difference signal of reception signals, the arrival direction error representing a difference between the orientation direction and an arrival direction being a direction from which the radio waves come and arrive and (ii) an orientation direction actual measurement value being an actual measurement value of the orientation direction when the arrival direction error is obtained, the phase correction value γ being an angle by which the arrival direction error is rotated; and a tracking controller 33 that outputs, to the antenna drive controller 27, as the command value, a value obtained by adding the arrival direction error corrected based on the phase correction value γ to the orientation direction actual measurement value.

20 Claims, 42 Drawing Sheets

(51) Int. Cl.
*H01Q 3/08* (2006.01)
*H01Q 25/02* (2006.01)
*G01S 3/72* (2006.01)
*G01S 3/38* (2006.01)
*G01S 3/06* (2006.01)

(58) Field of Classification Search
USPC .......................... 342/424, 350, 357.51, 417
See application file for complete search history.

(56) References Cited

U.S. PATENT DOCUMENTS

| | | | | |
|---|---|---|---|---|
| 9,543,646 | B2* | 1/2017 | Yoshida | G01S 3/42 |
| 9,685,998 | B2* | 6/2017 | Fujii | H04L 25/0202 |
| 10,234,532 | B2* | 3/2019 | Uego | H01Q 1/1257 |
| 11,143,734 | B2* | 10/2021 | Shoji | G01S 3/325 |
| 11,309,956 | B2* | 4/2022 | Park | H04B 7/18513 |
| 2003/0169201 | A1 | 9/2003 | Dybdal et al. | |
| 2013/0229310 | A1* | 9/2013 | Parks | G01S 3/46 342/417 |

FOREIGN PATENT DOCUMENTS

| | | |
|---|---|---|
| JP | 11-38112 A | 2/1999 |
| JP | 2002-250763 A | 9/2002 |
| JP | 2012-172980 A | 9/2012 |
| JP | 6004896 B2 | 10/2016 |
| WO | WO-2016089460 A1 * | 6/2016 ............... H01Q 3/26 |

OTHER PUBLICATIONS

Tao Zhang et al., "Application and Realization of Real-Time One Key Phase-Calibration for TT &C Antenna", Advances in Electrical Engineering & Electrical Machines, LNEE 134, XP009521217, 2011, pp. 73-78.
International Search Report dated Nov. 13, 2018 in PCT/JP2018/031017 filed Aug. 22, 2018, citing documents AO-AR therein, 2 pages.
Japanese Office Action dated Aug. 20, 2019 issued in corresponding JP patent application No. 2019-530236, citing documents AO-AR therein, 4 pages (with English translation).
Extended European Search Report dated Nov. 2, 2020 in Patent Application No. 18847572.7, citing documents AA, AO and AX therein, 24 pages.
Robert Dybdal, "Communication Satellite Antennas: System Architecture, Technology, and Evaluation" Communication Engineering, XP055739214, Jun. 2, 2009, 18 pages.

* cited by examiner

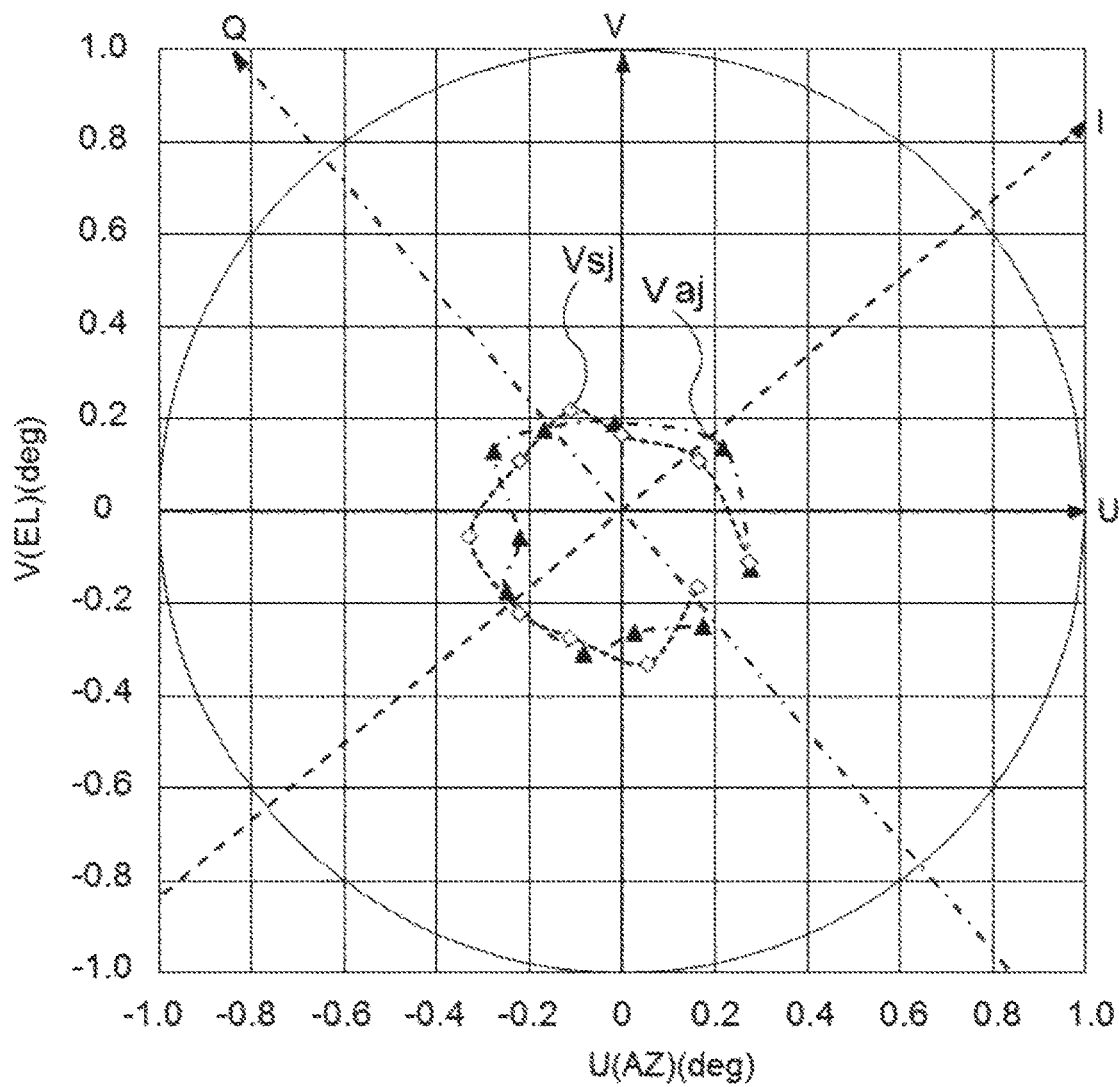

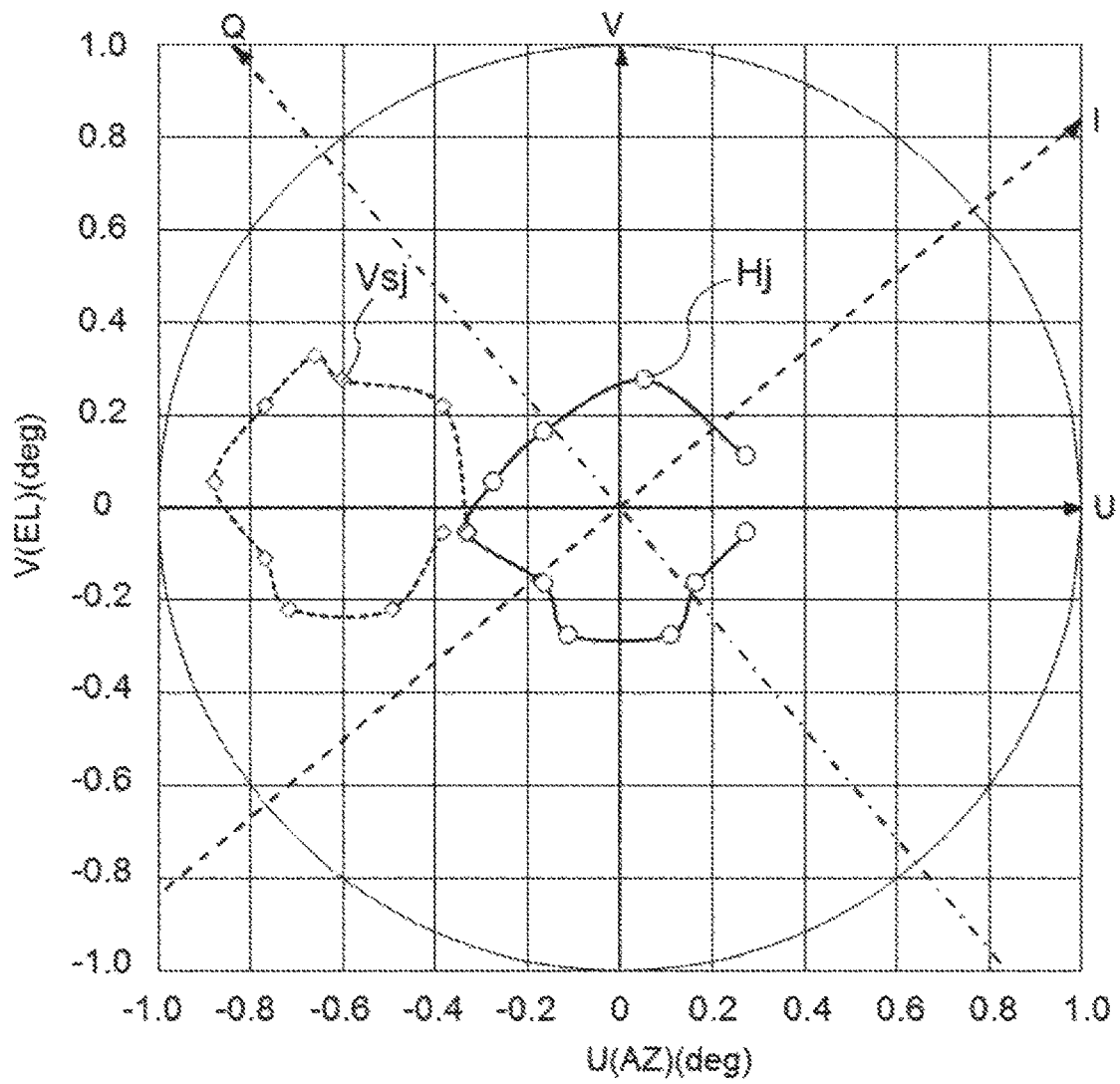

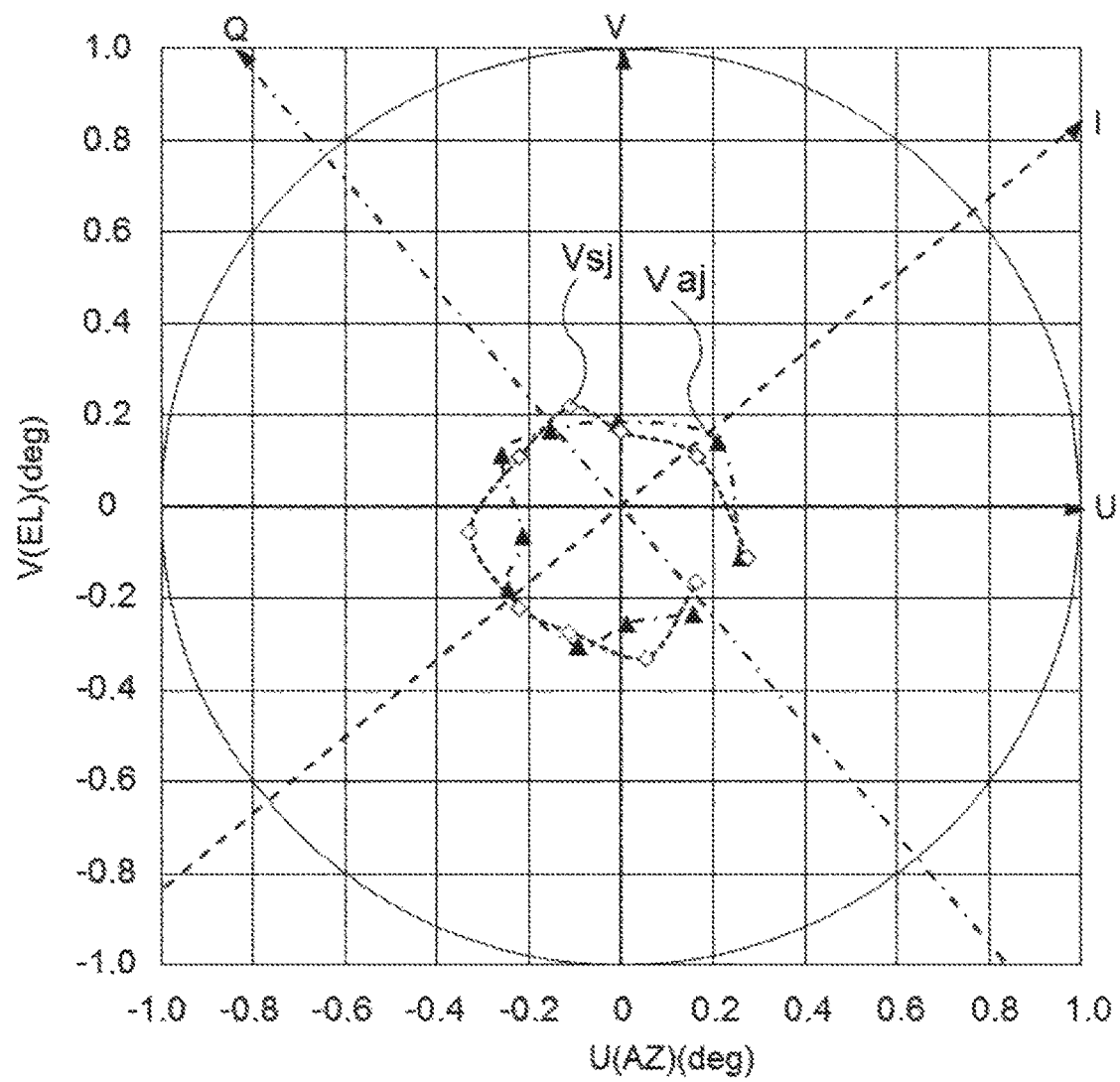

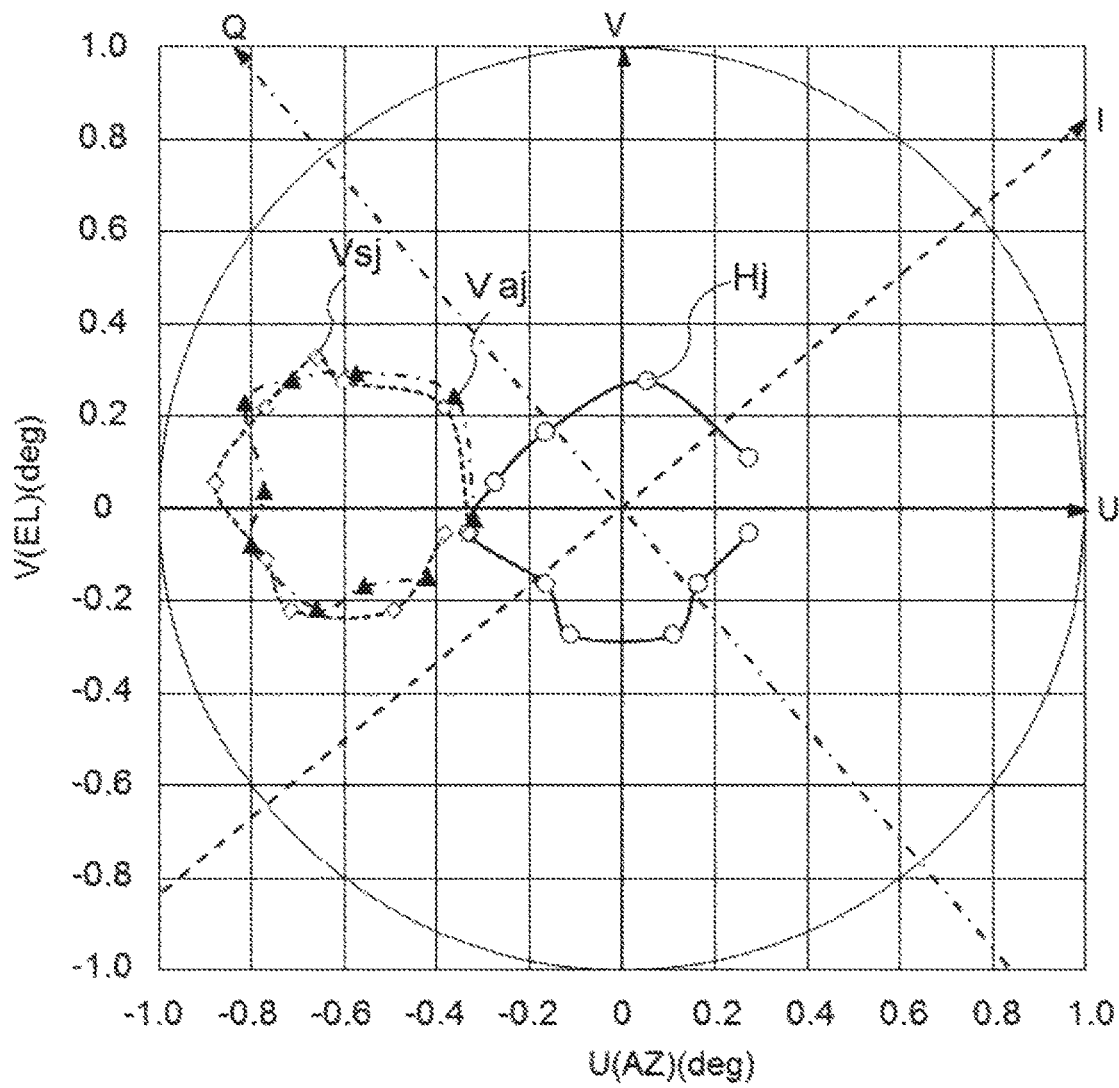

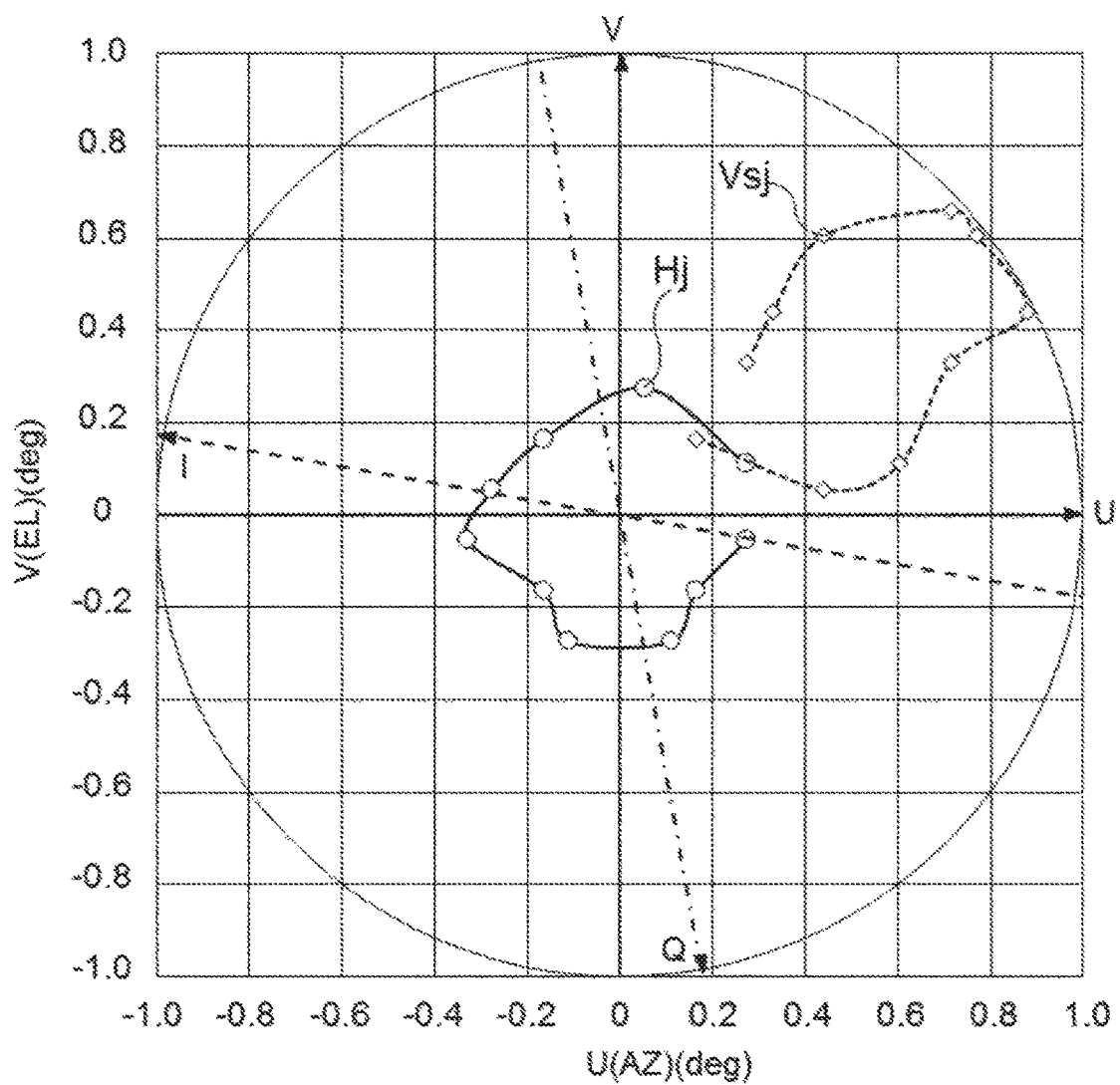

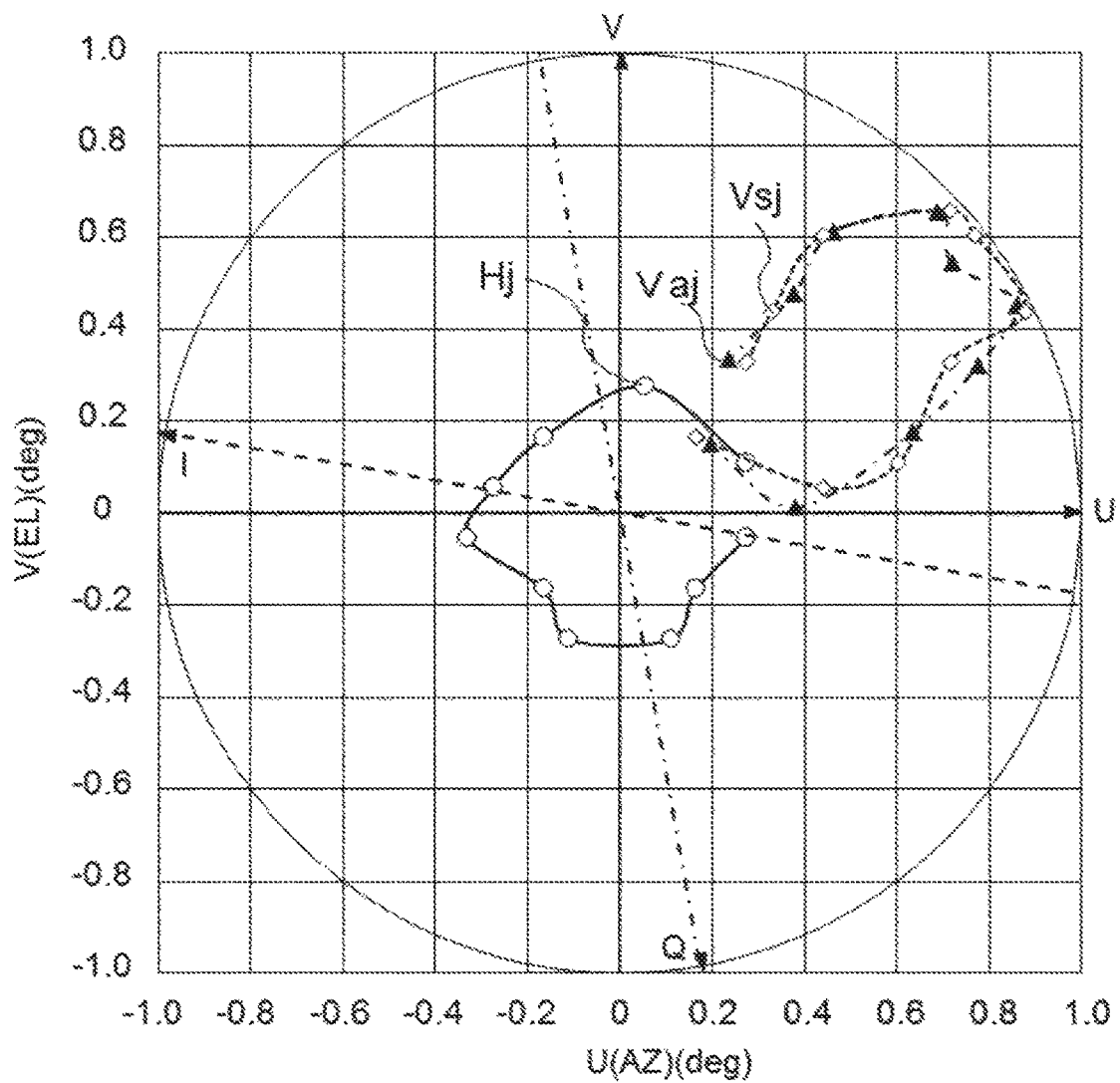

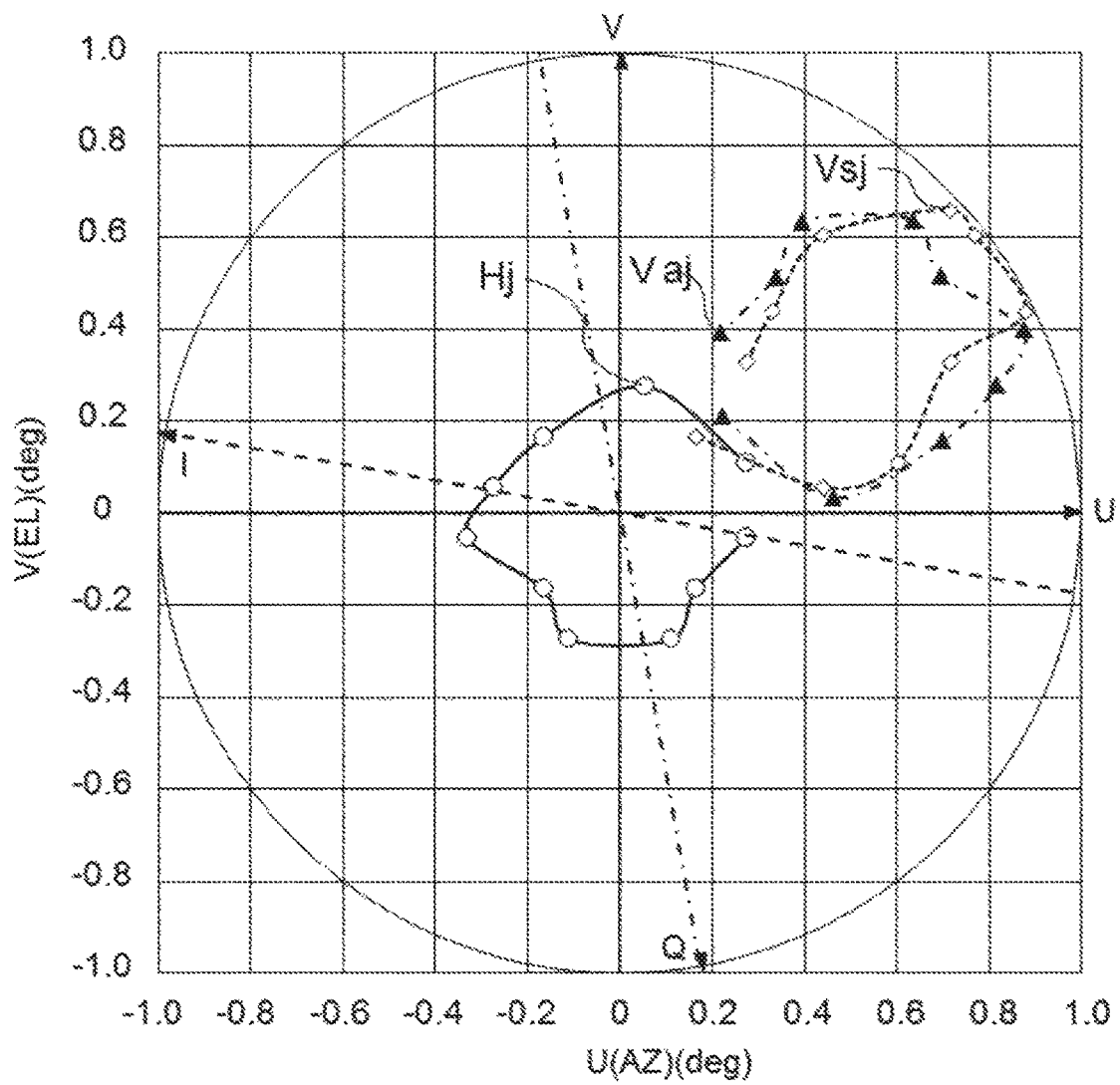

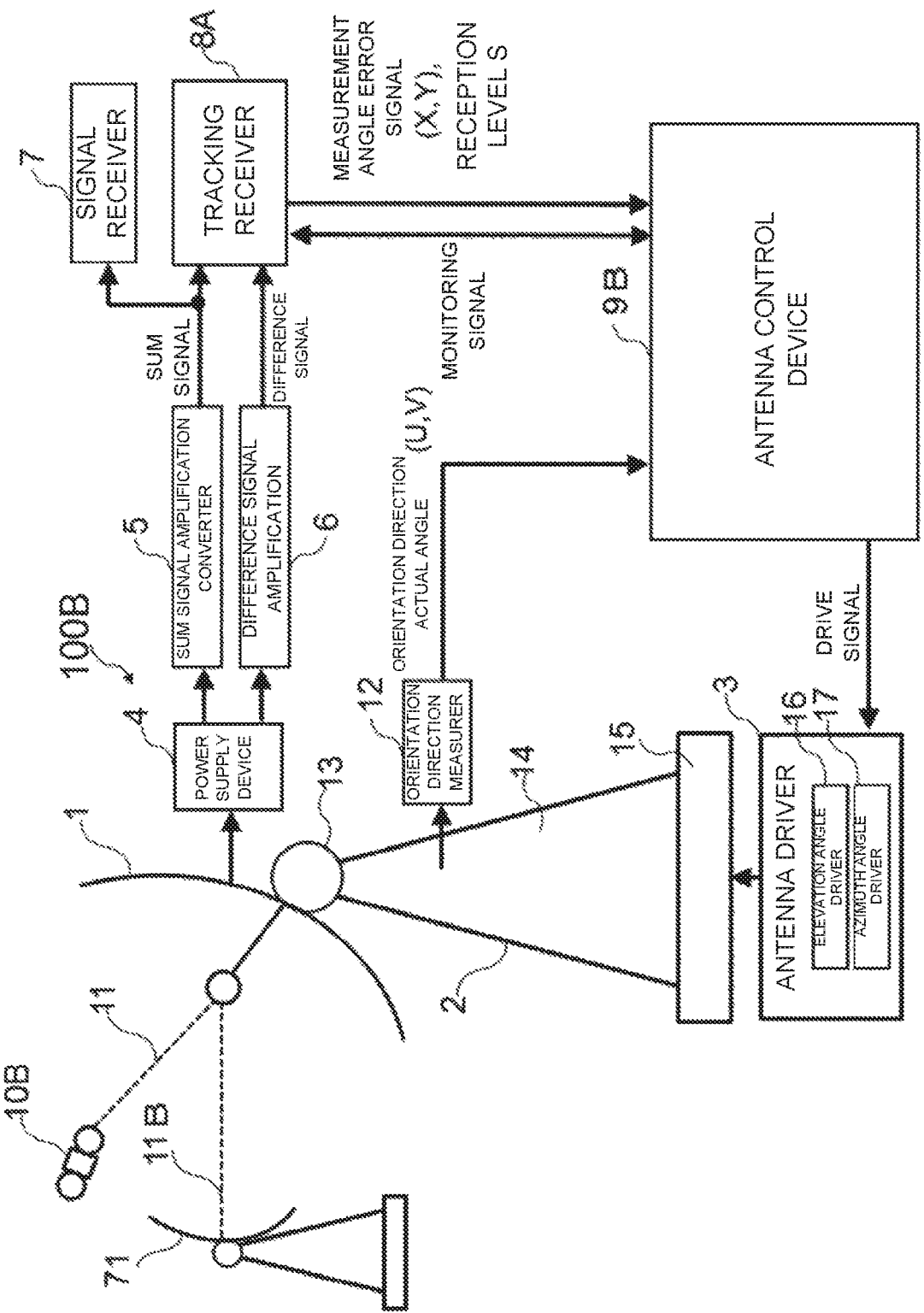

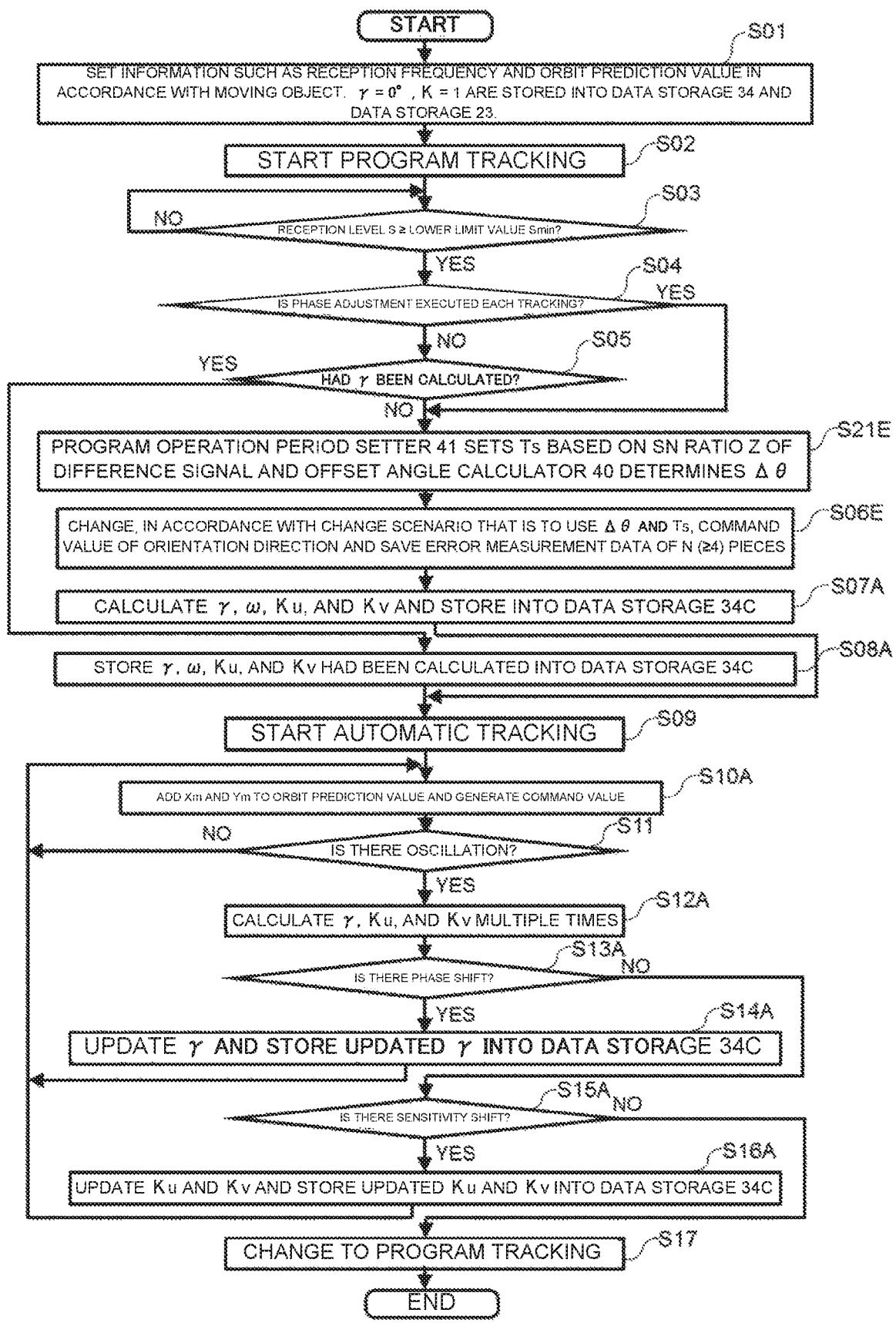

CONTROL DEVICE

TECHNICAL FIELD

The present disclosure relates to a device for controlling an antenna device that is installed on the ground, receives radio waves from a moving object such as an artificial satellite and tracks the moving object.

BACKGROUND ART

There is a control device that performs automatic tracking to orient an antenna toward a moving satellite by obtaining a deviation between a direction from an installation position of the antenna installed at a ground station to the moving satellite which goes around the Earth and a direction in which the main reflector of the antenna is oriented (referred to as the main beam axis), and controlling the main beam axis of the antenna such that this deviation approaches zero (see Patent Literature 1).

The tracking device described in Patent Literature 1 receives, by the antenna, radio waves (signals) transmitted from the moving satellite, and derives, based on the received signals, a sum signal and a difference signal. An auxiliary power supply system provided in a power supply circuit of the antenna derives the sum signal and the difference signal. Examples of a method for deriving the sum signal and the difference signal include a multi-horn scheme, a high-dimensional scheme, and a combination scheme. The sum signal is a signal that is a total of signals received at portions of the antenna and indicates a maximum value when the main beam axis of the antenna aligns with the direction to the moving satellite. The difference signal is a signal that is a difference in signals received at the portions of the antenna and indicates a minimum value when the main beam axis of the antenna aligns with the direction to the moving satellite. The absolute value for the magnitude of the difference signal denotes the magnitude of the deviation of the main beam axis. The phase difference between the sum signal and the difference signal denotes a direction of the deviation of the main beam axis on a celestial sphere.

Here, the sum signal and the difference signal have phases unmatched with each other. One of the reasons for causing this unmatched phase condition is a difference in line lengths between the sum signal and the difference signal in complicated circuits, which processes the sum signal and the difference signal, including a low-noise amplifier and a frequency converter. If the phase difference between the sum signal and the difference signal is not correct, the main beam axis cannot be oriented in a direction from which radio waves come and arrive from the moving satellite, because the main beam axis is controlled using a measurement angle error signal generated based on the phase difference. Therefore, before performing automatic tracking, the phase of the measurement angle error signal is adjusted such that the measurement angle error signal is oriented in the direction indicated by the deviation of the main beam axis on the celestial sphere.

One of the methods for adjusting the phase of the measurement angle error signal is a method for phase adjustment by receiving radio waves emitted by the sun and then tracking the sun (see Patent Literature 2). Another method is, before starting automatic tracking, obtaining two vectors at each of two difference points in time, that is, (i) a first vector representing a difference between a direction of a command value of the main beam axis and an actual direction and (ii) a second vector representing a deviation of the main beam axis obtained based on the sum signal and the difference signal, and adjusting the phase of the measurement angle error signal to make the difference vector between two of the first vectors and the difference vector between two of the second vectors to be the same vector (see Patent Literature 3).

CITATION LIST

Patent Literature

Patent Literature 1: Unexamined Japanese Patent Application Kokai Publication No. H11-38112
Patent Literature 2: Japanese Patent No. 3678154
Patent Literature 3: Japanese Patent No. 6004896

SUMMARY OF INVENTION

Technical Problem

Different frequencies are used for different satellites and phase shift changes depending on the frequency of the radio waves. In the method described in Patent Literature 2, each time a different satellite is tracked, it is necessary tracking the sun to adjust the phase. Also, in a case where the antenna beam half width is small compared to the angular diameter of the sun, output of the measurement angle error signal either drops or stops completely. Consequently, the method for adjusting by tracking the sun cannot be used for the antenna with antenna beams having a narrow half width.

Patent Literature 3 is a literature regarding a method where the phase is adjusted for tracking a satellite, without the use of the sun. The adjustment accuracy of the algorithm described in Patent Literature 3 in calculating the phase to be adjusted becomes worse in a case where the radio wave strength is weak, or, in other words, the signal-to-noise ratio is low. When tracking control is performed based on a measurement angle error signal with an inaccurately adjusted phase, the accuracy of tracking becomes worse, and in a worst case, tracking cannot be performed. An objective of the present disclosure is to be able to track a communication counterpart more accurately than conventional methods even in the case where the radio wave signal-to-noise ratio is low.

Solution to Problem

A control device according to the present disclosure includes:

an antenna drive being inputted a command value of an orientation direction and to control an antenna driver for changing the orientation direction, the orientation direction being a direction in which an antenna for receiving radio waves from a communication counterpart to generate reception signals is oriented, such that a difference between the command value and the orientation direction approaches zero, a program controller to generate the command value being changed in accordance with a predetermined change scenario, and to output the generated command value to the antenna drive controller;

an error measurement data generator to generate error measurement data including (i) an arrival direction error obtained from a sum signal and a difference signal of the reception signals, the arrival direction error representing a difference between the orientation direction and an arrival direction being a direction from which the radio waves come and arrive and (ii) an orientation direction actual measurement value being an actual measurement value of the orientation direction when the reception signals used to obtain the arrival direction error are received:

a correction value calculator to calculate, based on at least three pieces of the error measurement data being obtained at conditions in which the program controller outputs the command values being different each other, a phase correction value being an angle by which the arrival direction error is rotated; and a tracking controller to output, to the antenna drive controller, as the command value, a value obtained by adding (i) the arrival direction error corrected based on the phase correction value to (ii) the orientation direction actual measurement value.

Advantageous Effects of Invention

According to the present disclosure, a communication counterpart can be more accurately tracked than with conventional methods even in the case where the radio wave signal-to-noise ratio is low.

BRIEF DESCRIPTION OF DRAWINGS

FIG. 10 is a diagram illustrating a trajectory of the measurement angle error signal and the actual measurement value of the orientation direction, in the case of FIG. 8, corrected by the phase correction value and the sensitivity coefficient;

FIG. 11 is a diagram illustrating another example of a trajectory of the measurement angle error signal and the actual value of the orientation direction measured when the orientation direction is changed in order to calculate the correction parameter by the antenna control device according to Embodiment 1:

FIG. 22 is a diagram illustrating a trajectory of the measurement angle error signal and the actual measurement value of the orientation direction, in the case of FIG. 8, corrected by orthogonality, a phase correction value, an AZ sensitivity coefficient, and an EL sensitivity coefficient that are calculated by the antenna control device according to Embodiment 2:

FIG. 23 is a diagram illustrating a trajectory of the measurement angle error signal and the actual measurement value of the orientation direction, in the case of FIG. 11, corrected by the orthogonality, the phase correction value, the AZ sensitivity coefficient, and the EL sensitivity coefficient that are calculated by the antenna control device according to Embodiment 2:

FIG. 24 is a diagram illustrating an example of a trajectory of the measurement angle error signal and the actual measurement value of the orientation direction measured when the orientation direction is changed in order to calculate the correction parameter by the antenna control device according to Embodiment 2;

FIG. 26 is a diagram illustrating a trajectory of the measurement angle error signal and the actual measurement value of the orientation direction corrected by the orthogonality, the phase correction value, the AZ sensitivity coefficient, and the EL sensitivity coefficient in the case of FIG. 24:

FIG. 27 is a diagram illustrating a trajectory of the measurement angle error signal and the actual measurement value of the orientation direction corrected by the phase correction value and the sensitivity coefficients that are calculated by the antenna control device according to Embodiment 1, as a comparison example in the case of FIG. 24;

FIG. 28 is a diagram illustrating a configuration of the antenna system including the antenna control device according to Embodiment 3 of the present disclosure;

FIG. 51 is a flowchart illustrating operation of the antenna control device according to Embodiment 6.

DESCRIPTION OF EMBODIMENTS

Embodiment 1

Figure 1:
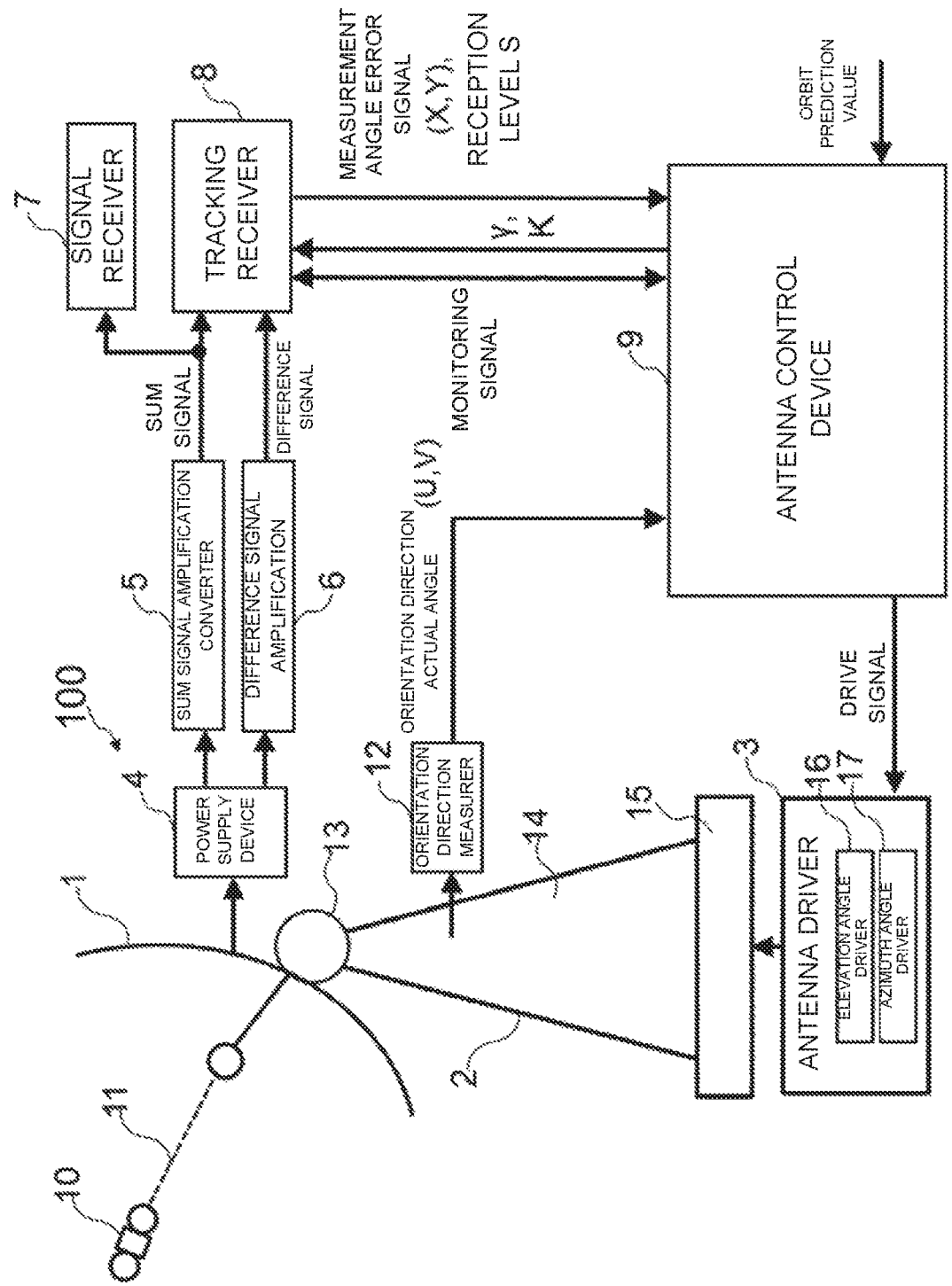
FIG. 1 is a diagram illustrating a configuration of an antenna system including an antenna control device according to Embodiment 1 of the present disclosure.

An antenna system including a control device according to Embodiment 1 of the present disclosure is described with reference to FIG. 1 to FIG. 4. An antenna system 100, as illustrated in FIG. 1, mainly includes an antenna 1, an antenna mount 2, an antenna driver 3, a power supply device 4, a sum signal amplification converter 5, a difference signal amplification converter 6, a signal receiver 7, a tracking receiver 8, and an antenna control device 9.

The antenna 1 receives a radio wave 11 from a moving object 10 such as a satellite or a rocket. The antenna mount 2 supports the antenna 1 to be able to change an orientation direction that is a direction in which the antenna 1 is oriented. The antenna driver 3 drives the antenna mount 2 thereby changing the orientation direction of the antenna 1. The power supply device 4 supplies power to the antenna 1 after amplifying a transmission signal, and generates, based on reception signals received by the antenna 1, a sum signal (SUM) and a difference signal (ERROR) by using the auxiliary power supply system of the power supply device 4. The sum signal amplification converter 5 amplifies the sum signal and converts the signal to an intermediate frequency. The difference signal amplification converter 6 amplifies the difference signal and converts the signal to the intermediate frequency. The signal receiver 7 demodulates the sum signal and acquires data transmitted by the moving object 10. The tracking receiver 8 generates, from the sum signal and the difference signal, measurement angle error signals X and Y for driving the antenna mount 2. The antenna control device 9 controls the antenna driver 3 such that the antenna 1 is oriented in the arrival direction. The arrival direction is a direction from which the radio wave transmitted by the moving object 10 comes and arrives.

The orientation direction of the antenna 1 is measured by an orientation direction measurer 12. The orientation direction of the antenna 1 can be changed by the antenna mount 2. The orientation direction is expressed by an azimuth angle and an elevation angle. The orientation direction measurer 12 is inputted with signals outputted by angle detection encoders (an encoder for the azimuth angle and an encoder for the elevation angle) that are attached to the antenna 1. The orientation direction measurer 12 measures the actual measurement value of the azimuth angle (referred to as the AZ actual angle) of the main beam axis of the antenna 1 based on the signal outputted by the encoder for the azimuth angle, and measures the actual measurement value of the elevation angle (referred to as the EL actual angle) of the main beam axis based on the signal outputted by the encoder for the elevation angle. The orientation direction measurer 12 outputs the AZ actual angle and the EL actual angle to the antenna control device 9. The orientation direction is represented by a horizon coordinate system based on a combination of (i) an azimuth angle where north is zero degrees and clockwise angles from north are positive and (ii) an elevation angle where directing the horizon is zero degrees.

The antenna mount 2 includes an elevation angle mount 13, an azimuth angle mount 14, and a base 15. The elevation angle mount 13 supports the antenna 1. The azimuth angle mount 14 supports the elevation angle mount 13 rotatably around an elevation angle axis (EL-axis) extending horizontally. The base 15 supports the azimuth angle mount 14 rotatably around an azimuth angle axis (AZ-axis) extending vertically. The azimuth angle may be referred to as an AZ-angle or AZ. The EL angle also may be referred to as an EL-angle or EL. The antenna control device 9 can be applied also to an X/Y type of antenna mount.

The antenna driver 3 includes an elevation angle driver 16 and an azimuth angle driver 17. The elevation angle driver 16 changes the elevation angle of the elevation angle mount 13 relative to the azimuth angle mount 14. The azimuth angle driver 17 changes the azimuth angle of the azimuth angle mount 14 relative to the base 15. The elevation angle driver 16 and the azimuth angle driver 17 each have a servo control system.

The power supply device 4 amplifies a transmission signal of a microwave frequency band to a predetermined power and supplies the amplified power to the antenna 1. Furthermore, the power supply device 4 generates, based on the reception signals received by the antenna 1, a sum signal (SUM) and a difference signal (ERROR) by using the auxiliary power supply system of the power supply device 4. The sum signal amplification converter 5 amplifies the sum signal and converts the frequency of the amplified sum signal to a lower frequency. The difference signal amplification converter 6 amplifies the difference signal and converts the frequency of the amplified difference signal to the lower frequency. The signal receiver 7 processes the sum signal received from the sum signal amplification converter 5 as a modulated communication signal and demodulates the processed signal. The sum signal and the difference signal are inputted to the tracking receiver 8.

Figure 2:
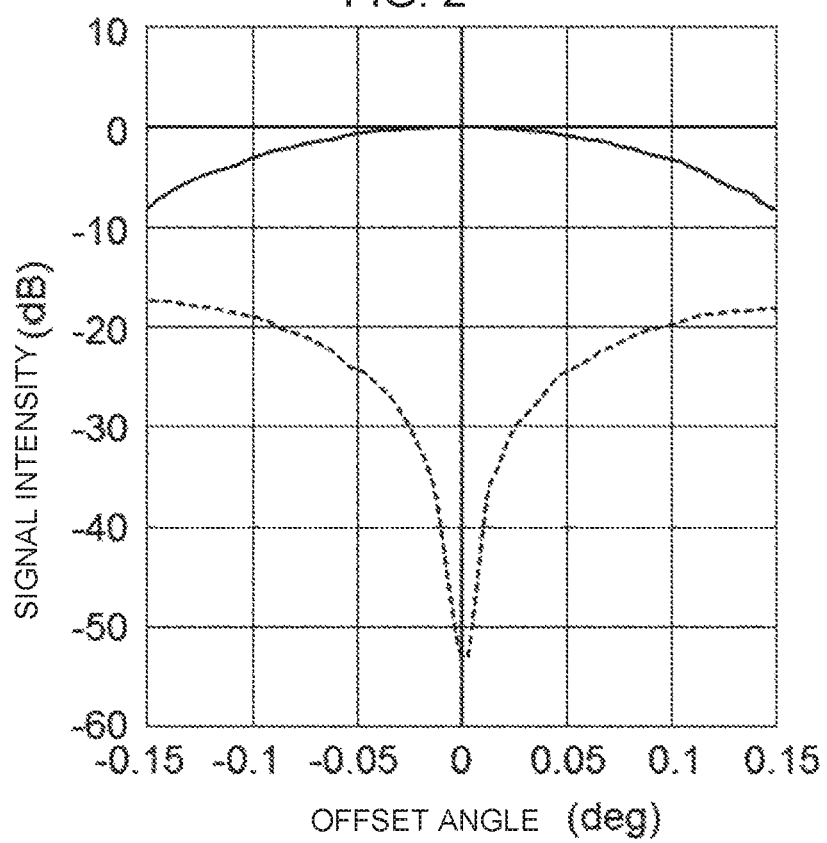
FIG. 2 is a diagram illustrating an example of changes, with respect to an offset angle, of a sum signal and a difference signal that are generated by an antenna and inputted to a tracking receiver.

FIG. 2 is a diagram illustrating an example of changes, with respect to an offset angle, of the sum signal and the difference signal that are generated by the antenna 1 and inputted to the tracking receiver 8. In FIG. 2, the sum signal is represented by a solid line and the difference signal is represented by a dashed line. The offset angle is an angle by which the orientation direction changes from a state of directing the moving object 10. The offset angle is zero degrees when the orientation direction of the antenna 1 is oriented toward the moving object 10. In a case where the offset angle is zero degrees, the signal intensity of the sum signal is at its highest, whereas the signal intensity of the difference signal is at its lowest.

The tracking receiver 8 generates, based on the sum signal and the difference signal, measurement angle error signals X and Y for driving the antenna 1, and outputs the measurement angle error signals X and Y to the antenna control device 9. In a case where the phase difference between the sum signal and the difference signal is the same as the phase difference that is actually generated, the measurement angle error signal X corresponds to an azimuth angle error of the orientation direction and the measurement angle error signal Y corresponds to an elevation angle error of the orientation direction.

The antenna control device 9 generates a drive signal for controlling the azimuth angle and the elevation angle of the main beam axis of the antenna 1 and outputs the drive signal to the antenna driver 3. The antenna control device 9 controls the azimuth angle and the elevation angle of the main beam of the antenna 1 based on the measurement angle error signals. The controlling, based on measurement angle error signals, such that the measurement angle error signals approach zero, is referred to as automatic tracking.

A method in which the direction of the main beam of the antenna 1 is controlled in accordance with a predetermined change scenario is referred to as program tracking. In program tracking, there is a case where control is performed based on an orbit prediction value, inputted from the external, of the moving object 10 and the change scenario and a case where control is performed only by either the change scenario or the orbit prediction value. The orbit prediction value is data representing the position of the moving object 10 per a predetermined width of time. The position of the moving object 10 is represented by an azimuth angle and an elevation angle in the direction, on the celestial sphere, of the moving object 10 as viewed from a predetermined observation point. The orbit prediction values inputted from the external, for example, every second, are interpolated by interpolation calculation to obtain values at a finer time width of 10 msec, for example. The antenna control device 9 uses the interpolated orbit prediction values.

Figure 3:
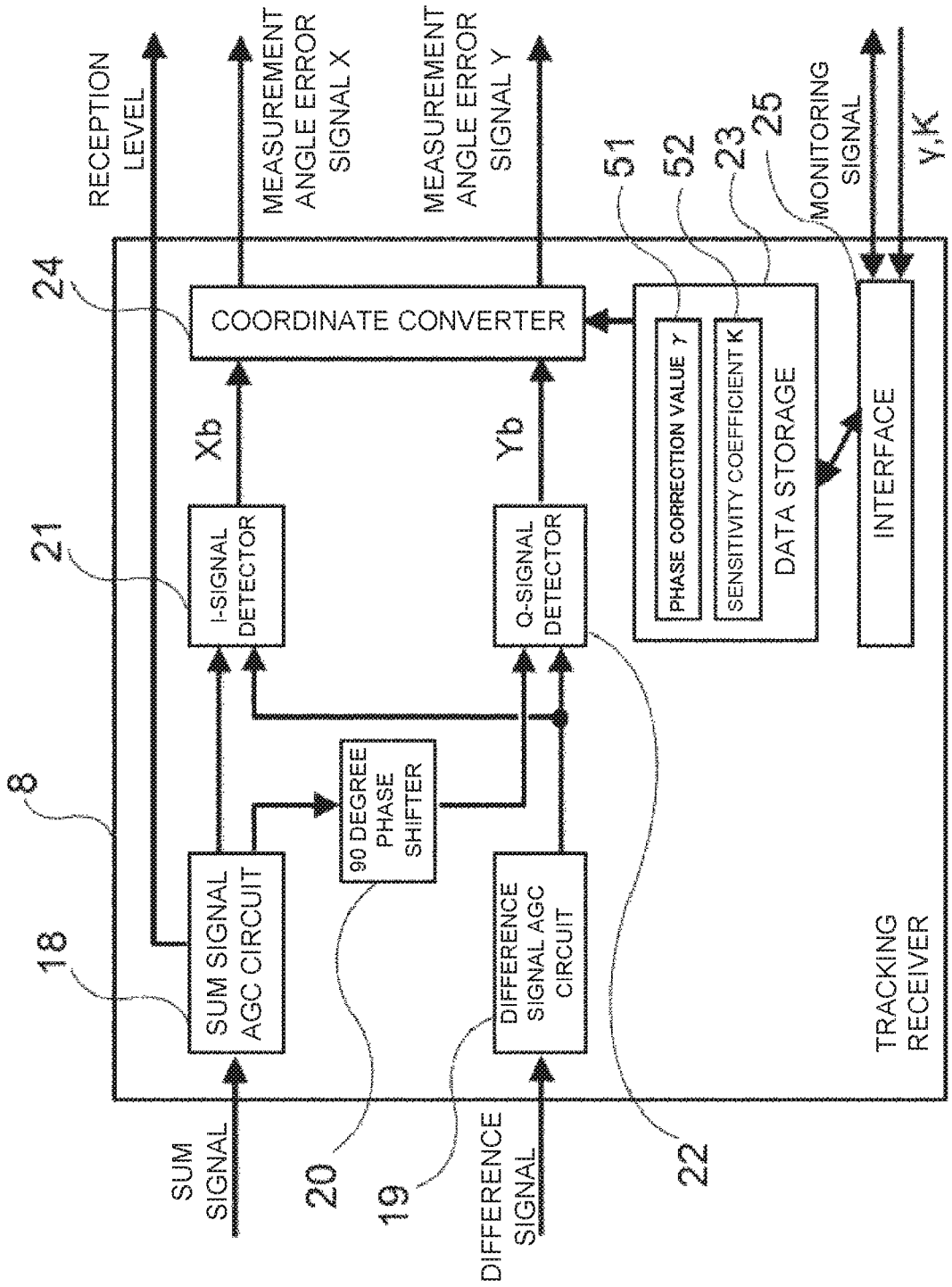
FIG. 3 is a block diagram illustrating a configuration of the tracking receiver.

The configuration of the tracking receiver 8 is described with reference to FIG. 3. FIG. 3 is a block diagram illustrating the configuration of the tracking receiver. The tracking receiver 8, as illustrated in FIG. 3, includes a sum signal AGC circuit 18, a difference signal AGC circuit 19, a 90 degree phase shifter 20, an I-signal detector 21, a Q-signal detector 22, a data storage 23, a coordinate converter 24, and an interface 25. AGC is an abbreviation of automatic gain control, that is, automatic amplification ratio control.

The sum signal AGC circuit 18 is inputted with a sum signal outputted by the antenna 1, the sum signal AGC circuit 18 amplifies the inputted sum signal. The amplification ratio of the sum signal AGC circuit 18 changes in accordance with the amplitude of the sum signal. The sum signal AGC circuit 18 outputs the amplified sum signal to the 90 degree phase shifter 20 and the I-signal detector 21. The sum signal AGC circuit 18 outputs, to the difference signal AGC circuit 19, an amplification voltage. The amplification voltage increases in proportion to the increase in the amplification ratio.

The difference signal AGC circuit 19 is inputted with the difference signal outputted by the antenna 1 and the amplification voltage outputted by the sum signal AGC circuit 18. The difference signal AGC circuit 19 changes the amplification ratio in accordance with the value of the amplification voltage inputted from the sum signal AGC circuit 18 and amplifies the inputted difference signal. That is, the difference signal AGC circuit 19 amplifies the inputted difference signal by the amplification ratio that is proportional to the amplification ratio of the sum signal AGC circuit 18. Consequently, the amplified difference signal outputted from the difference signal AGC circuit 19 is amplified by the amplification ratio that is proportional to the amplification ratio of the amplified sum signal outputted from the sum signal AGC circuit 18. The difference signal AGC circuit 19 outputs the amplified difference signal to the I-signal detector 21 and the Q-signal detector 22.

The 90 degree phase shifter 20 shifts (changes) the phase of the amplified sum signal outputted from the sum signal AGC circuit 18 by 90 degrees. The 90 degree phase shifter 20 outputs, to the Q-signal detector 22, the amplified sum signal with phase shifted by 90 degrees. The shifting of the phase by 90 degrees means that the phase is increased by 90 degrees.

The I-signal detector 21 detects the difference signal that is outputted from the difference signal AGC circuit 19 by the sum signal (sum signal without phase shifting) that is outputted from the sum signal AGC circuit 18. In other words, the I-signal detector 21 outputs a product of the sum signal outputted from the sum signal AGC circuit 18 and the difference signal outputted from the difference signal AGC circuit 19. The I-signal detector 21 outputs the detected signal (hereinafter referred to as the "I-signal") to the coordinate converter 24. The axis where the I-signal is detected is referred to as the I-axis.

The Q-signal detector 22 detects the difference signal outputted from the difference signal AGC circuit 19 by the sum signal outputted from the 90 degree phase shifter 20. In other words, the Q-signal detector 22 outputs the product of the sum signal outputted from the 90 degree phase shifter 20 and the difference signal outputted from the difference signal AGC circuit 19. The Q-signal detector 22 outputs the detected signal (hereinafter referred to as the "Q-signal") to the coordinate converter 24. The axis where the Q-signal is detected is referred to as the Q-axis.

The phase correction value 51 and the sensitivity coefficient 52 used by the coordinate converter 24 are stored in the data storage 23. The phase correction value 51 and the sensitivity coefficient 52 are calculated by the antenna control device 9. The phase correction value 51 is a correction value by which the phase of the I-axis and the Q-axis are corrected. With the phase correction value 51, the I-axis where the measurement angle error signal X is detected aligns with a U-axis (described later) that corresponds to the azimuth angle of the orientation direction and the Q-axis where the measurement angle error signal Y is detected aligns with a V-axis (described later) that corresponds to the elevation angle of the orientation direction. The sensitivity coefficient 52 is a factor of proportionality between the magnitude of the measurement angle error signal and the absolute value of the error of the orientation direction.

The coordinate converter 24 uses the phase correction value 51 and the sensitivity coefficient 52 to perform coordinate conversion on the I-signal and the Q-signal and then outputs the measurement angle error signals X and Y. Coordinate conversion is described later. The measurement angle error signals X and Y are outputted by the tracking receiver 8. The signal intensity (reception level) of the sum signal inputted to the sum signal AGC circuit 18 is also outputted by the tracking receiver 8.

The measurement angle error signal is an arrival direction error representing the difference between the arrival direction and the orientation direction of the antenna 1. The arrival direction is the direction from which the radio wave 11 comes and arrives. The measurement angle error signal is generated from the sum signal and the difference signal of the reception signals. The tracking receiver 8 is a measurement angle processor that is inputted with the sum signal and the difference signal of the reception signals and calculates an arrival direction error.

The interface 25 receives, from the antenna control device 9, a monitoring signal indicating whether or not the antenna control device 9 is operating normally. The interface 25 transmits, to the antenna control device 9, a monitoring signal indicating whether or not the tracking receiver 8 is operating normally. Transmission/reception of data such as the phase correction value γ and sensitivity coefficient K and control signals between the tracking receiver 8 and the antenna control device 9 is also performed.

Figure 4:
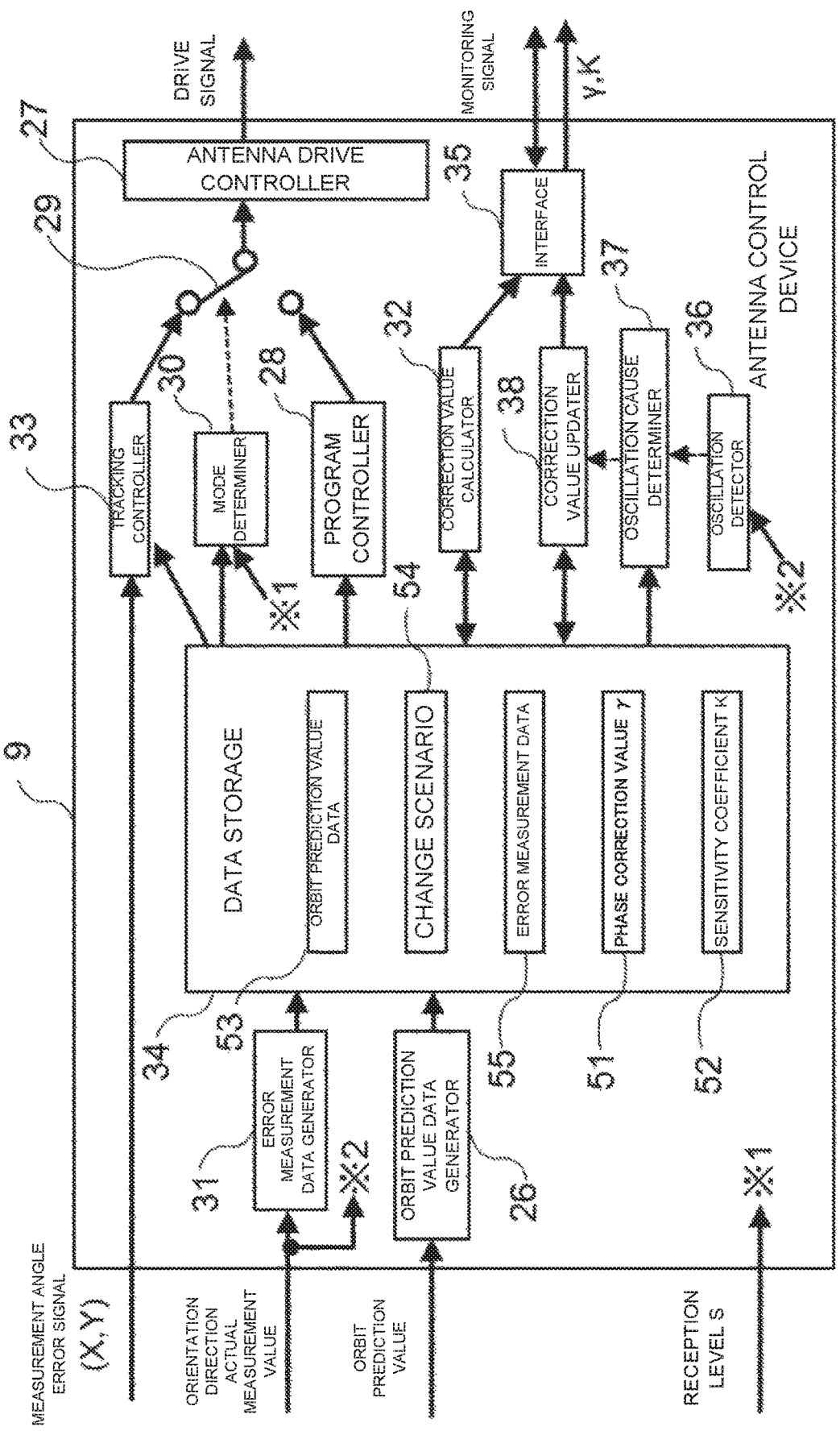
FIG. 4 is a block diagram illustrating a configuration of the antenna control device according to Embodiment 1.

The configuration of the antenna control device 9 is described with reference to FIG. 4. FIG. 4 is a block diagram illustrating the configuration of the antenna control device according to Embodiment 1. The antenna control device 9 includes an orbit prediction value data generator 26, an antenna drive controller 27, a program controller 28, a toggle switch 29, a mode determiner 30, an error measurement data generator 31, a correction value calculator 32, a tracking controller 33, a data storage 34, an interface 35, an oscillation detector 36, an oscillation cause determiner 37, and a correction value updater 38.

The orbit prediction value data generator 26 generates orbit prediction value data 53 obtained by performing interpolation calculation of orbit prediction values inputted externally even second, for example, to obtain values at a finer time width of 10 msec, for example. Then, the orbit prediction value data generator 26 stores the generated orbit prediction value data 53 into the data storage 34.

The antenna drive controller 27 generates a drive signal that drives the antenna driver 3 such that the difference between the command value being inputted and the direction orientation direction of the antenna 1 approaches zero. The antenna drive controller 27 amplifies the power of the drive signal to a level necessary for the antenna driver 3.

Figure 5:
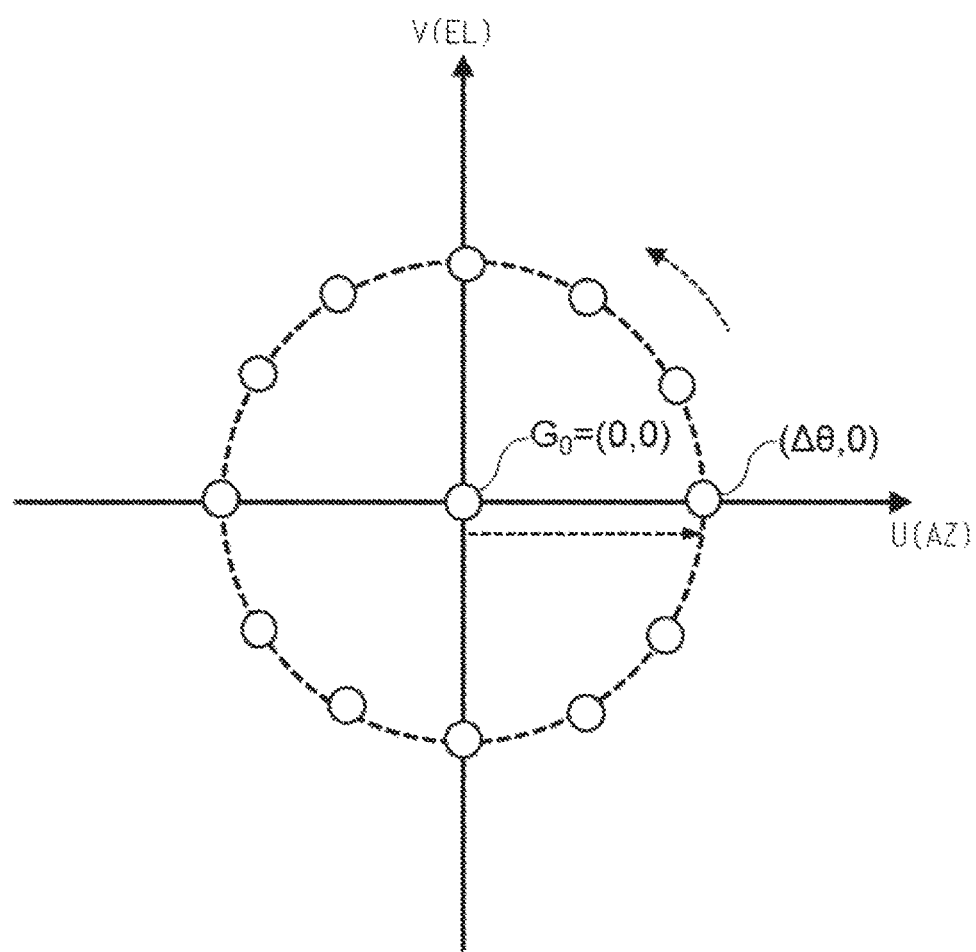
FIG. 5 is a diagram illustrating an example of a trajectory in which an orientation direction is changed when program tracking is performed by the antenna control device according to Embodiment 1.

The program controller 28 generates a command value based on the orbit prediction value data 53 and the change scenario 54 and outputs the generated command value to the antenna drive controller 9. An example of the change scenario 54 is illustrated in FIG. 5. The change scenario 54 indicates a time transition of orientation operation amount by which the orientation direction is changed from the orbit prediction value that is indicated by the orbit prediction value data 53. The term "orientation operation amount" is the amount by which the orientation direction is changed from the orbit prediction value. The program controller 28 outputs, as the command value, an orientation direction obtained by adding the orientation operation amount indicated in the change scenario 54 to the predicted position of the moving object 10 every control time based on the orbit prediction value data 53.

The toggle switch 29 switches between program tracking and automatic tracking. In a case where the toggle switch 29 is on the program tracking side, the antenna drive controller 27 is inputted with the command value outputted by the program controller 28. In a case where the toggle switch 29 is on the automatic tracking side, the antenna drive controller 27 is inputted with the command value calculated by the tracking controller 33. The state during which the antenna drive controller 27 is inputted with the command value outputted by the tracking controller 33 is referred to as "the tracking controller 33 is in operation" and the state during which the antenna drive controller 27 is inputted with the command value outputted by the program controller 28 is referred to as "program controller 28 is in operation".

The mode determiner 30 determines whether to operate in program tracking mode or automatic tracking mode. If the mode determiner 30 determines that it is necessary to change the mode, the mode determiner 30 changes the mode toggle switch 29 to the side to be used. The mode switching between program tracking and automatic tracking can be changed also through an instruction given by a user.

The error measurement data generator 31 generates error measurement data 55 while the program controller 28 is in operation. The error measurement data 55 contains an AZ actual angle and an EL actual angle measured by the orientation direction measurer 12 and measurement angle error signals outputted by the tracking receiver 8, all of which are measured at the time of the command value of the same orientation direction. In other words, the error measurement data 55 contains the measurement angle error signals X and Y and the AZ actual angle and the EL actual angle being actual measurement values of the orientation direction when the reception signals (sum signal and difference signal), from which the measurement angle error signals are obtained, are inputted. The generated error measurement data 55 is stored in the data storage 34.

The correction value calculator 32 calculates, based on at least three pieces of the error measurement data 55, a correction parameter that can correct the measurement angle error signals and make the difference between the orientation direction of the antenna 1 and the arrival direction approach zero. The error measurement data 55 for each of the at least three pieces are generated at conditions in which the program controller 28 outputs the command values that are different each other. The correction parameters to be calculated are the phase correction value 51 that is an angle by which the measurement angle error signal is rotated, and the sensitivity coefficient 52 by which the measurement angle error signal is multiplied. The calculated phase correction value 51 and the sensitivity coefficient 52 are stored in the data storage 23 included in the tracking receiver 8 and into the data storage 34. The method by which the correction value calculator 32 calculates the phase correction value 51 and the sensitivity coefficient 52 is described later.

The tracking controller 33 calculates command value obtained by adding the measurement angle error signal and the change caused by the orbit prediction value to the orientation direction actual measurement value. In a case where an orbit prediction value of the communication counterpart does not exist, the change caused by the orbit prediction value is set to zero.

The interface 35 receives, from the tracking receiver 8, a monitoring signal indicating whether or not the tracking receiver 8 is operating normally. The interface 35 transmits, to the tracking receiver 8, the monitoring signal indicating whether or not the antenna control device 9 is operating normally. Also, the transmission/reception of data such as the phase correction value γ and sensitivity coefficient K and control signals between the tracking receiver 8 and the antenna control device 9 is also performed.

Figure 14:
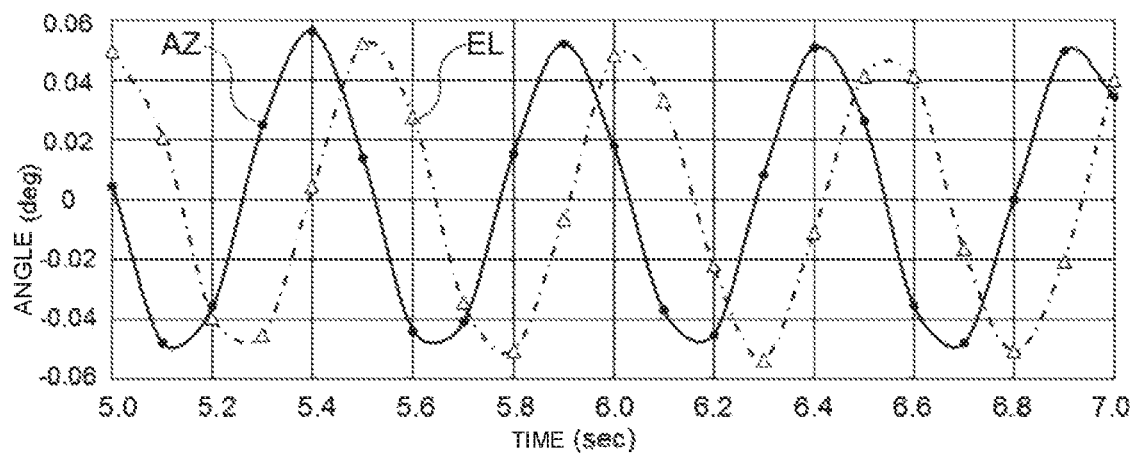
FIG. 14 is a diagram illustrating temporal changes of actual measurement values of the azimuth angle and the elevation angle caused by phase shift between the measurement angle error signals during automatic tracking.
Figure 16:
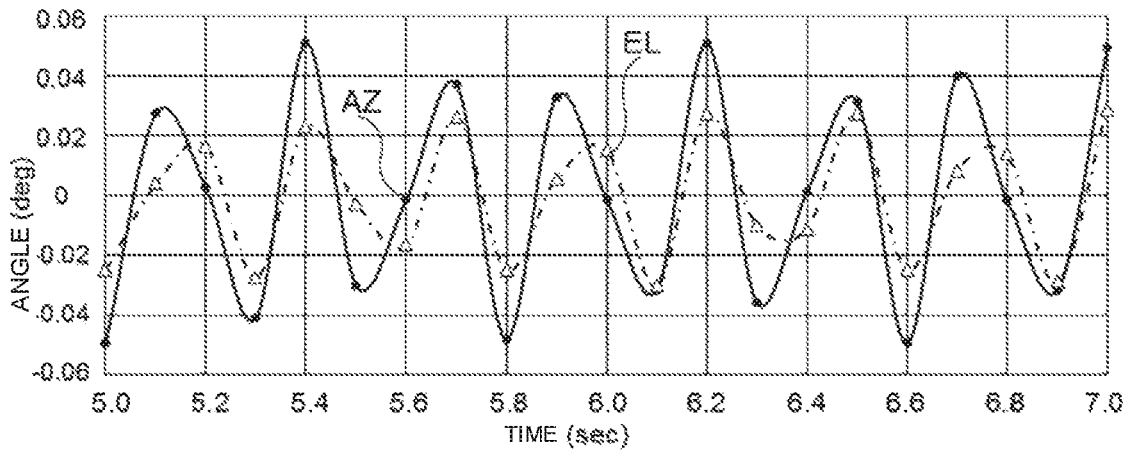
FIG. 16 is a diagram illustrating temporal changes of the actual measurement values of the azimuth angle and the elevation angle caused by shift of the sensitivity coefficient of the measurement angle error signal during automatic tracking.

The oscillation detector 36 detects oscillation. Oscillation is a phenomenon where the orientation direction of the antenna 1 periodically changes during automatic tracking. FIG. 14 and FIG. 16 illustrate examples where oscillation is occurring. The oscillation detector 36 checks the orientation direction actual measurement values within, for example, a predetermined length of time, and detects oscillations in a case where there is a fluctuation greater than or equal to a predetermined threshold.

In a case where the oscillation detector 36 detects oscillation, the oscillation cause determiner 37 activates the error measurement data generator 31 and the correction value calculator 32 multiple times. The oscillation cause determiner 37 determines the cause of the oscillation based on multiple phase correction values γ and sensitivity coefficients K. The oscillation cause determiner 37 determines a phase shift in which the phase of the measurement angle error signal has changed or a sensitivity shift in which the sensitivity coefficient has changed as being the cause of the oscillation.

The oscillation detector 36 may not be provided in a case where, during automatic tracking, the error measurement data generator 31 and the correction value calculator 32 are always operated periodically.

In the case where phase shift is the cause of oscillation, the correction value updater 38 updates the phase correction value γ. In the case where the sensitivity coefficient is the cause of oscillation, the correction value updater 38 updates the sensitivity coefficient K. The updated phase correction value γnew and the sensitivity coefficient Knew are stored in the data storage 23 of the tracking receiver 8 and the data storage 33.

The updated phase correction value γnew is obtained by adding the newly calculated phase correction value γnow to the phase correction value γold that has been used by that time. In other words, the calculation is performed using the equation indicated below.

$$\gamma new = \gamma old + \gamma now \qquad (1)$$

The newly calculated phase correction value γnow is determined based on at least one piece of γ among the phase connection values γ calculated at and after the time when oscillation is detected. In the case where γnow is determined based on multiple pieces of γ, the phase correction value γnow is determined by use of an appropriate method such as the averaging or median operation. The phase correction values γ calculated at and after the time when oscillation is detected are union of the γ calculated for determining the cause of oscillation and the γ calculated after identifying the cause of oscillation.

The updated sensitivity coefficient Knew is obtained by multiplying the sensitivity coefficient Kold used by that time by the newly calculated sensitivity coefficient Know. In other words, the calculation is performed using the equation indicated below.

$$K new = K old \times K now \qquad (2)$$

The newly calculated sensitivity coefficient Know is determined based on at least one piece of K among the sensitivity coefficients K calculated at and after the time when oscillation is detected. In the case where Know is determined based on multiple pieces of K, the newly calculated sensitivity coefficient Know is determined by use of an appropriate method such as the averaging or median operation. The sensitivity coefficients K calculated at and after the time when oscillation is detected are union of the K calculated for determining the cause of oscillation and the K calculated after identifying the cause of oscillation.

FIG. 5 is a diagram illustrating an example of a trajectory in which an orientation direction is changed when program tracking is performed by the antenna control device according to Embodiment 1. In FIG. 5, the trajectory that changes by the orbit prediction value is represented by one point $G_0$ on the celestial sphere defined in the horizontal coordinate system. $G_0$ is referred to as the reference celestial sphere point. The celestial sphere point $G_0$ is the prediction direction being the orientation direction predicted based on the orbit prediction value. The reference celestial sphere point is (i) an orientation direction of the orbit prediction value at one time point determined appropriately in a determined change scenario 54, such as the starting point, an intermediate point, or an end point of the change scenario 54 or (ii) a centroid of the orbit prediction values during a time period. The orientation direction of the reference celestial sphere point $G_0$ is (azimuth angle, elevation angle)=(u0, v0). In FIG. 5, the celestial sphere points and the reference celestial sphere point $G_0$ that are used to create the error measurement data 55 are denoted by white circles.

In FIG. 5, the vertical direction shown in the figure is referred to as the V-direction. In FIG. 5, the V-direction is the direction of the great circle on the celestial sphere in which the elevation angle changes. The direction of the great circle that is perpendicular to the V-direction on the celestial sphere is referred to as the U-direction. The U-direction is the horizontal direction in the figure. Since the trajectory on the celestial sphere in which the azimuth angle changes while the elevation angle is constant is a small circle, strictly speaking, the trajectory differs from the U-direction. The difference between (i) the trajectory on the celestial sphere in which the azimuth angle changes in a range with minute changes and (ii) the U-direction can be ignored. The great circle of the U-direction which passes on the reference celestial sphere point is referred to as the U-axis. The great circle of the V-direction which passes on the reference celestial sphere point is referred to as the V-axis.

The reference celestial sphere point $G_0$ is the origin of the U-axis and the V-axis. That is, $G_0=(0, 0)$. Also, in the coordinate system of the U-axis and the V-axis, the celestial sphere point G representing the program command value is expressed as $(\Delta u, \Delta v)$. In the change scenario 54, the offset angle is $\Delta\theta$, the frequency of the rotation of the program command value is f, that is, the angular velocity is $\omega=2\pi f$, and the time elapsed from the start of the change scenario 54 is t. The offset angle $\Delta\theta$ is the reference angle used for changing an orientation direction. The celestial sphere point G can be expressed as follows.

$$\Delta u = \Delta\theta \times \cos(\omega \times t) \quad (3)$$

$$\Delta v = \Delta\theta \times \sin(\omega \times t) \quad (4)$$

Equation (3) and Equation (4) mean that the program command value $(\Delta u, \Delta v)$, which is the command value of the orientation direction, is calculated such that the angular difference from reference celestial sphere point $G_0$ is in a range within the offset angle $\Delta\theta$. The offset angle $\Delta\theta$ is a predetermined maximum angle difference relative to the angular difference between the reference celestial sphere point $G_0$ and the command value of the orientation direction.

The program command value moves so that its trajectory forms a circle on the celestial sphere, the circle has a center located at $G_0$ and a radius $\Delta\theta$. The $\Delta\theta$ is a small value that is less than or equal to approximately 1/10 of the half width of the antenna 1. Thus, in a case where there is almost no prediction value error (the orbit prediction value of the moving object 10 is correct), the drop in the reception level when circular movement is made in accordance with the program command value is less than approximately 0.3 dB including the control response error of the antenna 1. The error measurement data 55 is created during program tracking based on ten or more celestial sphere points $G_j$.

In the antenna mount 2, the command value represented by a pair of the azimuth angle and the elevation angle are inputted. The command value of the azimuth angle and the elevation angle corresponding to the celestial sphere point G assumed to be $(AZ0(t), EL0(t))$, is expressed as follows.

$$AZ0(t) = u0 + \Delta u / \cos(v0) = u0 + (\Delta\theta / \cos(v0)) \times \cos(\omega \times t) \quad (5)$$

$$EL0(t) = v0 + \Delta v = v0 + \Delta\theta \times \sin(\omega \times t) \quad (6)$$

The frequency f is set to approximately 1 Hz. and the time during which the orientation direction of the antenna device 1 changes becomes short. Also, in a case where the phase calculation accuracy is low because the antenna device 1 being unable to maintain proper tracking at 1 Hz due to the frequency band characteristics of the antenna servo loop, the frequency may be decreased to less than 1 Hz in accordance with the frequency band characteristics of the servo loop.

The command value of the orientation direction may be changed using a movement other than circular movement, for example, square-like movement and grid-like movement. The offset angle $\Delta\theta$ is a change reference angle used as a reference for changing the command value in a change scenario. The change range of the command value is proportional to the offset angle $\Delta\theta$. The maximum angle difference, being the maximum value of the angle differences from the reference celestial sphere points of command values that change by the change scenario, is determined by the offset angle $\Delta\theta$.

The method by which the correction value calculator 32 calculates the phase correction value 51 and the sensitivity coefficient 52 is described. The variables shown below are defined. The orientation direction is expressed by the U-axis and V-axis coordinate system with the reference celestial sphere point $G_0$ being the origin. The U-axis component of the orientation direction is referred to as the U-angle whereas the V-axis component of the orientation direction is referred to as the V-angle.

$G_j$: j-th program command value.
Puj: U-angle of $G_j$.
Pvj: V-angle of $G_j$.
Uj: U-angle of the actual measurement value of the orientation direction at the time of being $G_j$.
Vj: V-angle of the actual measurement value of the orientation direction at the time of being $G_j$.
Hj: Point on the celestial sphere representing the actual measurement value of the orientation direction at the time of being $G_j$. Hj=(Uj, Vj).
Xj: Measurement angle error signal X obtained from the sum signal and the difference signal at the time of being $G_j$.
Yj: Measurement angle error signal Y obtained from the sum signal and the difference signal at the time of being $G_j$.
Vsj: Measurement angle error vector represented by the measurement angle error signals X and Y at the time of being $G_j$.

$$Vsj=(Xj,Yj).$$

$P_0$: Arrival direction. Difference between the orbit prediction value of the moving object 10 and the actual direction from which the radio wave comes and arrives.

$$P_0=(Du,Dv).$$

Du: U-angle of the arrival direction $P_0$.
Dv: V-angle of the arrival direction $P_0$.
Vhj: Vector representing the actual measurement value error from the orientation direction actual measurement value Hj towards $P_0$.

$$Vhj=(Du-Uj,Dv-Vj).$$

γ: Variable representing the phase correction value 51.
K: Variable representing the sensitivity coefficient 52. K=|Vsj|/|Vhj|.

Figure 6A:
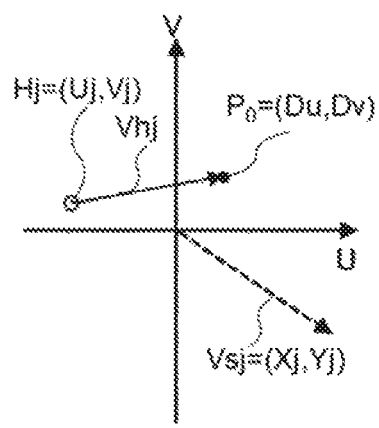
FIGS. 6A, 6B and 6C are diagrams illustrating a process for correcting a measurement angle error vector based on a phase correction value and a sensitivity coefficient calculated by the antenna control device according to Embodiment 1.
Figure 6B:
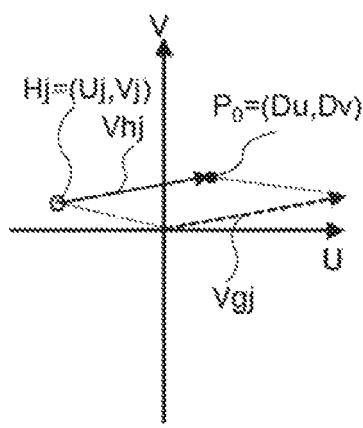
Figure 6C:
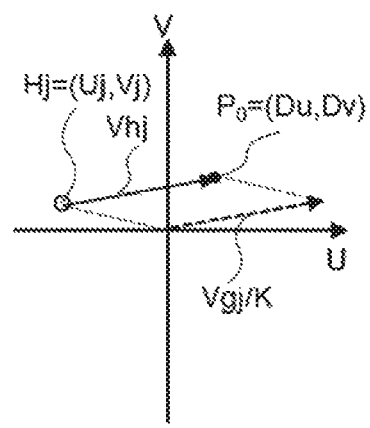

The relationship of these variables is described with reference to FIGS. 6A, 6B, and 6C. FIGS. 6A, 6B, and 6C illustrate the process for correcting a measurement angle error victory based on a phase correction value and a sensitivity coefficient calculated by the antenna control device according to Embodiment 1. FIGS. 6A, 6B, and 6C illustrate the variables at the time of the program correction value $G_j$. FIG. 6A illustrates the actual measurement value Hj of the orientation direction, the arrival direction $P_0$, the actual measurement value error vector Vhj of the arrival direction that is determined based on the actual measurement value Hj, and the measurement angle error vector Vsj that is obtained from the sum signal and the difference signal. The direction and the magnitude of Vhj and Vsj are different from each other. FIG. 6B illustrates the vector Vgj where Vsj is rotated by the phase correction value $\gamma$. Vhj and Vgj direct in the same direction. FIG. 6C illustrated a case where Vgj is multiplied by the sensitivity coefficient K. The direction and magnitude of Vhj and Vgj/K are the same.

The details illustrated in FIG. 6 are expressed by the following equations.

[Mathematical Formula 1]

$$\begin{bmatrix} Xj \\ Yj \end{bmatrix} = K \begin{bmatrix} \cos(\gamma) & \sin(\gamma) \\ -\sin(\gamma) & \cos(\gamma) \end{bmatrix} \begin{bmatrix} Du - Uj \\ Dv - Vj \end{bmatrix} \tag{7}$$

[Mathematical Formula 2]

$$\begin{bmatrix} Uj \\ Vj \end{bmatrix} = \begin{bmatrix} Du \\ Dv \end{bmatrix} - \frac{1}{K} \begin{bmatrix} \cos(\gamma) & -\sin(\gamma) \\ \sin(\gamma) & \cos(\gamma) \end{bmatrix} \begin{bmatrix} Xj \\ Yj \end{bmatrix} \tag{8}$$

The coordinate converter 24 uses the phase correction value $\gamma$ and the sensitivity coefficient K to perform coordinate conversion and then outputs the measurement angle error signals X and Y. Here, the measurement angle error signals before correction are represented by the variables Xb and Yb.

[Mathematical Formula 3]

$$\begin{bmatrix} X \\ Y \end{bmatrix} = \frac{1}{K} \begin{bmatrix} \cos(\gamma) & -\sin(\gamma) \\ \sin(\gamma) & \cos(\gamma) \end{bmatrix} \begin{bmatrix} Xb \\ Yb \end{bmatrix} \tag{9}$$

If the phase correction value $\gamma$ and the sensitivity coefficient K are correctly set and there is no noise, the measurement angle error vector Vs=(X, Y) coincides with the actual measurement value vector Vh=(Du−u, Dv−v).

Two equations can be obtained with respect to a single program command value $G_j$. Since the number of variables is four, when error measurement data 55 is generated with respect to two $G_j$, the values of four variables can be calculated. In the case where there are two $G_j$, the following equations can be obtained.

$$Du - U1 = K \times (X1 \times \cos\gamma - Y1 \times \sin\gamma) \tag{10}$$

$$Dv - V1 = K(X1 \times \sin\gamma + Y1 \times \cos\gamma) \tag{11}$$

$$Du - U2 = K \times (X2 \times \cos\gamma - Y2 \times \sin\gamma) \tag{12}$$

$$Dv - V2 = K \times (X2 \times \sin\gamma + Y2 \times \cos\gamma) \tag{13}$$

The following is obtained by subtracting Equation (11) from Equation (10) and removing Du.

$$U2 - U1 = K \times ((X1 - X2) \times \cos\gamma - (Y1 - Y2) \times \sin\gamma) \tag{14}$$

The following is obtained by subtracting Equation (13) from Equation (12) and removing Dv.

$$V2 - V1 = K \times ((X1 - X2) \times \sin\gamma + (Y1 - Y2) \times \cos\gamma) \tag{15}$$

In order to remove the member of $\gamma$, Equation (14) and Equation (15) are each squared and then added together.

$$(U2 - U1)^2 + (V2 - V1)^2 = K^2((X1 - X2)^2 + (Y1 - 2)^2) \tag{16}$$

Here, the following variables are defined.

$$Lh = \sqrt{((U2 - U1)^2 + (V2 - V1))} \tag{17}$$

$$\theta h = \sin^{-1}((V2 - V1)/Lh) \tag{18}$$

$$Ls = ((X1 - X2) + (Y1 - Y2)^2) \tag{19}$$

$$\theta s = \sin^{-1}((Y1 - Y2)/Ls) \tag{20}$$

When Equation (16) is modified by Lh and Ls, the equation for calculating K is as follows.

$$K = \sqrt{(((X1 - X2)^2 + (Y1 - Y2)^2)/((U2 - U1)^2 + (V2 - V1)^2))} = Ls/Lh \tag{21}$$

When Equation (14) and Equation (15) are substituted with Equation (18), Equation (20), and Equation (21), the following equations are obtained.

$$\cos\theta h = \cos\theta s \times \cos\gamma - \sin\theta s \times \sin\gamma \tag{22}$$

$$\sin\theta h = \cos\theta s \times \sin\gamma + \sin\theta s \times \cos\gamma \tag{23}$$

Using formulas for trigonometric functions, Equation (22) and Equation (23) can be expressed as follows.

$$\cos\theta h = \cos(\theta s + \gamma) \tag{24}$$

$$\sin\theta h = \sin(\theta s + \gamma) \tag{25}$$

Using Equation (24) and Equation (25), $\gamma$ can be calculated with the following equation $$\gamma = \theta h - \theta s \tag{26}$$

The method of Patent Literature 3 is to calculate the phase correction value $\gamma$ by using Equation (26). Although calculation can be performed just by using the error measurement data 55 at two program command values G1 and G2, the method has a shortcoming in that the method is affected by noise largely because there are measurement errors (noise) in the orientation direction actual measurement value Hj=(Uj, Vj) and the measurement angle errors Xj and Yj.

The correction value calculator 32 uses error measurement data 55 generated by the program command value $G_j$ of N pieces (at least three pieces), and can calculate the phase correction value $\gamma$ and the sensitivity coefficient K with reduced influence of noise. Additionally, the variables shown below are defined.

Xfj: Measurement angle error signal X after correction by the assumed Du, Dv, $\gamma$, and K.

Yfj: Measurement angle error signal Y after correction by the assumed Du, Dv, $\gamma$, and K.

Vaj: Post-correction measurement angle error vector represented by Xfj and Yfj.

Vaj=(Xfj, Yfj)

Xfj and Yfj can be calculated using the following equations.

[Mathematical Formula 4]

$$\begin{bmatrix} Xfj \\ Yfj \end{bmatrix} = K \begin{bmatrix} \cos(\gamma) & \sin(\gamma) \\ -\sin(\gamma) & \cos(\gamma) \end{bmatrix} \begin{bmatrix} Du - Uj \\ Dv - Vj \end{bmatrix} \tag{27}$$

[Mathematical Formula 5]

$$\begin{bmatrix} Du - Uj \\ Dv - Vj \end{bmatrix} = \frac{1}{K} \begin{bmatrix} \cos(\gamma) & -\sin(\gamma) \\ \sin(\gamma) & \cos(\gamma) \end{bmatrix} \begin{bmatrix} Xfj \\ Yfj \end{bmatrix} \tag{28}$$

The correction value calculator 32 determines $\gamma$ and K such that the following error function E is minimized.

$$E = \Sigma((Xj - Xfj)^2 + (Yj - Yfj)^2) \tag{29}$$

In the present disclosure, $\Sigma$ means that values for the integers of j=1, 2, . . . , N are added together.

Here, the error function E is the sum of squares of post-correction residuals for N pieces of the error measurement data 55. Each of the post-correction residuals is the difference between (i) the arrival direction error (Xfj. Yfj) obtained by correcting the actual measurement value error (Du−Uj, Dv−Vj) by using the correction parameters including the phase correction value and (ii) the arrival direction error (Xj, Yj) inputted from the tracking receiver 8.

The following is obtained by modifying Equation (29)

$$E = \Sigma((Xj + Xfj)^2 + (Yj - Yfj)^2) \quad (30)$$
$$= \Sigma(Xj^2 + Yj^2) - 2 \times \Sigma(Xj \times Xfj) - 2 \times \Sigma(Yj + Yfj) +$$
$$\Sigma(Xfj^2 + Yfj^2)$$

The following is obtained by substituting Equation (30) with Equation (27).

$$E = \Sigma(Xj^2 + Yj^2) - 2 \times K \times \Sigma(Du - Uj) \times (Xj \times \cos\gamma - Yj \times \sin\gamma) - \quad (31)$$
$$2 \times K \times \Sigma(Dv - Vj) \times (Xj \times \sin\gamma + Yj \times \cos\gamma) +$$
$$K^2 \times \Sigma((Du - Uj)^2 + (Dv - Vj)^2)$$

Here the following variables are defined in order to convert Equation (31) into an equation in which Σ is not used.

$u0 = \Sigma Uj/N$
$v0 = \Sigma Vj/N$
$x0 = \Sigma Xj/N$
$y0 = \Sigma Yj/N$
$us0 = \Sigma(Uj^2 - u0^2)/N$
$vs0 = \Sigma(Vj^2 - v0^2)/N$
$xs0 = \Sigma Xj^2/N$
$ys0 = \Sigma Yj^2/N$
$d0 = \Sigma(u0 \times x0 - Uj \times Xj)/N$
$e0 = \Sigma(u0 \times y0 - Uj \times Yj)/N$
$f0 = \Sigma(v0 \times x0 - Vj \times Xj)/N$
$g0 = \Sigma(v0 \times y0 - Vj \times Yj)/N$ By using these variables, Equation (31) becomes the following.

$$E = N \times (xs0 + ys0) - 2N \times K \times \quad (31A)$$
$$((Du - u0) \times (x0 \times \cos\gamma - y0 \times \sin\gamma) + d0 \times \cos\gamma - e0 \times \sin\gamma) - 2N \times$$
$$K \times ((Dv - v0) \times (x0 \times \sin\gamma + y0 \times \cos\gamma) + f0 \times \sin\gamma + g0 \times \cos\gamma) +$$
$$N \times K^2 \times ((Du - u0)^2 + (Du - v0)^2 + us0 + vs0)$$

For γ, K, Du, and Dv that minimize E, partial differential of E to each of K, Du, and Dv becomes zero. Based on δE/δγ=0, the following is obtained.

$$((Du - u0) \times x0 + d0 + (Dv - v0) \times y0 + g0) \times \sin\gamma = \quad (32)$$
$$(-(Du - u0) \times y0 - e0 + (Dv - v0) \times x0 + f0) \times \cos\gamma$$

Based on δE/δDu=0, the following is obtained.

$$Du = u0 + (x0 \times \cos\gamma - y0 \times \sin\gamma)K \quad (33)$$

Based on δE/δDv=0, the following is obtained.

$$Dv = v0 + (x0 \times \sin\gamma + y0 \times \cos\gamma)/K \quad (34)$$

The following is obtained by substituting Equation (32) with Equation (33) and Equation (34).

$$(d0 + g0) \times \sin\gamma = (f0 - e0) \times \cos\gamma \quad (35)$$

Based on Equation (35), γ can be calculated as follows.

$$\gamma = \tan^{-1}((f0 - e0)/(d0 + g0)) \quad (36)$$

Based on δE/δK=0, the following is obtained.

$$K = \sqrt{((d0 + g0)^2 + (f0 - e0)^2)/(us0 + vs0)} \quad (37)$$

By substituting Equation (33) and Equation (34) with Equation (37), the following are obtained.

$$Du = u0 + (us0 + vs0) \times (x0 \times (d0 + g0) - y0 \times (f0 - e0))/((d0 + g0)^2 + (f0 - e0)^2) \quad (33A)$$

$$Dv = v0 + (us0 + vs0) \times (x0 \times (f0 - e0) + y0 \times (d0 + g0))/((d0 + g0)^2 + (f0 - e0)^2) \quad (34A)$$

As can be understood from Equation (36) and Equation (37), this method has a feature that enables to calculate the prediction value errors (Du, Dv) even when there is a deviation between the orbit prediction value and the satellite position, and enables to calculate the phase correction value γ and the sensitivity coefficient K that are not influenced with the forecast value errors.

Here, the post-correction values with respect to Uj and Vj may be calculated as follows.

Ulj: post-correction value of Uj calculated using the assumed Du, Dv, γ, and K
Vfj: post-correction value of Vj calculated using the assumed Du, Dv, γ, and K The following relationship exists between Ufj, Vfj, Xj, and Yj.

[Mathematical Formula 6]

$$\begin{bmatrix} Ufj \\ Vfj \end{bmatrix} = \begin{bmatrix} Du \\ Dv \end{bmatrix} - \frac{1}{K}\begin{bmatrix} \cos(\gamma) & -\sin(\gamma) \\ \sin(\gamma) & \cos(\gamma) \end{bmatrix}\begin{bmatrix} Xj \\ Yj \end{bmatrix} \quad (38)$$

[Mathematical Formula 7]

$$\begin{bmatrix} Xj \\ Yj \end{bmatrix} = K\begin{bmatrix} \cos(\gamma) & \sin(\gamma) \\ -\sin(\gamma) & \cos(\gamma) \end{bmatrix}\begin{bmatrix} Du - Ufj \\ Dv - Vfj \end{bmatrix} \quad (39)$$

The phase correction value γ and the sensitivity coefficient K are calculated by minimizing the error function E2 that is represented by Ufj and Vfj.

$$\Sigma^2 = K^2 \times ((Ufj - Uj)^2 + (Vfj - Vj)^2) \quad (40)$$

Here, the error function E2 is the sum of squares of post-correction residuals for N pieces of the error measurement data 55. Each of the post-correction residuals is the difference between (i) the actual measurement value error (Du−Ufj, Dv−Vfj) obtained by correcting the arrival direction error with the correction parameters including the phase correction value γ and (ii) the actual measurement value error (Du−Uj, Dv−Vj).

Although the derivation step is omitted, the error function E2 is the same as the error function E. Even in a case where the error function E2 is minimized, the phase correction value γ and the sensitivity coefficient K can be calculated to be the same value as that calculated when the error function E is minimized.

The phase correction value γ and the sensitivity coefficient K calculated by the correction value calculator 32 are stored in the data storage 23 included in the tracking receiver 8 and into the data storage 34. The values that are stored are not the calculated values without further processing. Rather, as illustrated in Equation (1) and Equation (2), the values set before updating are corrected and set.

Figure 7:
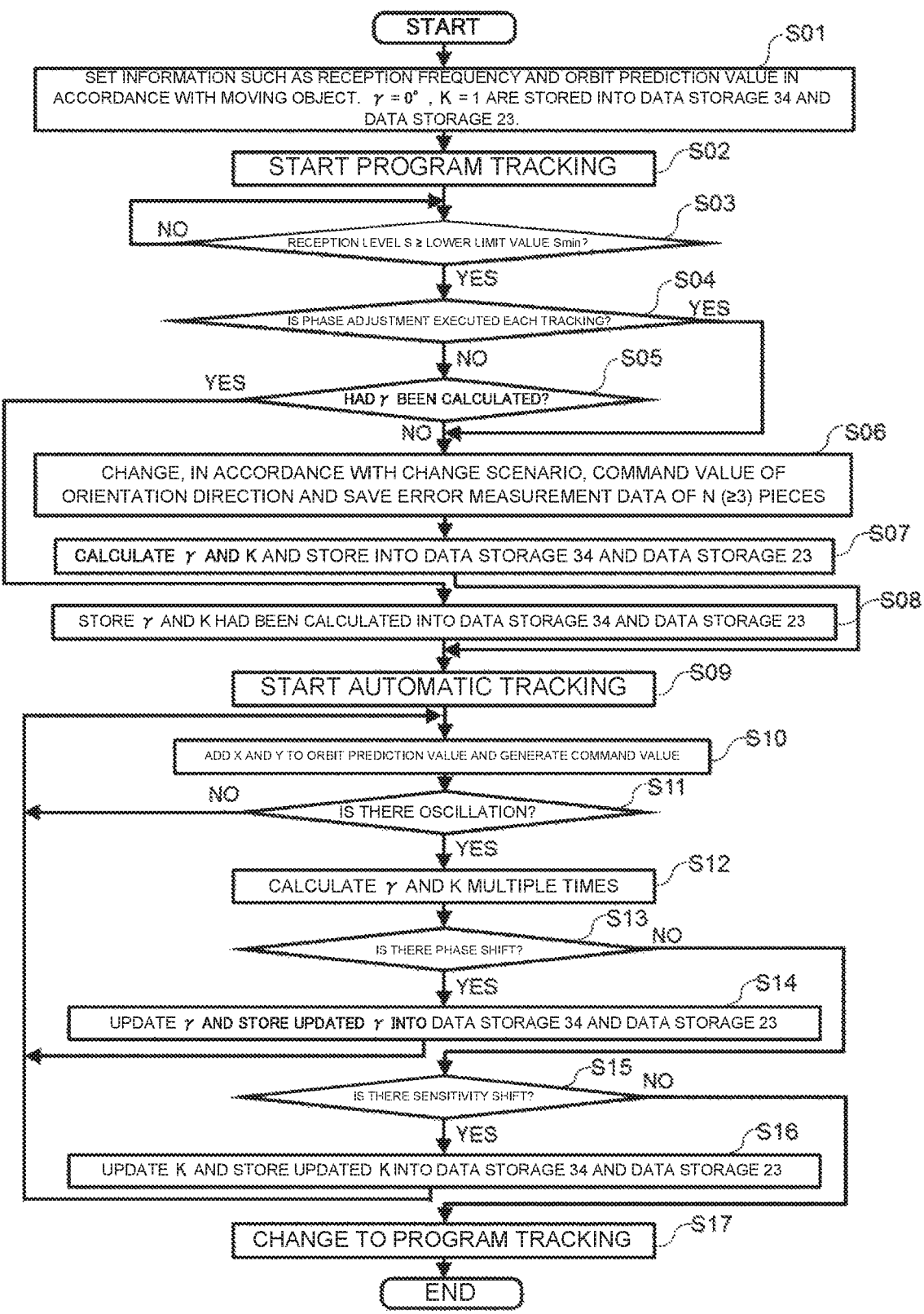
FIG. 7 is a flowchart illustrating a procedure for tracking a moving object by the antenna control device according to Embodiment 1.

An operation is described. FIG. 7 is a flowchart illustrating a procedure for tracking the moving object by the antenna control device according to Embodiment 1.

In step S01, information such as the reception frequency and the orbit prediction value are set depending on the moving object 10 to be tracked being a satellite or others. The phase correction value $\gamma=0°$ and the sensitivity coefficient K=1 are stored in the data storage 34 and the data storage 23. In step S02, program tracking starts. The mode determiner 30 sets the toggle switch 29 to the program tracking side. In step S03, the mode determiner 30 checks whether a reception level S outputted by the tracking receiver 8 is greater than or equal to a lower limit value Smin. If the reception level S is greater than or equal to the lower limit value Smin (YES in S03), the radio wave 11 from the moving object 10 is considered to be captured, and thus processing proceeds to step S04. If the reception level S is less than the lower limit value Smin (No in S03), S03 is repeated at a predetermined interval.

In step S04, a check is performed as to whether the parameter for phase adjustment is set to the value indicating that phase adjustment is executed in every tracking. If phase adjustment is not to be executed in every tracking, a check is performed, in step S05, as to whether the phase correction value $\gamma$ and so on for the frequency used for present tracking, had been calculated. If phase adjustment is executed in every tracking in S04 or if calculation is not finished in step S05, step S06 is performed. In S06, the program controller 28 outputs the command value of the orientation direction of the antenna device 1 to change in accordance with a predetermined change scenario. While the orientation direction changes in accordance with the change scenario, the error measurement data generator 31, at a predetermined time interval, generates error measurement data 55 and stores into the data storage 34. In step S07, the correction value calculator 32 calculates the phase correction value $\gamma$ and the sensitivity coefficient K and stores them into the data storage 34.

Two examples are described in each of which a change scenario 54 is performed and a phase correction value $\gamma$ and a sensitivity coefficient K are calculated. When the change scenario 54 is performed, the program controller 28 changes the command value of the orientation direction in accordance with the change scenario 54 and generates error measurement data 55 for three or more pieces. The phase correction value $\gamma$ and the sensitivity coefficient K are calculated based on the generated error measurement data 55. In these two examples, it is set that the command value of the orientation direction is moved circularly at minute angles in accordance with the change scenario 54 at the frequency f being 1 Hz, the number N of the error measurement data 55 is 10 pieces, the antenna beam half width (beam width) is 0.2°, and the offset angle $\Delta\theta$ is 0.02°. The moving object 10 is supposed to be an artificial satellite orbiting at the orbit altitude of 500 Km. The elevation angle is approximately 5 degrees. The noise superimposed on the measurement angle error signal is approximated using a Gauss random number and the effective value of that magnitude is set to be 0.003° rms (root mean square). The noise superimposed on the actual measurement value of the orientation direction of the antenna 1 is approximated using a Gauss random number and that magnitude is set to be 0.003° rms.

Figure 8:
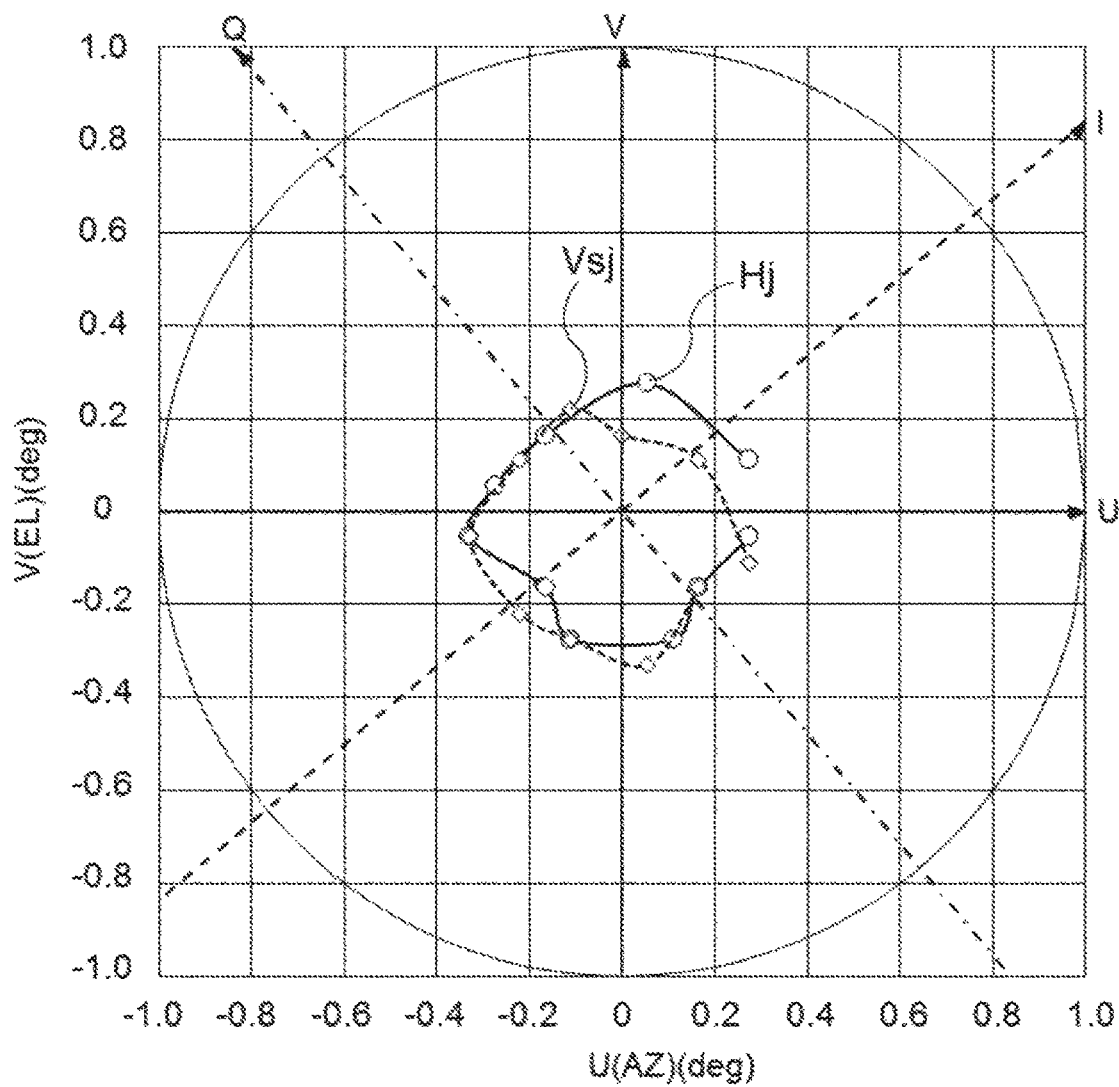
FIG. 8 is a diagram illustrating an example of a trajectory of a measurement angle error signal and actual measurement value of an orientation direction measured when the orientation direction is changed in order to calculate a correction parameter by the antenna control device according to Embodiment 1.

The first example is illustrated in FIG. 8 to FIG. 10. In the first example, the simulation conditions are as follows.

Phase correction value $\gamma=40°$
Sensitivity coefficient K=1
U-direction prediction value error Du=00
V-direction prediction value error Dv=0°

FIG. 8 illustrates a trajectory of actual measurement values Hj of the orientation direction of the antenna 1 and a trajectory of the measurement angle error vectors Vsj calculated from the sum signal and the difference signal in a case where the orbit prediction values are represented by a single point on the celestial sphere. In this figure, the orientation direction actual measurement value Hj is denoted by a solid line with white circles. The measurement angle error vector Vsj is denoted by a dashed-line with white rhombuses. Also displayed is the circle of 50% of the half width of the antenna 1 using dotted lines Since the pull-in possible range is 70% of the half width, the entire range illustrated in the figure is within the pull-in possible range.

Figure 9A:
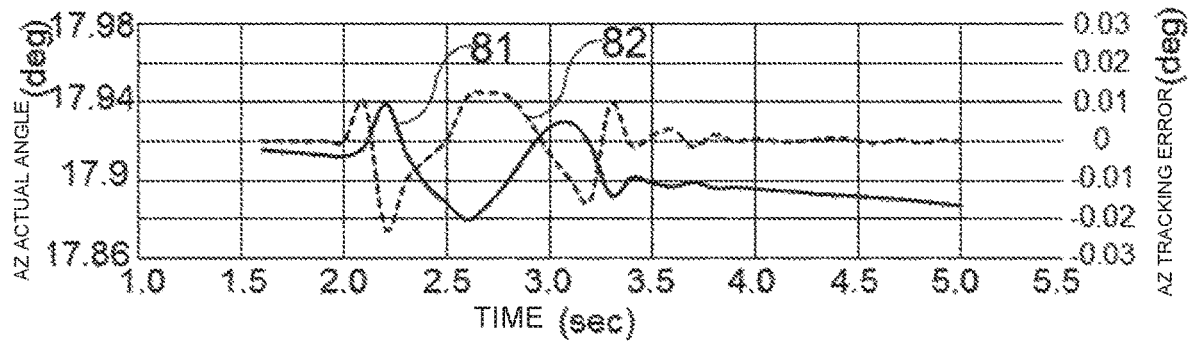
FIGS. 9A, 9B, 9C, 9D and 9E are diagrams illustrating temporal changes of measurement data in the case of FIG. 8.
Figure 9B:
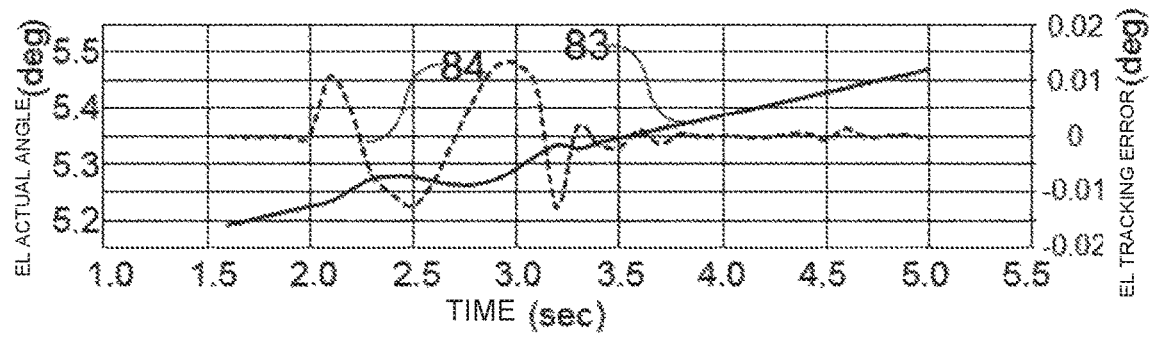
Figure 9C:
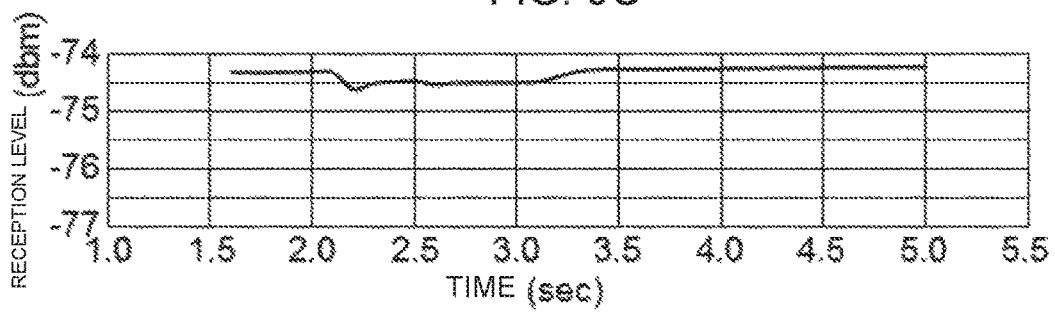
Figure 9D:
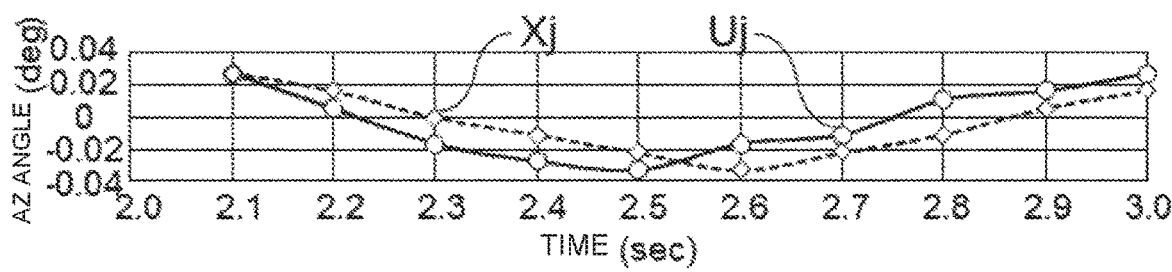
Figure 9E:
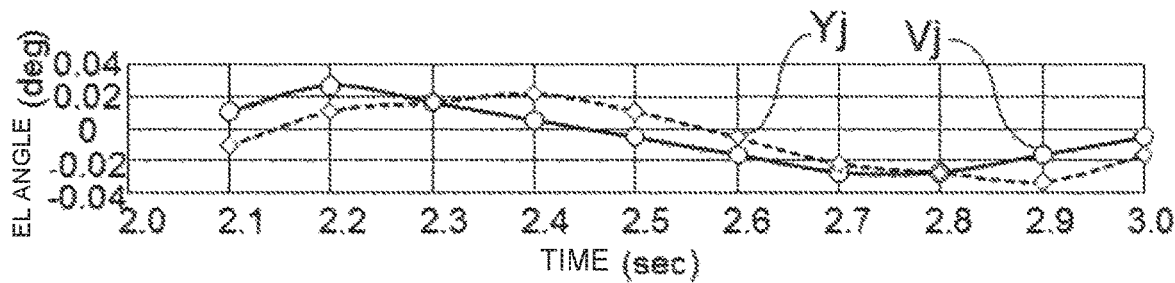
Figure 12A:
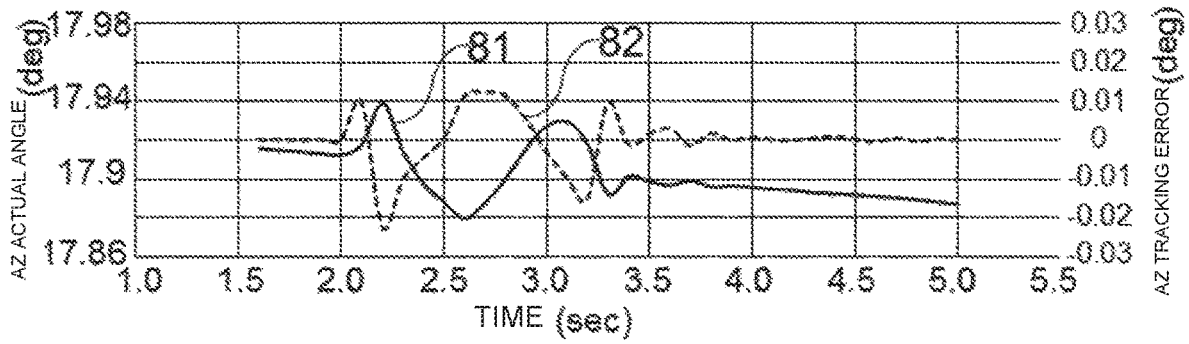
FIGS. 12A, 12B, 12C, 12D and 12E are a diagrams illustrating temporal changes of measurement data in the case of FIG. 11.
Figure 12B:
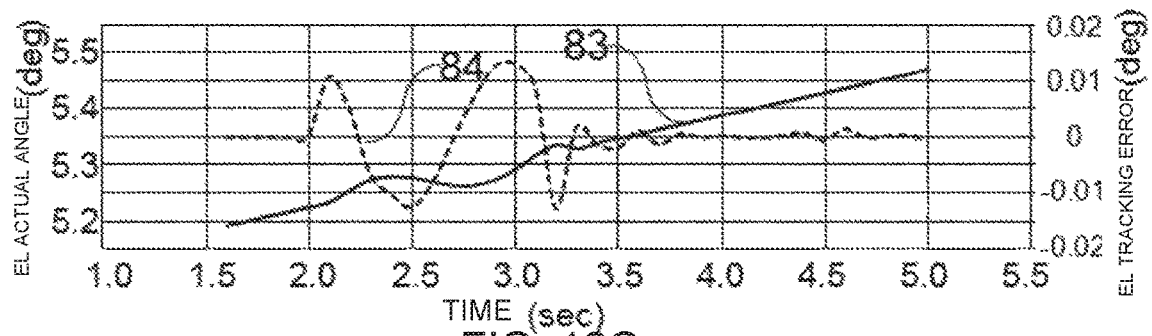
Figure 12C:
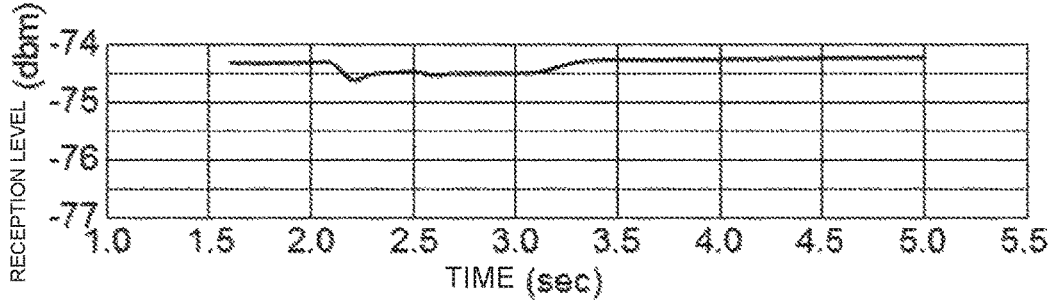
Figure 12D:
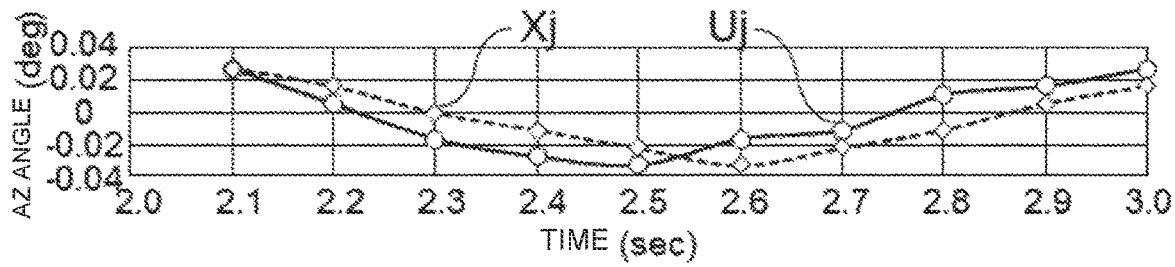
Figure 12E:
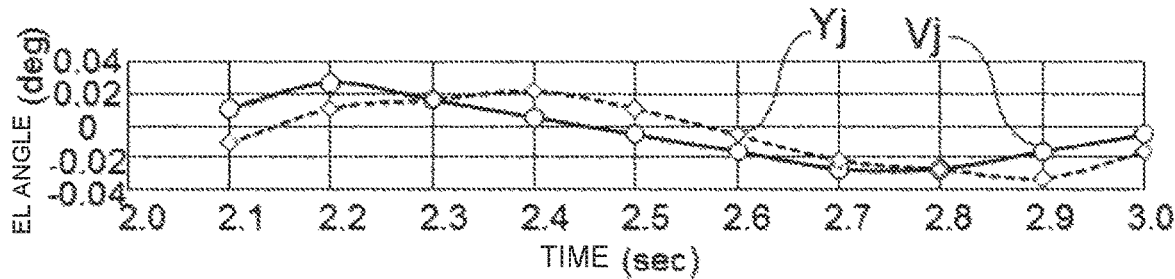

FIGS. 9A, 9B, 9C, 9D, and 9E are diagrams illustrating temporal changes of measurement data in the case of FIG. 8. The orientation direction is changed between 2 seconds and 3 seconds from the start of the simulation FIG. 9A illustrates temporal changes of an azimuth angle actual measurement value 81 and an azimuth angle servo system tracking error 82 FIG. 9B illustrates temporal changes of an elevation angle actual measurement value 83 and an elevation angle servo system tracking error 84. FIG. 9C illustrates temporal changes of the signal intensity of the sum signal FIG. 9D illustrates temporal changes of the azimuth angle actual measurement value Uj and the azimuth angle measurement angle error signal Xj. FIG. 9E illustrates temporal changes of the elevation angle actual measurement value Vj and the measurement angle error signal Yj.

The result of calculation by the correction value calculator 32 is as follows.

Phase correction value $\gamma=39.70°$
Sensitivity coefficient $K=0.975$
U-direction prediction value error $Du=-0.00269°$
V-direction prediction value error $Dv=0.00255°$ The trajectory of the post-correction measurement angle error vector Vaj corrected based on the measurement angle vector Vsj by using $\gamma$, K, Du, and Dv and the trajectory of the measurement angle error vector Vsj are illustrated m FIG. 10. The post-correction measurement angle error vector Vaj is denoted by a dash-dot line with black triangles. In FIG. 10, the actual measurement value Hj of the orientation direction is not shown for ease in viewing this figure.

Figure 13:
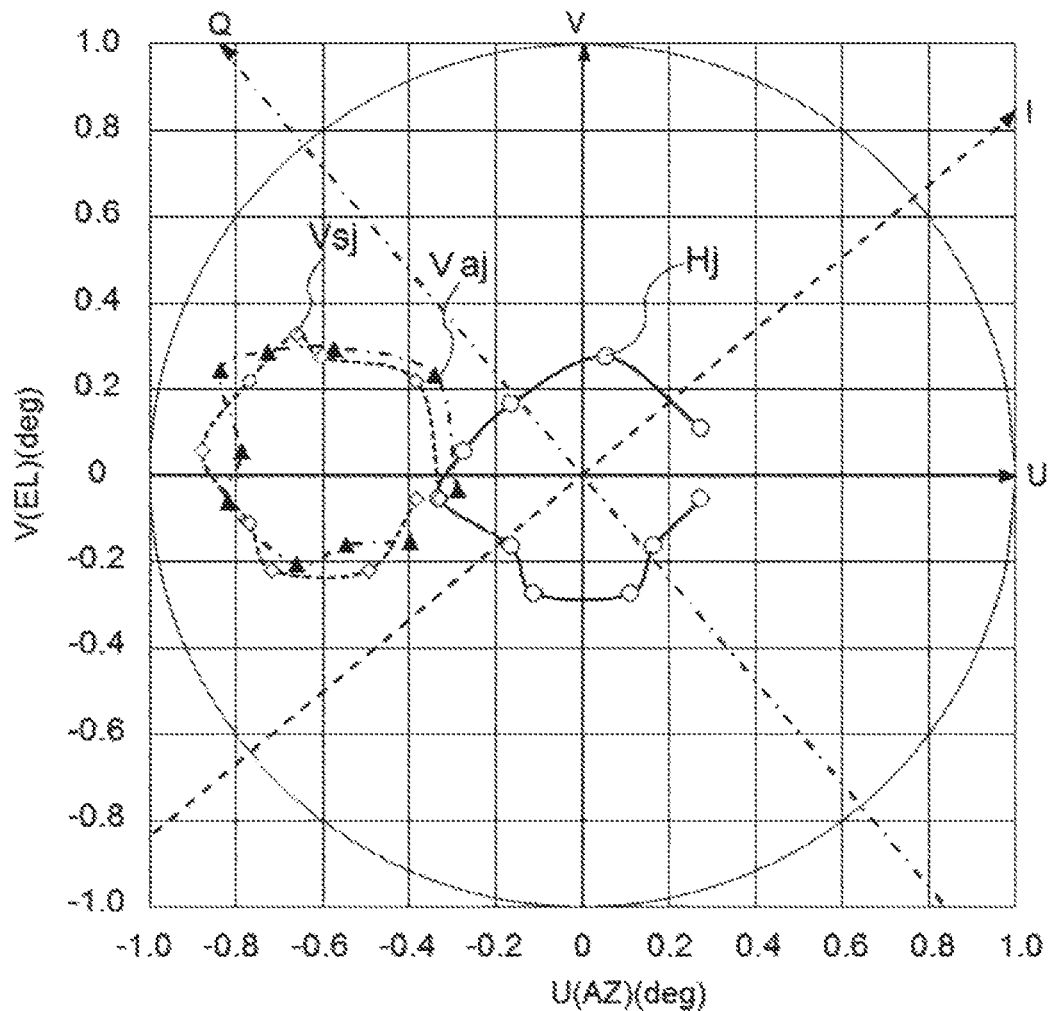
FIG. 13 is a illustrating a trajectory of the measurement angle error signal and the actual measurement value of the orientation direction, in the case of FIG. 11, corrected by the phase correction value and the sensitivity coefficient.

The second example is illustrated m FIG. 11 to FIG. 13. In the second example, the simulation conditions are as follows. FIG. 11 to FIG. 13 are expressed in a manner similar to that in FIG. 8 to 10. FIG. 13 also illustrates the actual measurement value Hj of the orientation direction.

Phase correction value $\gamma=400$
Sensitivity coefficient $K=1$
U-direction prediction value error $Du=0.05°$
V-direction prediction value error $Dv=0.03°$ The result of calculation by the correction value calculator 32 is as follows.

Phase correction value $\gamma=41.26°$
Sensitivity coefficient $K=0.978$
U-direction prediction value error $Du=0.04730°$
V-direction prediction value error $Dv=0.03306°$ In FIG. 11, since the prediction value error exists, the trajectory of the orientation direction actual measurement value Hj and the trajectory of the measurement angle error vector Vsj are apart from each other. In FIG. 13, Vaj and Vsj are close to each other.

After performing S08, or, if calculation of γ is performed in S05, automatic tracking is started and the toggle switch 29 is set to the automatic tracking side in step S09. In step S10, the tracking controller 33 calculates command value obtained by adding the measurement angle error signals X and Y to the orbit prediction value and then outputs the command value to the antenna drive controller 27.

In a case where the tracking controller 33 is in operation, that is, during automatic tracking, the oscillation detector 36 checks periodically in step S11 whether or not automatic tracking is oscillating. Oscillation refers to a phenomenon where the orientation direction changes periodically as illustrated in FIG. 14 and FIG. 16. For example, in a case where the difference between the orbit prediction value and the orientation direction actual measurement value with respect to the azimuth angle or the elevation angle is greater than or equal to a predetermined threshold, it is determined that there is oscillation. Other methods may be used for detecting oscillation. Any method may be used as a method for detecting oscillation, as long as the method can determine that the azimuth angle or the elevation angle fluctuates with respect to an orbit prediction value.

If oscillation is detected, the oscillation cause determiner 37, in step S12, activates the error measurement data generator 31 and the correction value calculator 32 multiple times to calculate multiple pieces of the phase correction value γ and the sensitivity coefficient K. In step S13, a check is performed as to whether or not phase shift is the cause of the oscillation. Phase shift is a state in which the phase correction cannot be accurately performed using the phase correction value γ, because phase of the measurement angle signal is shifted and causes oscillation. A condition for determining that the oscillation is caused by phase shift is, for example, a condition in which the multiple calculated phase correction values γ are within range not including zero degrees and having a predetermined width. The oscillation cause determiner 37 is a phase shift detector that determines that phase shift is occurring when multiple calculated phase correction values γ calculated while the tracking controller is in operation are within range not including zero degrees and having the predetermined width.

In the case where the multiple calculated phase correction values γ are within the range not including zero degrees and having the predetermined width, it is determined that oscillation is occurring due to phase shift. In a case where the multiple calculated phase correction values are within a predetermined range including zero degrees, it is understood that phase correction value γ is not shifted. Also, in a case where the phase correction value γ fluctuates beyond the predetermined width, it can be considered that oscillation is occurring due to another factor and that the phase correction value γ is fluctuating under the influence of the oscillation.

If it is determined that the oscillation is caused by phase shift (YES in S13), the correction value updater 38, in step S14, updates the phase correction value γ as illustrated in Equation (1), and stores the phase correction value γnew into the data storage 34 and the data storage 23. The correction value updater 38 is a phase correction value updater that updates the phase correction value when the oscillation cause determiner 37 detects phase shift.

If it is not determined that the oscillation is caused by phase shift (NO in S13), in step S15, a check is performed as to whether or not the oscillation is caused by sensitivity shift. Sensitivity shift is a state in which correction cannot be accurately performed using the sensitivity coefficient K due to the shift in the sensitivity coefficient of the measurement angle error signal. A condition for determining that the oscillation is caused by sensitivity shift is, for example, a condition in which multiple calculated sensitivity coefficients K are within a range not including 1 and having a predetermined width. In the case where the multiple calculated sensitivity coefficients K are within a predetermined range not including 1, it is determined that oscillation is occurring due to sensitivity shift. In a case where the multiple calculated sensitivity coefficients K are within a predetermined range including 1, it is understood that the sensitivity coefficient K is not shifted. Also, in a case where the sensitivity coefficient K fluctuates beyond the predetermined width, it can be considered that oscillation is occurring due to another factor and that the sensitivity coefficient K is fluctuating under the influence of oscillation. The oscillation cause determiner 37 is a sensitivity shift detector that detects sensitivity shift when multiple sensitivity coefficients K calculated while the tracking controller is in operation are within range not including 1 and having the predetermined width.

If it is determined that the oscillation is caused by sensitivity shift (YES in S15), the correction value updater 38, in step S16, updates the sensitivity coefficient K as illustrated in Equation (2), and stores the sensitivity coefficient Knew into the data storage 34 and the data storage 23. The correction value updater 38 is a sensitivity coefficient updater that updates the sensitivity coefficient when the oscillation cause determiner 37 detects sensitivity shift.

If it is not determined that the oscillation is caused by sensitivity shift NO in S15), the cause is unknown, and thus the mode is changed to program tracking in step S17. An impact on the communication quality caused by a deviation between the moving object 10 and the orientation direction during program tracking depends on the accuracy of the orbit prediction value and the orientation accuracy inherent to the antenna 1. The communication quality can be determined on the basis of, for example, whether a bit error rate generated by the signal receiver 7 satisfies a requirement criterion. Although processing is ended after step S17, what this means is that processing in the case where oscillation occurs is ended by the setting to program tracking. The tracking continues.

Also, if a correction parameter used when the moving object 10 has been tracked at the frequency currently in use is already saved, the saved correction parameter may be used to resume automatic tracking. If the saved correction parameter is used, the saved correction parameter is set in the data storage 34 and the data storage 23. If the moving object 10 is captured, the toggle switch 29 switches to the automatic tracking side.

Figure 15A:
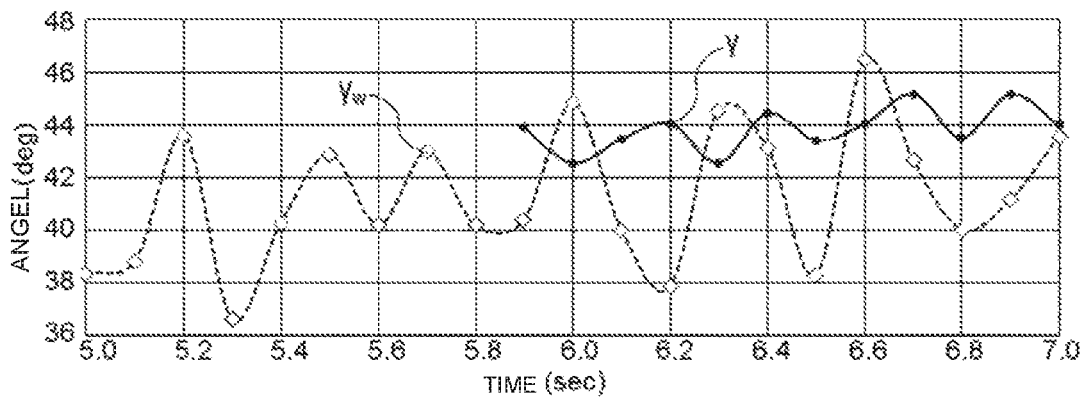
FIGS. 15A and 15B are diagrams illustrating temporal changes of the phase correction value and the sensitivity coefficient for the case illustrated in FIG. 14.
Figure 15B:
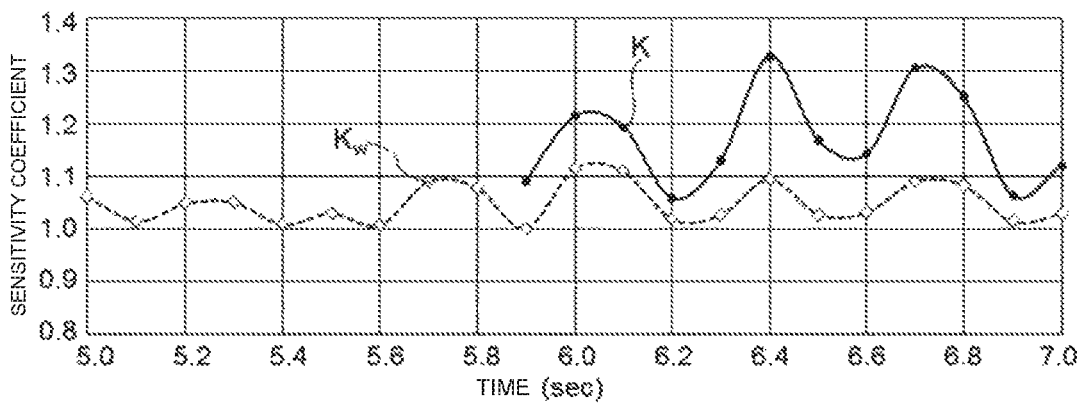

FIG. 14 and FIGS. 15A and 15B illustrate the simulation results in the case where oscillation occurred due to phase shift. FIG. 14 is a diagram illustrating temporal changes of actual measurement values of the azimuth angle and the elevation angle. The solid line with black dots denotes the azimuth angle (AZ) and the dash-dot line with white triangles denotes the elevation angle (EL). FIGS. 15A and 15B illustrate temporal changes of the phase correction value γ and the sensitivity coefficient K FIG. 15A illustrates temporal changes of the phase correction value γ. FIG. 15B illustrates temporal changes of the sensitivity coefficient K. The solid line with the black dots denotes the phase correction value γ and the sensitivity coefficient K that are corrected in the present disclosure. The dashed line with white diamonds denotes the phase correction value γw and the sensitivity coefficient Kw that are calculated by that in Patent Literature 3.

At 5 seconds from the start of the simulation, an existence of an oscillation is detected. Measurement of the actual measurement value of the orientation direction of the antenna 1 is started to measure in every 0.1 seconds. Since it is set that the sample number N=10, the phase correction value γ can be calculated from 5.9 seconds. The method of Patent Literature 3 can calculate the phase correction value γw from 5 seconds. The phase correction value γ fluctuates less than the phase correction value γw, and it can be recognized that the phase correction value γ can be calculated more accurately. If the predetermined width at which the phase correction value γ is determined to be fluctuating is 5 degrees, it can be determined that the phase correction value γ is not fluctuating. However, the phase correction value pw calculated using the method of Patent Literature 3 is determined to be fluctuating. The sensitivity coefficient K fluctuates somewhat more than the sensitivity coefficient Kw.

Figure 17A:
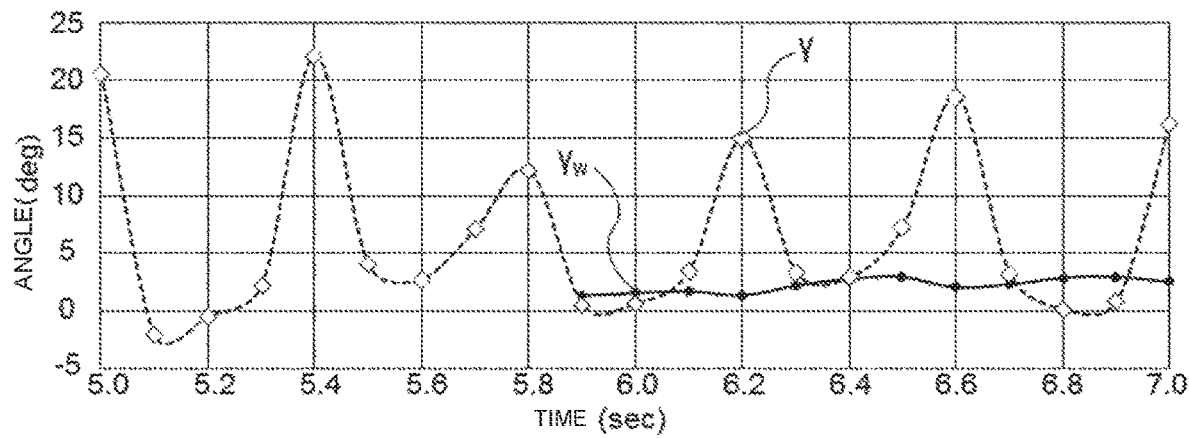
FIGS. 17A and 17B are diagrams illustrating temporal changes of the phase correction value for the case illustrated in FIG. 16.
Figure 17B:
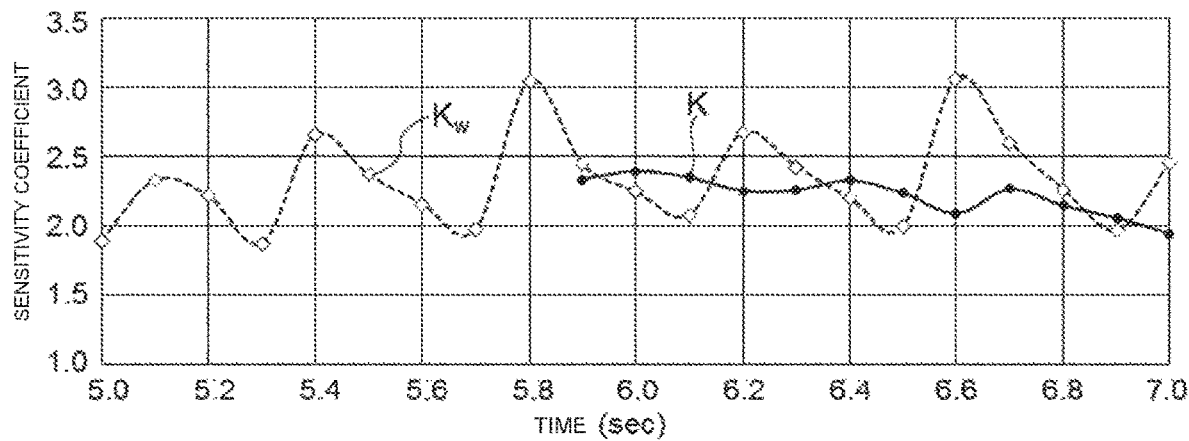

FIG. 16 and FIGS. 17A and 17B illustrate the simulation results in a case where oscillation occurred due to the shift in sensitivity coefficient K. FIG. 16 is similar to FIG. 14. FIGS. 17A and 17B illustrated temporal changes of the phase correction value γ and the sensitivity coefficient K. FIG. 17A is a diagram illustrating temporal changes of the phase correction value. FIG. 17B is a diagram illustrating temporal changes of the sensitivity coefficient K. The phase correction value γ fluctuates less than the phase correction value γw, and it can be recognized that the phase correction value γ can be calculated more accurately. The sensitivity coefficient K also fluctuates less than the sensitivity coefficient Kw.

For the phase correction value γ, all of the calculated phase correction values γ are within a 5 degree range including 0 degrees. It is not determined that the phase correction value γ is shifted. The phase correction value γw is fluctuating by over 20 degrees. In a case where the phase correction value γw is used, it is not determined that there is oscillation caused by the shift of the phase correction value γw.

The sensitivity coefficient K is in a range from approximately 2.0 to approximately 2.5. The sensitivity coefficient Kw caused by the method of Patent Literature 3 is in a range of approximately 1.9 to approximately 3.0. A term referred to as the fluctuation width indicates the ratio of the largest value of the calculated sensitivity coefficients divided by the smallest value of the calculated sensitivity coefficients. If it is determined that the sensitivity coefficient K is fluctuating on the condition of the fluctuation width being, for example, greater than or at 130%, it can be determined that the sensitivity coefficient is not fluctuating. The threshold with respect to the fluctuation width such as 130% is determined in advance. The sensitivity coefficient Kw calculated using the method in Patent Literature 3 is determined to be fluctuating. The fluctuation width may be a value obtained by dividing the largest value of the calculated sensitivity coefficients by an average value of the calculated sensitivity coefficients. Alternatively, the value may be obtained by dividing the average value of the calculated sensitivity coefficients by the smallest value of the calculated sensitivity coefficients. The fluctuation width may be calculated any way as long as the magnitude of fluctuation of the sensitivity coefficients can be expressed.

In Embodiment 1, the phase adjustment and sensitivity adjustment can be automatically performed before the starting of tracking of the moving object. Therefore, erroneous operation due to human error can be prevented and work efficiency can be enhanced.

It can be understood that the present disclosure provides more accurate calculation of the phase correction value and the sensitivity coefficient than method described in Patent Literature 3 even in a case where the signal-to-noise ratio of the difference signal is low. In the case where oscillation occurs, it can be determined whether the oscillation is caused by phase shift or sensitivity shift, and if the cause is phase shift, the oscillation can be eliminated by updating the phase correction value. If the cause is sensitivity shift, the oscillation can be eliminated by updating the sensitivity coefficient.

In the present disclosure, since the phase correction value and the sensitivity coefficient can be calculated accurately even when the signal-to-noise ratio of the difference signal is low, the measurement angle error signals can be calculated more accurately than conventional methods, and thus the communication counterpart can be tracked accurately.

Although the phase correction value γ and the sensitivity coefficient K are both calculated, only the phase correction value γ may be calculated. In the case where only the phase correction value γ is calculated, a predetermined value or a value of 1 is used for the sensitivity coefficient K.

The error function E is a sum of squares of post-correction residuals for N pieces of the error measurement data. Each of the post-correction residuals used in the error function E is the difference between the arrival direction error and the actual measurement value error corrected based on the phase correction value and the sensitivity coefficient. The error function E2 is the sum of squares of post-correction residuals for N pieces of the error measurement data. Each of the post-correction residuals used in the error function E2 is the difference between the actual measurement value error and the arrival direction error corrected based on the phase correction value and the sensitivity coefficient. Alternatively, the phase correction value and the sensitivity coefficient may be obtained by correcting one of the actual measurement value error and the arrival direction error by each of the phase correction value and the sensitivity coefficient, and by minimizing the sum of squares of post-correction residuals for N pieces of the error measurement data. An example of correcting one of the actual measurement value error and the arrival direction error by each of the phase correction value and the sensitivity coefficient, is a case where the actual measurement value error is corrected based on the phase correction value, and the arrival direction error is corrected based on the sensitivity coefficient.

A correction parameter other than the phase correction value and the sensitivity coefficient may be used for performing the correction. Examples as additional correction parameters include orthogonality and the sensitivity coefficient set as having different values for the azimuth angle direction and the elevation angle direction. Orthogonality expresses degree of a difference from 90 degrees the phase difference between the I-axis and the Q-axis that are used for generating the measurement angle error signals X and Y from the sum signal and the difference signal.

The aforementioned description is also applicable to other embodiments.

Embodiment 2

Figure 18:
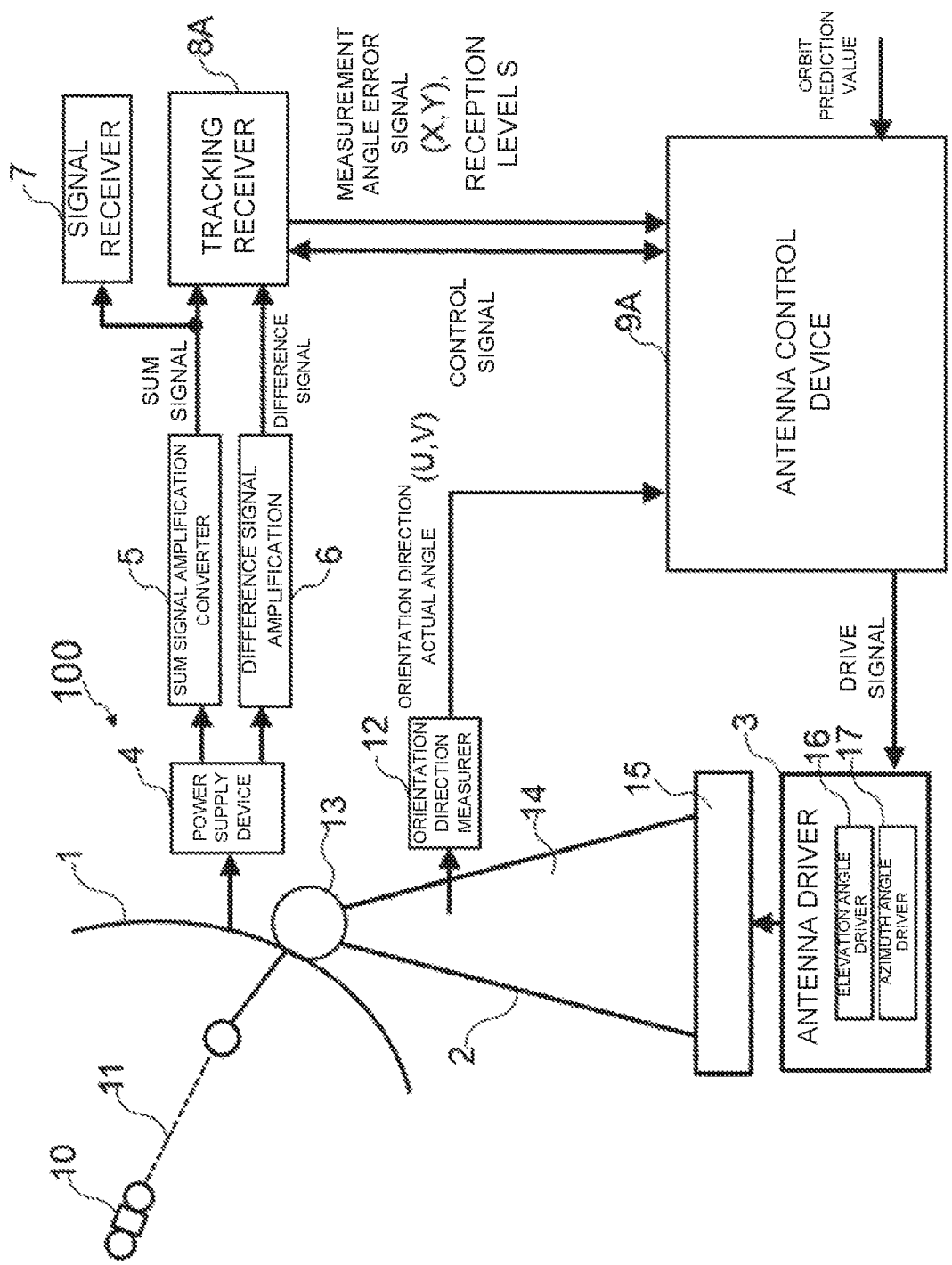
FIG. 18 is a diagram illustrating a configuration of an antenna system including an antenna control device according to Embodiment 3 of the present disclosure.
Figure 19:
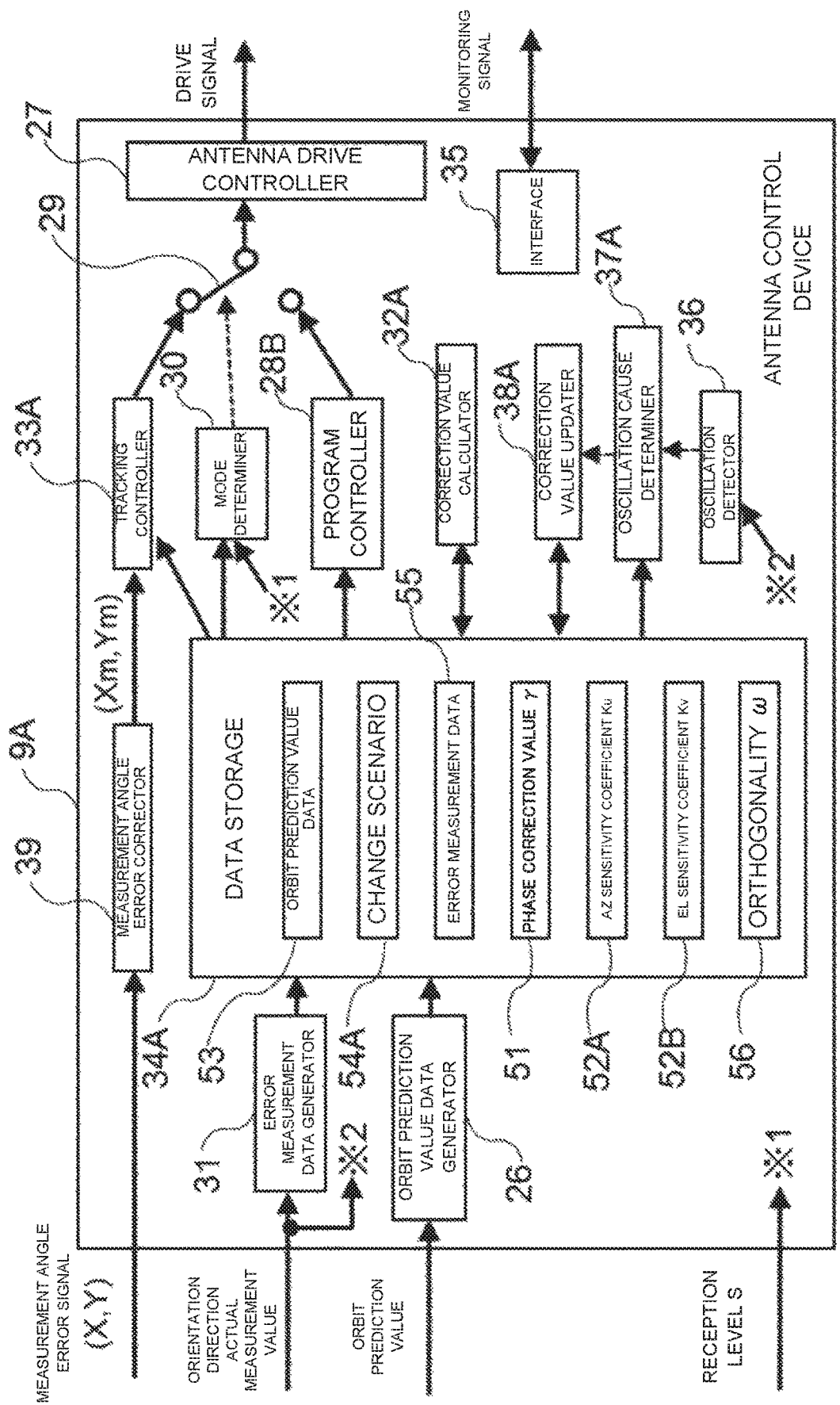
FIG. 19 is a block diagram illustrating a configuration of the antenna control device according to Embodiment 2.

Embodiment 2 is obtained by modifying Embodiment 1 such that a case where detection axes used for performing quadrature detection on the measurement angle error signals X and Y is not orthogonal is taken into account and a case where the sensitivity coefficient is set to be different for AZ and EL is also taken into account. Also, the coordinate converter 24 of the tracking receiver 8 is set such that substantially no coordinate conversion is performed. A tracking receiver that is not equipped with a coordinate converter is also applicable to Embodiment 2. FIG. 18 is a diagram illustrating a configuration of an antenna system including an antenna control device according to Embodiment 2 of the present disclosure. FIG. 19 is a block diagram illustrating a configuration of the antenna control device according to Embodiment 2. An antenna control device 9A that is included in an antenna system 100A additionally includes a measurement angle error corrector 39, and a correction value calculator 32A, a tracking controller 33A, and a data storage 34A are modified.

The measurement angle error corrector 39 performs corrections to the measurement angle error signals, which is performed by the coordinate converter 24 included in the tracking receiver 8. Therefore, the phase correction value $\gamma$ is set to zero degrees and the sensitivity coefficient K is set to 1 in the data storage 23 included in the tracking receiver 8. By setting the values in this manner, it can be made equivalent to the case in which the coordinate converter 24 do nothing. Thus, it is unnecessary for the antenna control device 9A to set and change the phase correction value $\gamma$ and the sensitivity coefficient K in the data storage 23. In a case where the coordinate converter 24 can perform the same conversion as the measurement angle error corrector 39, the data is stored in the data storage 23 and the coordinate converter 24 can perform the conversion using the data stored in the data storage 23. Also, in this case, the antenna control device 7A may not be equipped with the measurement angle error corrector 39.

The data storage 34A stores an AZ sensitivity coefficient 52A and an EL sensitivity coefficient 52B instead of storing the sensitivity coefficient 52 and also stores the orthogonality 56. The AZ sensitivity coefficient 52A is an azimuth angle sensitivity coefficient that is a sensitivity coefficient for the azimuth angle direction. The EL sensitivity coefficient 52B is an elevation sensitivity coefficient that is a sensitivity coefficient for the elevation angle direction. The orthogonality 56 expresses degree of a difference from 90 degrees the phase difference between the I-axis and the Q-axis that are used for generating the measurement angle error signals X and Y from the sum signal and the difference signal. That is, the orthogonality 56 expresses the difference between (i) the angle between the I-axis and the Q-axis that are two axes where quadrature detection is performed on the measurement angle error signals X and Y and (ii) 90 degrees. By using the AZ sensitivity coefficient 52A and the EL sensitivity coefficient 52B, the radiation pattern of the main lobe of the radio wave that is received by the antenna 1 can be expressed also in a case where the radiation pattern is determined by parameters having different values for azimuth angle and elevation angle.

The AZ sensitivity coefficient 52A, the EL sensitivity coefficient 52B, and the variables representing orthogonality 56 are defined as follows.

- $\omega$: Variable representing orthogonality. Is half of the value obtained by subtracting (i) the angle difference between the I-axis and the Q-axis from (ii) 90 degrees.
- $\alpha 1$: Rotational angle relative to the U-axis of the I-axis. $\alpha 1 = \gamma + \omega$
- $\alpha 2$: Rotational angle relative to the V-axis of the Q-axis. $\alpha 2 = \gamma - \omega$
- Ku: Variable representing the AZ sensitivity coefficient.
- Kv: Variable representing the EL sensitivity coefficient.

Figure 20A:
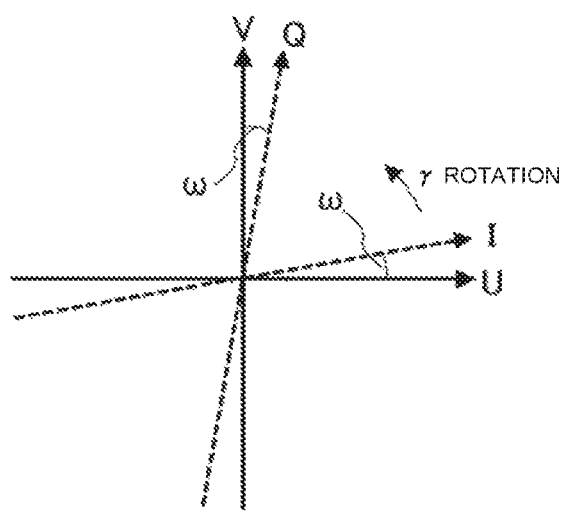
FIGS. 20A and 20B are diagrams illustrating relationships between drive axes of the antenna and detection axes of the tracking receiver.
Figure 20B:
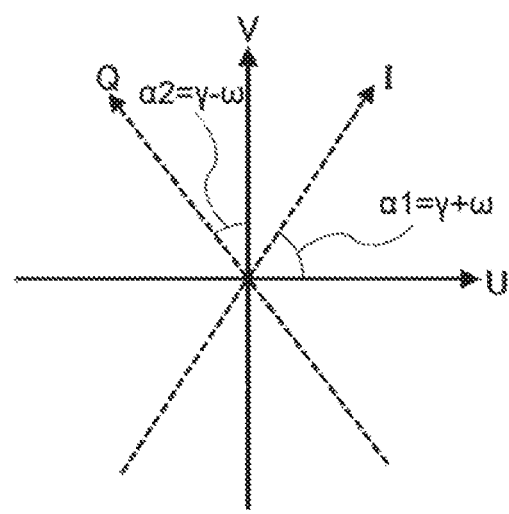

The coordinate conversion using the orthogonality w and the phase correction value $\gamma$ is illustrated in FIGS. 20A and 20B. FIG. 20A illustrates a case where the orthogonality $\omega$ between IQ axes and the UV axes is changed. In the case where $45°>\omega>00$, the I-axis exists above the U-axis in the first quadrant and the Q-axis exists to the right of the V-axis. FIG. 20B illustrates a state in which the state shown in FIG. 20A is rotated by phase correction value $\gamma$.

The calculation equations of Xfj and Yfj using the orthogonality $\omega$, the phase correction value, the AZ sensitivity coefficient Ku, and the EL sensitivity coefficient Kv are as follows.

[Mathematical Formula 8]

$$\begin{bmatrix} Xfj \\ Yfj \end{bmatrix} = \frac{1}{\cos(2\omega)} \begin{bmatrix} Ku*\cos(\gamma+\omega) & Kv*\sin(\gamma-\omega) \\ -Ku*\sin(\gamma+\omega) & Kv*\cos(\gamma-\omega) \end{bmatrix} \begin{bmatrix} Du-Uj \\ Dv-Vj \end{bmatrix} \quad (41)$$

$$\begin{bmatrix} Du-Uj \\ Dv-Vj \end{bmatrix} \begin{bmatrix} \cos(\gamma-\omega)/Ku & -\sin(\gamma-\omega)/Ku \\ \sin(\gamma+\omega)/Kv & \cos(\gamma+\omega)/Kv \end{bmatrix} \begin{bmatrix} Xfj \\ Yfj \end{bmatrix} \quad (42)$$

The measurement angle error corrector 39 corrects the measurement angle error signals by using the correction parameters $\gamma$, $\omega$, Ku, and Kv. For the purpose of illustrating the operation of the measurement angle error corrector 39, the following variables are defined.

Xm: The measurement angle error signal X corrected by the measurement angle error corrector 39.

Ym: The measurement angle error signal Y corrected by the measurement angle error corrector 39.

The measurement angle error corrector 39 corrects the measurement angle error signals expressed by the following equation.

[Mathematical Formula 10]

$$\begin{bmatrix} Xm \\ Ym \end{bmatrix} = \begin{bmatrix} \cos(\gamma-\omega)/Ku & -\sin(\gamma-\omega)/Ku \\ \sin(\gamma+\omega)/Kv & \cos(\gamma+\omega)/Kv \end{bmatrix} \begin{bmatrix} X \\ Y \end{bmatrix} \quad (43)$$

The tracking controller 33A calculates a command value obtained by adding (i) the change caused by the orbit prediction value and (ii) the measurement angle error signals Xm and Ym corrected by the measurement angle error corrector 39 to (iii) the orientation direction actual measurement value.

The correction value calculator 32A calculates Xfj and Yfj using Equation (41) and determines the correction parameters ($\gamma$, $\omega$, Ku, and Kv, Du. and Dv) such that the error function E defined by Equation (29) is minimized. Since there are six correction parameters, the number N of the error measurement data 55 is greater than or equal to four pieces. The greater N is, the more accurate calculation of the correction parameters becomes.

By substituting Equation (30) with Equation (41), the following is obtained.

$$E = \Sigma(Xj^2 + Yj^2) - \quad (44)$$
$$2 \times Ku \times \cos^{-1}(2\omega) \times \Sigma(Du-Uj) \times (Xj \times \cos(\gamma+\omega) - Yj \times \sin(\gamma+\omega)) -$$
$$2 \times Kv \times \cos^{-1}(2\omega) \times \Sigma(Dv-Vj) \times (Xj \times \sin(\gamma-\omega) + Yj \times \cos(\gamma-\omega)) +$$
$$(1+\sin(2\gamma) \times \sin(2\omega)) \times Ku^2 \times \Sigma(Du-Uj)^2 +$$
$$(1-\sin(2\gamma) \times \sin(2\omega)) \times Kv^2 \times \Sigma(Dv-Vj)^2 -$$
$$2 \times \sin(2\omega) \times Ku \times Kv \times \Sigma(Du-Uj) \times (Dv-Vj)) \times \cos^{-2}(2\omega)$$

To simplify the equation, Ku and Kv are replaced as follows.

$$Ku = Ku/\cos(2\omega) \tag{45}$$

$$Kv = Kv/\cos(2\omega) \tag{46}$$

Equation (44) is substituted with Equation (45) and Equation (46) as follows. Equation (44) may be used without substituting with Equation (45) and Equation (46).

$$E = \Sigma(Xj^2 + Yj^2) - \tag{44A}$$
$$2 \times Ku \times \Sigma(Du - Uj) \times (Xj \times \cos(\gamma + \omega) - Yj \times \sin(\gamma + \omega)) -$$
$$2 \times Kv \times \Sigma(Dv - Vj) \times (Xj \times \sin(\gamma - \omega) + Yj \times \cos(\gamma - \omega)) +$$
$$(1 + \sin(2\gamma) \times \sin(2\omega)) \times Ku^2 \times \Sigma(Du - Uj)^2 +$$
$$(1 - \sin(2\gamma) \times \sin(2\omega)) \times Kv^2 \times \Sigma(Dv - Vj)^2 -$$
$$2 \times \sin(2\omega) \times Ku \times Kv \times \Sigma(Du - Uj) \times (Dv - Vj)$$

To express Equation (44A) as an equation without $\Sigma$, the following additional variables are defined.

$$r0 = \sqrt{(x0^2 + y0^2)}.$$

$$\varphi = \sin^{-1}(y0/r0).$$

$$ws0 = \Sigma\Sigma(uj \times vj - u0 \times v0)/N.$$

Equation (44A) becomes as follows.

$$E = N \times (xs0 + ys0) - 2N \times Ku \times \tag{44B}$$
$$((Du - u0) \times r0 \times \cos(\varphi + \gamma + \omega) + d0 \times \cos(\gamma + \omega) - e0 \times \sin(\gamma + \omega)) -$$
$$2N \times Kv \times ((Dv - v0) \times r0 \times \sin(\varphi + \gamma - \omega) +$$
$$f0 \times \sin(\gamma - \omega) + g0 \times \cos(\gamma - \omega)) +$$
$$N \times Ku^2 \times ((Du - u0)^2 + us0) \times (1 + \sin(2\gamma) \times \sin(2\omega)) +$$
$$N \times Kv^2 \times ((Dv - v0)^2 + vs0) \times (1 - \sin(2\gamma) \times \sin(2\omega)) -$$
$$2 \times N \times Ku \times Kv \times ((Du - u0) \times (Dv - v0) + ws0) \times \sin(2\omega)$$

Equation (44B) is complex in comparison to Equation (31A) and cannot be solved analytically based on an equation such as $\delta E/\delta \gamma = 0$. In the case where $\omega \neq 0$ and $Ku \neq Kv$, approximate values are calculated by assigning initial values to $\gamma$, $\omega$, Ku, Kv, Du, and Dv and by correcting the parameters by way of repeated calculation.
The following variables are defined.
Xlj: Xfj obtained before this time calculation.
Ylj: Yfj obtained before this time calculation.
$\Delta xxj$: Error of Xlj remained before this time calculation. Treated as a constant. $\Delta xxj = Xj - Xlj$.
$\Delta yyj$: Error of Xlj remained before this time calculation. Treated as a constant. $\Delta yyj = Yj - Ylj$.
($\Delta \omega$, $\Delta \gamma$, $\Delta Ku$, $\Delta Kv$, $\Delta Du$, $\Delta Dv$): The change in correction parameters to be calculated this time.
$\Delta xj$: Change of Xfj caused by the change of the correction parameters.
$\Delta yj$: Change of Yfj caused by the change of the correction parameters.
$\Delta G$: Error function for defining the change in the correction parameters.

$$\Delta G = \Sigma((\Delta xj - \Delta xj)^2 + (\Delta yyj - \Delta yj)^2)$$

An equation of a partial derivative of $\Delta G$ with respect to a is as follows.

$$\delta \Delta G/\delta \omega = -2\Sigma((\Delta xxj - \Delta xj)\delta \Delta xj/\delta \omega + (\Delta yyj - \Delta yj)\delta yj/\delta \omega) \tag{47}$$

Here, $\delta \Delta Xj/\delta \omega = \delta Xfj/\delta \omega$, for example, is established. From $\delta \Delta G/\delta \omega = 0$, the following is obtained.

$$\Sigma((\Delta xj)\partial \Delta xj/\partial \omega + (\Delta yj)\partial \Delta yj/\partial \omega) = \tag{48}$$
$$\Sigma((\Delta xxj)\partial \Delta xj/\partial \omega + (\Delta yyj)\partial \Delta yj/\partial \omega)$$

Here, the following is established in relation to $\Delta xj$ and $\Delta yj$.

$$\Delta xj = (\partial \Delta xj/\partial \omega)\Delta \omega + (\partial \Delta xj/\partial \gamma)\Delta \gamma + (\partial \Delta xj/\partial Ku)\Delta Ku + \tag{49}$$
$$(\partial \Delta xj/\partial Kv)\Delta Kv + (\partial \Delta xj/\partial Du)\Delta Du + (\partial \Delta xj/\partial Dv)\Delta Dv$$
$$\Delta yj = (\partial \Delta yj/\partial \omega)\Delta \omega + (\partial \Delta yj/\partial \gamma)\Delta \gamma + (\partial \Delta yj/\partial Ku)\Delta Ku + \tag{50}$$
$$(\partial \Delta yj/\partial Kv)\Delta Kv + (\partial \Delta yj/\partial Du)\Delta Du + (\partial \Delta yj/\partial Dv)\Delta Dv$$

By substituting the left side of Equation (48) with Equation (49) and Equation (50), the following is obtained.

$$\Delta \omega \sum \left\{(\partial \Delta xj/\partial \omega)^2 + (\partial \Delta yj/\partial \omega)^2\right\} + \tag{51}$$
$$\Delta \gamma \sum ((\partial \Delta xj/\partial \omega)(\partial \Delta xj/\partial \gamma) + (\partial \Delta yj/\partial \omega)(\partial \Delta yj/\partial \gamma)) +$$
$$\Delta Ku \sum ((\partial \Delta xj/\partial \omega)(\partial \Delta xj/\partial Ku) + (\partial \Delta yj/\partial \omega)(\partial \Delta yj/\partial Ku)) +$$
$$\Delta Kv \sum ((\partial \Delta xj/\partial \omega)(\partial \Delta xj/\partial Kv) + (\partial \Delta yj/\partial \omega)(\partial \Delta yj/\partial Kv)) +$$
$$\Delta Du \sum ((\partial \Delta xj/\partial \omega)(\partial \Delta xj/\partial Du) + (\partial \Delta yj/\partial \omega)(\partial \Delta yj/\partial Du)) +$$
$$\Delta Dv \sum ((\partial \Delta xj/\partial \omega)(\partial \Delta xj/\partial Dv) + (\partial \Delta yj/\partial \omega)(\partial \Delta yj/\partial Dv)) =$$
$$\sum ((\Delta xxj)\partial \Delta xj/\partial \omega + (\Delta yyj)\partial \Delta yj/\partial \omega)$$

Likewise, for $\gamma$, the following equation can be derived from $\delta \Delta G/\delta \gamma = 0$ $$\Delta \omega \sum ((\partial \Delta xj/\partial \omega)(\partial \Delta xj/\partial \gamma) + (\partial \Delta yj/\partial \omega)(\partial \Delta yj/\partial \gamma)) + \tag{52}$$
$$\Delta \gamma \sum \left\{(\partial \Delta xj/\partial \gamma)^2 + (\partial \Delta yj/\partial \gamma)^2\right\} +$$
$$\Delta Ku \sum ((\partial \Delta xj/\partial \gamma)(\partial \Delta xj/\partial Ku) + (\partial \Delta yj/\partial \gamma)(\partial \Delta yj/\partial Ku)) +$$
$$\Delta Kv \sum ((\partial \Delta xj/\partial \gamma)(\partial \Delta xj/\partial Kv) + (\partial \Delta yj/\partial \gamma)(\partial \Delta yj/\partial Kv)) +$$
$$\Delta Du \sum ((\partial \Delta xj/\partial \gamma)(\partial \Delta xj/\partial Du) + (\partial \Delta yj/\partial \gamma)(\partial \Delta yj/\partial Du)) +$$
$$\Delta Dv \sum ((\partial \Delta xj/\partial \gamma)(\partial \Delta xj/\partial Dv) + (\partial \Delta yj/\partial \gamma)(\partial \Delta yj/\partial Dv)) =$$
$$\sum ((\Delta xxj)\partial \Delta xj/\partial \gamma + (\Delta yyj)\partial yj/\partial \gamma)$$

Likewise, for Ku, the following equation can be derived from $\delta \Delta G/\delta Ku = 0$ $$\Delta \omega \sum ((\partial \Delta xj/\partial \omega)(\partial \Delta xj/\partial Ku) + (\partial \Delta yj/\partial \omega)(\partial \Delta yj/\partial Ku)) + \tag{53}$$
$$\Delta \gamma \sum ((\partial \Delta xj/\partial \gamma)(\partial \Delta xj/\partial Ku) + (\partial \Delta yj/\partial \gamma)(\partial \Delta yj/\partial Ku)) +$$
$$\Delta Ku \sum \left\{(\partial \Delta xj/\partial Ku)^2 + (\partial \Delta yj/\partial Ku)^2\right\} +$$

-continued $$\Delta Kv \sum ((\partial \Delta xj/\partial Ku)(\partial \Delta xj/\partial Kv) + (\partial \Delta yj/\partial Ku)(\partial \Delta yj/\partial Kv)) +$$

$$\Delta Du \sum ((\partial \Delta xj/\partial Ku)(\partial \Delta xj/\partial Du) + (\partial \Delta yj/\partial Ku)(\partial \Delta xj/\partial Du)) +$$

$$\Delta Dv \sum ((\partial \Delta xj/\partial Ku)(\partial \Delta xj/\partial Dv) + (\partial \Delta yj/\partial Ku)(\partial \Delta xj/\partial Dv)) =$$

$$\sum ((\Delta xxj)\partial \Delta xj/\partial Ku + (\Delta yyj)\partial \Delta yj/\partial Ku)$$

Likewise, for Kv, the following equation can be derived from $\delta \Delta G/\delta Kv=0$ $$\Delta \omega \sum ((\partial \Delta xj/\partial \omega)(\partial \Delta xj/\partial Kv) + (\partial \Delta yj/\partial \omega)(\partial \Delta yj/\partial Kv)) + \quad (54)$$

$$\Delta \gamma \sum ((\partial \Delta xj/\partial \gamma)(\partial \Delta xj/\partial Kv) + (\partial \Delta yj/\partial \gamma)(\partial \Delta yj/\partial Kv)) +$$

$$\Delta Ku \sum ((\partial \Delta xj/\partial Ku)(\partial \Delta xj/\partial Kv) + (\partial \Delta yj/\partial Ku)(\partial \Delta yj/\partial Kv)) +$$

$$\Delta Kv \sum \left( (\partial \Delta xj/\partial Kv)^2 + (\partial \Delta yj/\partial Kv)^2 \right) +$$

$$\Delta Du \sum ((\partial \Delta xj/\partial Kv)(\partial \Delta xj/\partial Du) + (\partial \Delta yj/\partial Kv)(\partial \Delta xj/\partial Du)) +$$

$$\Delta Dv \sum ((\partial \Delta xj/\partial Kv)(\partial \Delta xj/\partial Dv) + (\partial \Delta yj/\partial Kv)(\partial \Delta xj/\partial Dv)) =$$

$$\sum ((\Delta xxj)\partial \Delta xj/\partial Kv + (\Delta yyj)\partial \Delta yj/\partial Kv)$$

Likewise, for Du, the following equation can be derived from $\delta \Delta G/\delta Du=0$ $$\Delta \omega \sum ((\partial \Delta xj/\partial \omega)(\partial \Delta xj/\partial Du) + (\partial \Delta yj/\partial \omega)(\partial \Delta yj/\partial Du)) + \quad (55)$$

$$\Delta \gamma \sum ((\partial \Delta xj/\partial \gamma)(\partial \Delta xj/\partial Du) + (\partial \Delta yj/\partial \gamma)(\partial \Delta yj/\partial Du)) +$$

$$\Delta Ku \sum ((\partial \Delta xj/\partial Ku)(\partial \Delta xj/\partial Du) + (\partial \Delta yj/\partial Ku)(\partial \Delta yj/\partial Du)) +$$

$$\Delta Kv \sum ((\partial \Delta xj/\partial Kv)(\partial \Delta xj/\partial Du) + (\partial \Delta yj/\partial Kv)(\partial \Delta xj/\partial Du)) +$$

$$\Delta Du \sum \left( (\partial \Delta xj/\partial Du)^2 + (\partial \Delta yj/\partial Du)^2 \right) +$$

$$\Delta Dv \sum ((\partial \Delta xj/\partial Du)(\partial \Delta xj/\partial Dv) +$$

$$(\partial \Delta yj/\partial Du)(\partial \Delta xj/\partial Dv)) =$$

$$\sum ((\Delta xxj)\partial \Delta xj/\partial Du) + (\Delta yyj)\partial \Delta yj/\partial Du)$$

Likewise, for Dv, the following equation can be derived from $\delta \Delta G/\delta Dv+0$ $$\Delta \omega \sum ((\partial \Delta xj/\partial \omega)(\partial \Delta xj/\partial Dv) + (\partial \Delta yj/\partial \omega)(\partial \Delta yj/\partial Dv)) + \quad (56)$$

$$\Delta \gamma \sum ((\partial \Delta xj/\partial \gamma)(\partial \Delta xj/\partial Dv) + (\partial \Delta yj/\partial \gamma)(\partial \Delta yj/\partial Dv)) +$$

$$\Delta Ku \sum ((\partial \Delta xj/\partial Ku)(\partial \Delta xj/\partial Dv) + (\partial \Delta yj/\partial Ku)(\partial \Delta yj/\partial Dv)) +$$

$$\Delta Kv \sum ((\partial \Delta xj/\partial Kv)(\partial \Delta xj/\partial Dv) + (\partial \Delta yj/\partial Kv)(\partial \Delta xj/\partial Dv)) +$$

$$\Delta Du \sum ((\partial \Delta xj/\partial Du)(\partial \Delta xj/\partial Dv) + (\partial \Delta yj/\partial Du)(\partial \Delta xj/\partial Dv)) +$$

$$\Delta Dv \sum \left( (\partial \Delta xj/\partial Dv)^2 + (\partial \Delta yj/\partial Dv)^2 \right) =$$

$$\sum ((\Delta xxj)\partial \Delta xj/\partial Dv + (\Delta yyj)\partial \Delta yj/\partial Dv)$$

Six linear equations are obtained in Equation (51) to Equation (56) with respect to six unknown variables ($\Delta\omega$, $\Delta\gamma$, $\Delta Ku$, $\Delta Kv$, $\Delta Du$, $\Delta Dv$). By solving simultaneous equations for Equation (51) to Equation 56). ($\Delta\omega$, $\Delta\gamma$, $\Delta Ku$, $\Delta Kv$, $\Delta Du$, $\Delta Dv$) can be calculated.

The correction parameters ($\omega$, $\gamma$, Ku, Kv, Du. Dv) are updated as follows.

$\omega=\omega+\Delta\omega$ $\gamma=\gamma+\Delta\gamma$ $Ku=Ku+\Delta Ku$ $Kv=Kv+\Delta Kv$ $Du=Du+\Delta Du$ $Dv=Dv+\Delta Dv$ (Xfj, Yfj) and E are calculated using the new correction parameters ($\omega$, $\gamma$, Ku, Kv, Du. Dv). Calculation is performed repeatedly until the $\Delta G$ is less than or equal to a predetermined threshold.

In a case where Ku and Kv are converted in Equation (45) and Equation (46), Ku and Kv are calculated by inversely applying Equation (45) and Equation (46).

The initial values of the correction parameters ($\omega$, $\gamma$, Ku, Kv, Du, Dv) may be predetermined or may be calculated as follows based on the correction parameters ($\gamma 0$, K0, Du0, and Dv0) calculated by the method in Embodiment 1.

$$(\omega,\gamma,Ku,Kv,Du,Dv)=(0,\gamma 0,K0,K0,Du0,Dv0)$$

A case where $\omega=0$ and Ku≠Kv is considered. The following relationships exist between (Xfj, Yfj) and (Du−Uj, Dv−Vj).

[Mathematical Formula 11]

$$\begin{bmatrix} Xfj \\ Yfj \end{bmatrix} = \begin{bmatrix} Ku*\cos\gamma & Kv*\sin\gamma \\ -Ku*\sin\gamma & Kv*\cos\gamma \end{bmatrix} \begin{bmatrix} Du - Uj \\ Dv - Vj \end{bmatrix} \quad (57)$$

[Mathematical Formula 12]

$$\begin{bmatrix} Du - Uj \\ Dv - Vj \end{bmatrix} = \begin{bmatrix} \cos\gamma/Ku & -\sin\gamma/Ku \\ \sin\gamma/Kv & \cos\gamma/Kv \end{bmatrix} \begin{bmatrix} Xfj \\ Yfj \end{bmatrix} \quad (58)$$

The error function E becomes as follows.

$$E = \sum (Xj^2 + Yj^2) - 2 \times \sum (Xj \times Xfj) - \quad (59)$$

$$2 \times \sum (Yj \times Yfj) + \sum (Xfj^2 + Yfj^2) =$$

$$\sum (Xj^2 + Yj^2) - 2 \times Ku \times \sum (Du - Uj) \times (Xj \times \cos\gamma - Yj \times \sin\gamma) -$$

$$2 \times Kv \times \sum (Dv - Vj) \times (Xj \times \sin\gamma + Yj \times \cos\gamma) +$$

$$Ku^2 \times \sum (Du - Uj)^2 + Kv^2 \times \sum (Dv - Vj)^2$$

Equation (59) is converted to an equation without $\Sigma$ as follows.

$$E = N \times (xs0 + ys0) - 2N \times Ku \times \quad (59A)$$

$$((Du - u0) \times r0 \times \cos(\varphi + \gamma) + d0 \times \cos\gamma - e0 \times \sin\gamma) - 2N \times$$

$$Kv \times ((Dv - v0) \times r0 \times \sin(\varphi + \gamma) + f0 \times \sin\gamma + g0 \times \cos\gamma) +$$

$$N \times (Ku^2 \times ((Du - u0)^2 + us0) + Kv^2 \times ((Dv - v0)^2 + vs0))$$

The following variables are defined.

$m0=(e0^2-g0^2)/vs0+2\times d0 \times f0/us0$ $n0=(d0^2-f0^2)/us0-2\times e0\times g0/vs0$ Although the process of derivation is omitted here (γ, Ku, Kv, Du, and Dv) can be calculated as follows.

$$\gamma = (1/2) \times \tan^{-1}(n0/m0)$$

$$Ku = (d0 \times \cos\gamma - f0 \times \sin\gamma)/us0$$

$$Kv = (e0 \times \sin\gamma + g0 \times \cos\gamma)/vs0$$

$$Du = u0 + (x0 \times \cos\gamma - y0 \times \sin\gamma)/Ku$$

$$Dv = v0 + (y0 \times \cos\gamma + x0 \times \sin\gamma)/Kv$$

A case where #≠0 and Ku=Kv=K is considered. The following relationships exist between (Xfj, Yfj) and (Du−Uj, Dv−Vj)

[Mathematical Formula 13]

$$\begin{bmatrix} Xfj \\ Yfj \end{bmatrix} = \frac{K}{\cos(2\omega)} \begin{bmatrix} \cos(\gamma+\omega) & \sin(\gamma-\omega) \\ -\sin(\gamma+\omega) & \cos(\gamma-\omega) \end{bmatrix} \begin{bmatrix} Du-Uj \\ Dv-Vj \end{bmatrix} \quad (60)$$

[Mathematical Formula 14]

$$\begin{bmatrix} Du-Uj \\ Dv-Vj \end{bmatrix} = \frac{1}{K} \begin{bmatrix} \cos(\gamma-\omega) & -\sin(\gamma-\omega) \\ \sin(\gamma+\omega) & \cos(\gamma+\omega) \end{bmatrix} \begin{bmatrix} Xfj \\ Yfj \end{bmatrix} \quad (61)$$

The error function E becomes as follows.

$$E = \sum (Xj^2 + Yj^2) - \quad (62)$$
$$2 \times K \times \sum (Du-Uj) \times (Xj \times \cos(\gamma+\omega) - Yj \times \sin(\gamma+\omega)) -$$
$$2 \times K \times \sum (Dv-Vj) \times (Xj \times \sin(\gamma-\omega) + Yj \times \cos(\gamma-\omega)) +$$
$$K^2 \times ((1 + \sin(2\gamma) \times \sin(2\omega)) \times \sum (Du-Uj)^2 +$$
$$(1 - \sin(2\gamma) \times \sin(2\omega)) \times$$
$$\sum (Dv-Vj)^2 \times -2 \times \sin(2\omega) \times \sum (Du-Uj) \times (Dv-Vj))$$

Here, to simplify the equation, the following is used.

$$K = K/\cos(2\omega) \quad \text{(cm)}$$

Equation (62) is converted to an equation without Σ as follows.

$$E = N \times (xs0 + ys0) - 2N \times K \times ((Du-u0) \times r0 \times \cos(\varphi+\gamma+\omega) + \quad (62A)$$
$$d0 \times \cos(\gamma+\omega) - e0 \times \sin(\gamma+\omega)) -$$
$$2N \times K \times ((Dv-v0) \times r0 \times \sin(\varphi+\gamma-\omega) +$$
$$f0 \times \sin(\gamma-\omega) + g0 \times \cos(\gamma-\omega)) +$$
$$N \times K^2 \times ((1 + \sin(2\gamma) \times \sin(2\omega)) \times (Du-u0)^2 + us0) +$$
$$(1 - \sin(2\gamma) \times \sin(2\omega)) \times ((Dv-v0)^2 + vs0) -$$
$$2 \times \sin(2\omega) \times ((Du-u0) \times ((Dv-v0) + ws0))$$

Although Equation (62A) is somewhat simpler that Equation (44B), Equation (62A) cannot be solved analytically. Similar to the case where ω≠0 and Ku≠Kv, it is necessary to solve by repeated calculation.

Similar to that described in Embodiment 1, the error function E2 represented by Ufj and Vfj obtained by correcting Xj and Yj may be set to be minimized. In such a case, the following relationships exist between Xj and Yj and Ufj and Vfj.

[Mathematical Formula 15]

$$\begin{bmatrix} Ufj \\ Vfj \end{bmatrix} = \begin{bmatrix} Du \\ Dv \end{bmatrix} - \begin{bmatrix} \cos(\gamma-\omega)/Ku & -\sin(\gamma-\omega)/Ku \\ \sin(\gamma+\omega)/Kv & \cos(\gamma+\omega)/Kv \end{bmatrix} \begin{bmatrix} Xj \\ Yj \end{bmatrix} \quad (63)$$

[Mathematical Formula 16]

$$\begin{bmatrix} Xj \\ Yj \end{bmatrix} = \frac{1}{\cos(2\omega)} \begin{bmatrix} Ku*\cos(\gamma+\omega) & Kv*\sin(\gamma-\omega) \\ -Ku*\sin(\gamma+\omega) & Kv*\cos(\gamma-\omega) \end{bmatrix} \begin{bmatrix} Du-Ufj \\ Dv-Vfj \end{bmatrix} \quad (64)$$

The orthogonality ω, the phase correction value γ, the AZ sensitivity coefficient Ku, and the EL sensitivity coefficient Kv are calculated by minimizing the error function E2.

$$E2 = \Sigma(Ku^2 \times (Ufj-Uj)^2 + Kv^2 \times (Vfj-Vj)^2) \quad (65)$$

The following is obtained by modifying Equation (65).

$$E2 = \sum (Ku \times (Du-Uj) - Xj \times \cos(\gamma-\omega) + Yj \times \sin(\gamma-\omega))^2 + \quad (65A)$$
$$\sum (Kv \times (Dv-Vj) - Xj \times \sin(\gamma+\omega) - Yj \times \cos(\gamma+\omega))^2) =$$
$$Ku^2 \times \sum (Du-Uj)^2 +$$
$$\sum (Xj \times \cos(\gamma-\omega) - Yj \times \sin(\gamma-\omega))^2 - 2 \times Ku \times$$
$$\sum (Du-Uj) \times (Xj \times \cos(\gamma-\omega) - Yj \times \sin(\gamma-\omega)) +$$
$$Kv^2 \times \sum (Dv-Vj)^2 +$$
$$\sum (Xj \times \sin(\gamma+\omega) + Yj \times \cos(\gamma+\omega))^2 -$$
$$2 \times Kv \times \sum (Dv-Vj) \times (Xj \times \sin(\gamma+\omega) + Yj \times \cos(\gamma+\omega)) =$$
$$Ku^2 \times \sum (Du-Uj)^2 +$$
$$Kv^2 \times \sum (Dv-Vj)^2 -$$
$$2 \times Ku \times \sum (Du-Uj) \times (Xj \times \cos(\gamma-\omega) - Yj \times \sin(\gamma-\omega)) -$$
$$2 \times Kv \times \sum (Dv-Vj) \times (Xj \times \sin(\gamma+\omega) + Yj \times \cos(\gamma+\omega)) +$$
$$(1 + \sin(2\gamma) \times \sin(2\omega)) \times \sum Xj^2 +$$
$$(1 - \sin(2\gamma) \times \sin(2\omega)) \times \sum Yj^2 -$$
$$2 \times \sin(2\omega) \times \sum Xj \times Yj$$

In order to modify Equation (65A) into a format in which E is not used, the following variables are defined.

$$zs0 = (Xj \times Yj)/N$$

Equation (65A) becomes as follows.

$$E2 = N \times Ku^2 \times ((Du-u0)^2 + us0) + N \times Kv^2 \times ((Dv-v0)^2 + vs0) - \quad (65B)$$
$$2N \times Ku \times ((Du-u0) \times r0 \times \cos(\varphi+\gamma-\omega) +$$
$$d0 \times \cos(\gamma-\omega) - e0 \times \sin(\gamma-\omega)) -$$
$$2N \times Kv \times ((Dv-v0) \times r0 \times \sin(\varphi+\gamma+\omega) + f0 \times \sin(\gamma+\omega) +$$
$$g0 \times \cos(\gamma+\omega)) + N \times (1 + \sin(2\gamma) \times \sin(2\omega)) \times xs0 +$$
$$N \times (1 - \sin(2\gamma) \times \sin(2\omega)) \times ys0 - 2N \times \sin(2\omega) \times zs0$$

Equation (65B) similar to Equation (44B) cannot be solved analytically based on an equation such as δE2/δγ=0. Approximate values are calculated by assigning initial values to γ, ω, Ku, Kv, Du. and Dv and by performing corrections by way of repeated calculation.

The orthogonality ω, the phase correction value γ, the AZ sensitivity coefficient Ku, and the EL sensitivity coefficient Kv may be calculated by minimizing the following error function E3.

$$E3 = \Sigma((Ufj - Uj)^2 + (Vtj - Vj)^2) \quad (66)$$

Here, the error function E3 is the sum of squares of post-correction residuals for N pieces of the error measurement data 55. The post-correction residuals are the respective differences between (i) the arrival direction errors (Du−Ufj, Dv−Vfj) corrected by correction parameters including the phase correction value γ and (ii) the actual measurement value errors ((Du−Uj, Dv−Vj). A portion of the correction parameters among the orthogonality ω, the phase correction value γ, the AZ sensitivity coefficient Ku, and the EL sensitivity coefficient Kv may be used to correct the actual measurement values errors. Either the actual measurement value error or the arrival direction error is corrected by each of the correction parameters. By such a method, correction parameters that minimizes the sum of squares of post-correction residuals for N pieces of the measurement error data can be obtained. The post-correction residuals are differences between a post-correction actual measurement value and a post-correction arrival direction error. The post-correction actual measurement value and the post-correction arrival direction error are the actual measurement value and the arrival direction error obtained after correcting based on each of the correction parameters.

The correction parameters calculated by the correction value calculator 32A are stored in the data storage 34A. The values to be stored are the calculated values without further processing.

Figure 21:
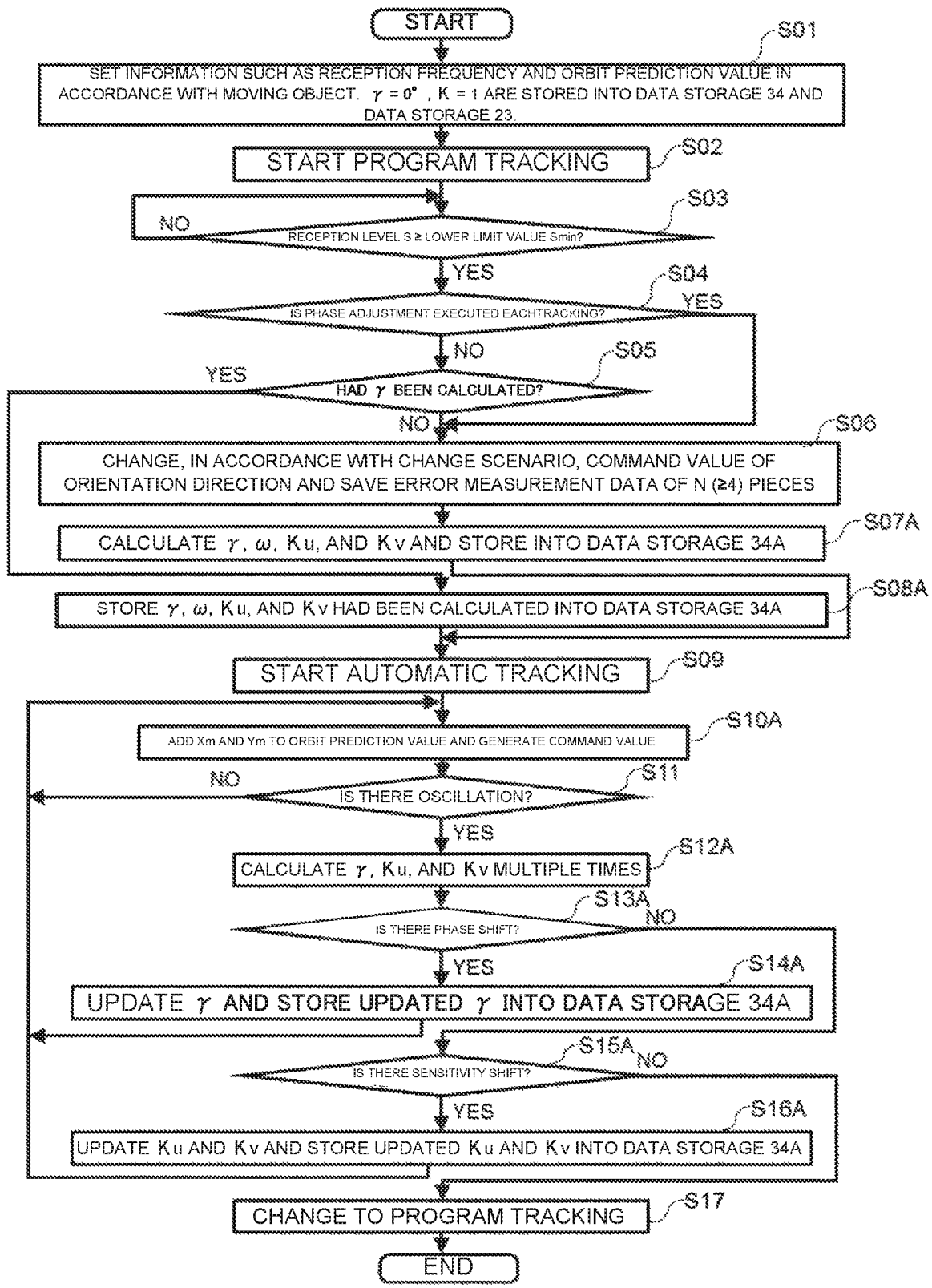
FIG. 21 is a flowchart illustrating operation of the antenna control device according to Embodiment 2.
Figure 25A:
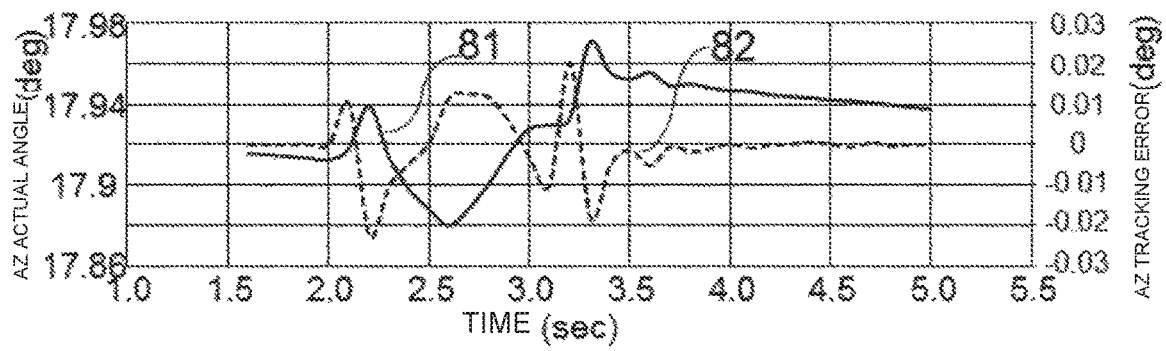
FIGS. 25A, 25B, 25C. 25D and 25E are diagrams illustrating temporal changes of the measurement data in the case of FIG. 24.
Figure 25B:
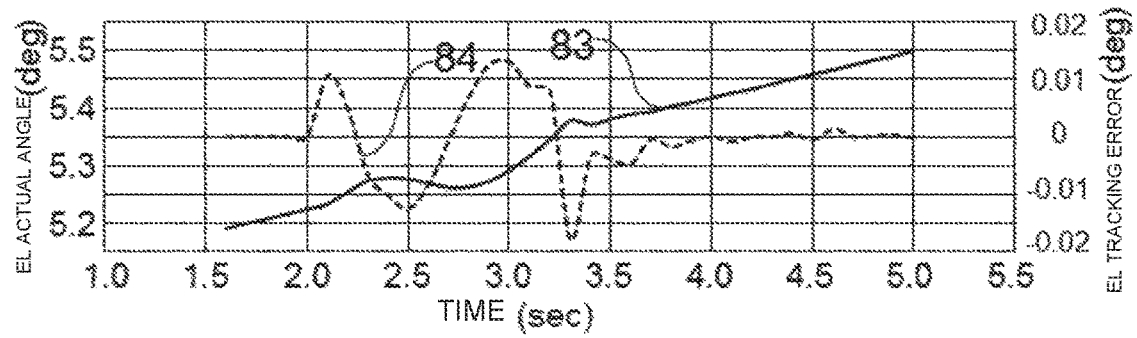
Figure 25C:
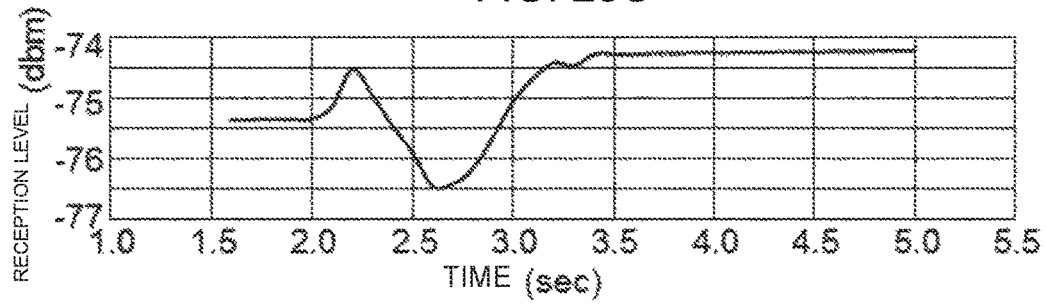
Figure 25D:
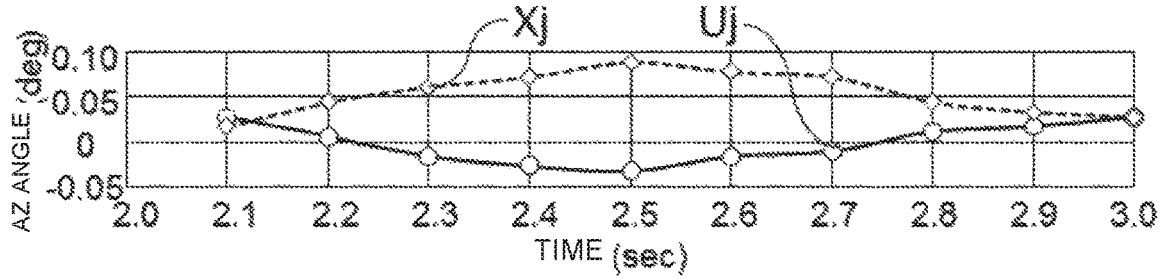
Figure 25E:
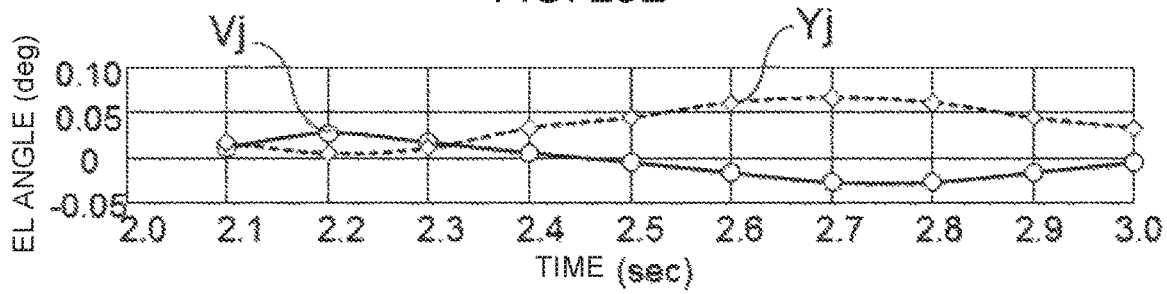

The operation is described. FIG. 21 is a flowchart illustrating operation of the antenna control device according to Embodiment 2. The points that differ from those in FIG. 7 of Embodiment 1 are described.

In S07A, the correction value calculator 32A calculated the phase correction value γ, the orthogonality ω, the AZ sensitivity coefficient Ku, and the EL sensitivity coefficient Kv and stores this calculated data into the data storage 34A. In S08A, the γ, ω, Ku, and Kv that had been calculated are stored in the data storage 34A. Since the coordinate converter 24 of the tracking receiver 8 cannot perform correction taking the orthogonality ω into account and correction using sensitivity coefficients Ku and Kv that are different for the azimuth angle direction and the elevation angle direction, the data cannot be stored in the data storage 23 of the tracking receiver 8.

In S10A, the measurement angle error corrector 39 calculates the measurement angle error signals X and Y while taking into account the phase correction value γ, the orthogonality ω, the AZ sensitivity coefficient Ku, and the EL sensitivity coefficient Kv and outputs the measurement angle error signals Xm and Ym. The tracking controller 33A calculates the command value by adding the measurement angle error signals Xm and Ym to the orbit prediction value and outputs the command value to the antenna drive controller 27.

The operation performed in the case where oscillation occurs while tracking is in operation is similar to that in Embodiment 1. However, for data that is updated such as the phase correction value γ, newly calculated value is stored in the data storage 34A without further processing. The values stored in the data storage 23 included in the tracking receiver 8 are not changed.

In S12A, the oscillation cause determiner 37A activates multiple times the error measurement data generator 31 and the correction value calculator 32A to calculate multiple sets of the phase correction value γ, the AZ sensitivity coefficient Ku. and the EL sensitivity coefficient Kv.

In S13A, a check is performed as to whether or not oscillation is caused by phase shift. An example of the condition to determine that oscillation is caused by phase shift is that the values obtained by subtracting (i)γ that is used by the measurement angle error corrector 39 from (ii) the calculated phase correction values γ, are within a range not including zero degrees and having a predetermined width.

In step S14A, the correction value updater 38A stores the newly calculated phase correction value γ into the data storage 34. Since the measurement angle error signal that is outputted by the tracking receiver 8A in Embodiment 2 is not corrected by the phase correction value γ, it is sufficient that the phase correction value γ calculated by the correction value calculator 32A is stored without further processing.

In S15A, a check is performed as to whether or not oscillation is caused by sensitivity shift. Examples of the condition to determine that oscillation is caused by sensitivity shift are that the values obtained by dividing (i) the calculated AZ sensitivity coefficients Ku by (ii) Ku that is used by the measurement angle error corrector 39, are within a range not including 1 and having a predetermined width, or, that the values obtained by dividing (i) the calculated EL sensitivity coefficients Kv by (ii) Kv that is used by the measurement angle error corrector 39, are within a range not including 1 and having a predetermined width.

In S16A, the correction value updater 38A stores the newly calculated AZ sensitivity coefficient Ku and the EL sensitivity coefficient Kv into the data storage 34.

The correction value calculator 32A calculates correction parameters such as the orthogonality ω and sensitivity coefficients that are different for the azimuth angle direction and the elevation angle direction. Three examples are used to describe the correction parameters that are calculated by the correction value calculator 32A.

The first example is illustrated in FIG. 8 to FIG. 10 and the results of calculation by the correction value calculator 32A are as follows.

Orthogonality ω=0.26°
Phase correction value γ=39.67°
AZ sensitivity coefficient $Ku$=0.895
EL sensitivity coefficient $Kv$=0.981
U-direction prediction value error $Du$=−0.00270°
V-direction prediction value error $Dv$=0.00260°

The post-correction measurement angle error vector Vaj that is obtained by correcting the measurement angle error vector Vsj with the correction parameters (ω, γ, Ku, Kv, Du, Dv) is illustrated in FIG. 22. This Vaj is closer to the Vsj than the Vaj illustrated in FIG. 10.

The second example is illustrated in FIG. 11 to FIG. 13 and the results of calculation by the correction value calculator 32A are as follows.

Orthogonality ω=2.95°
Phase correction value γ=40.880
AZ sensitivity coefficient $Ku$=0.900
EL sensitivity coefficient $Kv$=0.976
U-direction prediction value error $Du$=0.05383°
V-direction prediction value error $Dv$=0.03540°

The post-correction measurement angle error vector Vaj that is obtained by correcting the measurement angle error vector Vsj with the correction parameters (ω, γ, Ku, Kv, Du, Dv) is illustrated in FIG. 23. This Vaj is closer to the Vsj than the Vaj illustrated in FIG. 13.

The third example is illustrated in FIGS. 24 to 26. In the third example, the simulation conditions are set as indicated below. FIGS. 24 to 26 are expressed similarly to FIG. 8 to FIG. 10.

Orthogonality $\omega = -10°$
Phase correction value $\gamma = 180°$
AZ sensitivity coefficient $Ku=1$
EL sensitivity coefficient $Kv=1$
U-direction prediction value error $Du=0.05°$
V-direction prediction value error $Dv=0.03°$ The results of calculation by the correction value calculator 32A are as follows.

Orthogonality $\omega = -11.78°$
Phase correction value $\gamma = 181.01°$
AZ sensitivity coefficient $Ku=0.964$
EL sensitivity coefficient $Kv=1.042$
U-direction prediction value error $Du=0.04368°$
V-direction prediction value error $Dv=0.02181°$ In FIG. 24, since the prediction value errors exist, the trajectory of Hj and the trajectory of Vsj are apart from each other. The post-correction measurement angle error vector Vaj becomes closer to Vsj.

FIG. 27 is a diagram illustrating a trajectory of the measurement angle error signal corrected by the phase correction value and the sensitivity coefficients calculated by the antenna control device according to Embodiment 1, as a comparison example. Since the orthogonality is not taken into account, the Vaj and the Vsj are slightly more apart from each other than those in FIG. 26.

In Embodiment 2, since the orthogonality, the AZ sensitivity coefficient, and the EL sensitivity coefficient are taken into account, the correction parameters that correct the measurement angle error signal can be more accurately calculated than in the case of Embodiment 1.

In this Embodiment 2 as well, since the phase correction value and the sensitivity coefficients can be correctly calculated even in the case where the signal-to-noise ratio of the difference signal is low, the measurement angle error signals can be appropriately corrected, and thus the communication counterpart can be tracked more accurately than with conventional methods.

Although the correction value calculator 32A calculates the correction parameters ($\omega$, $\gamma$, Ku, Kv), one to three correction parameters including $\gamma$ may be calculated. In a case where $\gamma$ and Ku=Kv=K are calculated, two correction parameters are calculated. In a case where the sensitivity coefficients Ku and Kv are not calculated, a pre-set value or 1 is used as the sensitivity coefficients Ku and Kv. The aforementioned description is also applicable to other embodiments.

Embodiment 3

Embodiment 3 is a case where a calibration tower (collimation) is used to adjust the phase and sensitivity in advance. By doing so, when a moving object such as a rocket is tracked, tracking can be performed even when there is no orbit prediction value of the moving object or the accuracy of the orbit prediction value is low.

Figure 29:
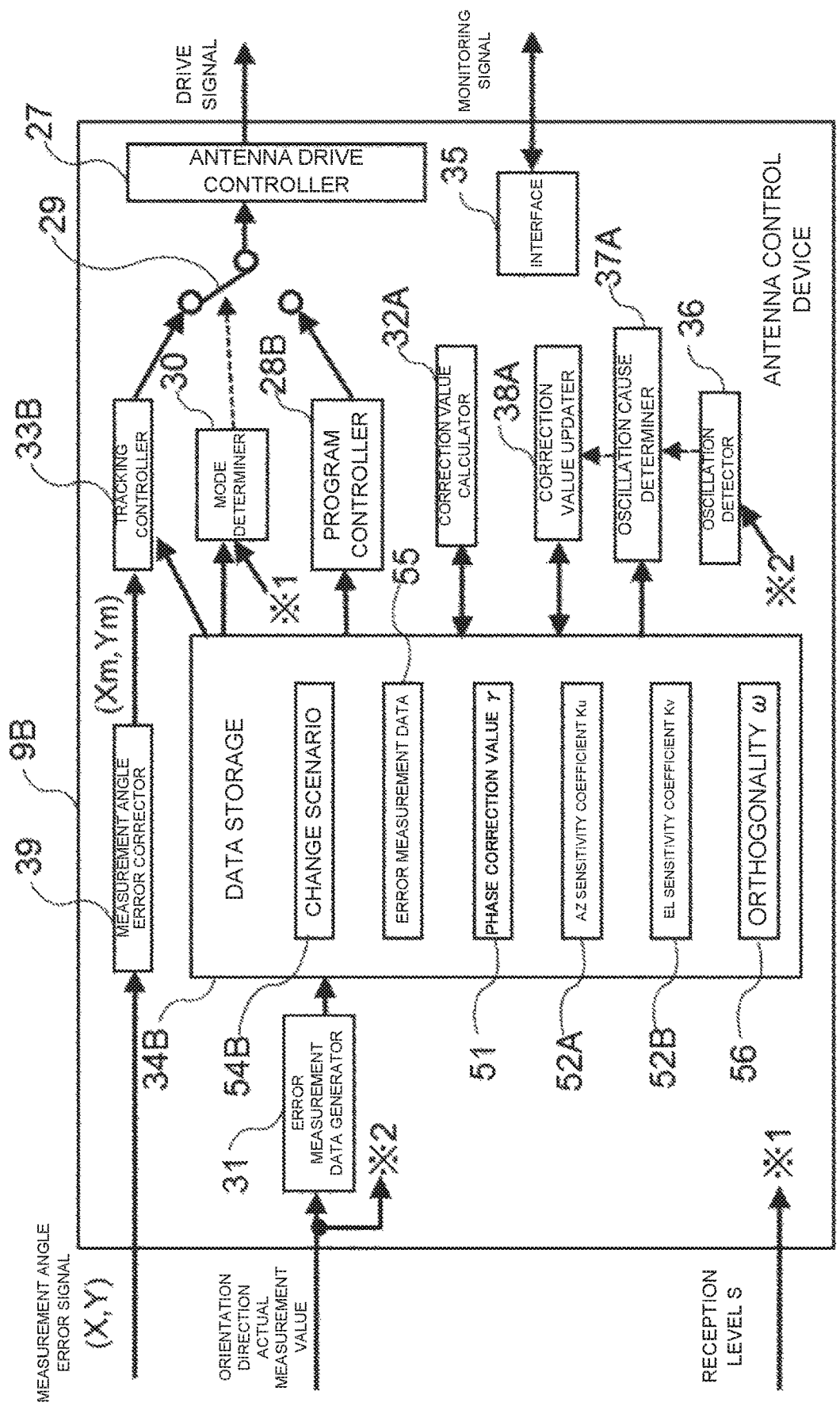
FIG. 29 is a block diagram of the antenna control device according to Embodiment 3.

FIG. 28 is a diagram illustrating a configuration of an antenna system including an antenna control device according to Embodiment 3 of the present disclosure. FIG. 29 is a block diagram illustrating a configuration of an antenna control device according to Embodiment 3.

For FIG. 28 and FIG. 29, the points that differ from those in FIG. 1 and FIG. 4 of Embodiment 1 are described. An antenna system 100B includes a calibration tower 71. The calibration tower 71 emits a radio wave 11B of a predetermined frequency. The calibration tower 71 is installed at a position where the antenna 1 can receive the radio wave 11B emitted by the calibration tower 71. The calibration tower 71 is a test radio wave source that is installed on the ground at a predetermined position with respect to the antenna 1 and emits radio waves. The calibration tower 71 is a temporary communication counterpart during program tracking in order to acquire error measurement data for calculating correction parameters.

An orbit prediction value of a moving object 10B does not exist. Therefore, the antenna control device 9B does not include an orbit prediction value data generator 26. A program controller 28B and a correction value calculator 32B are modified. A data storage 34B includes a change scenario 54B. The change scenario 54B is a scenario for changing the orientation direction of the antenna 1 in a way to be different from that in Embodiment 1.

Figure 30:
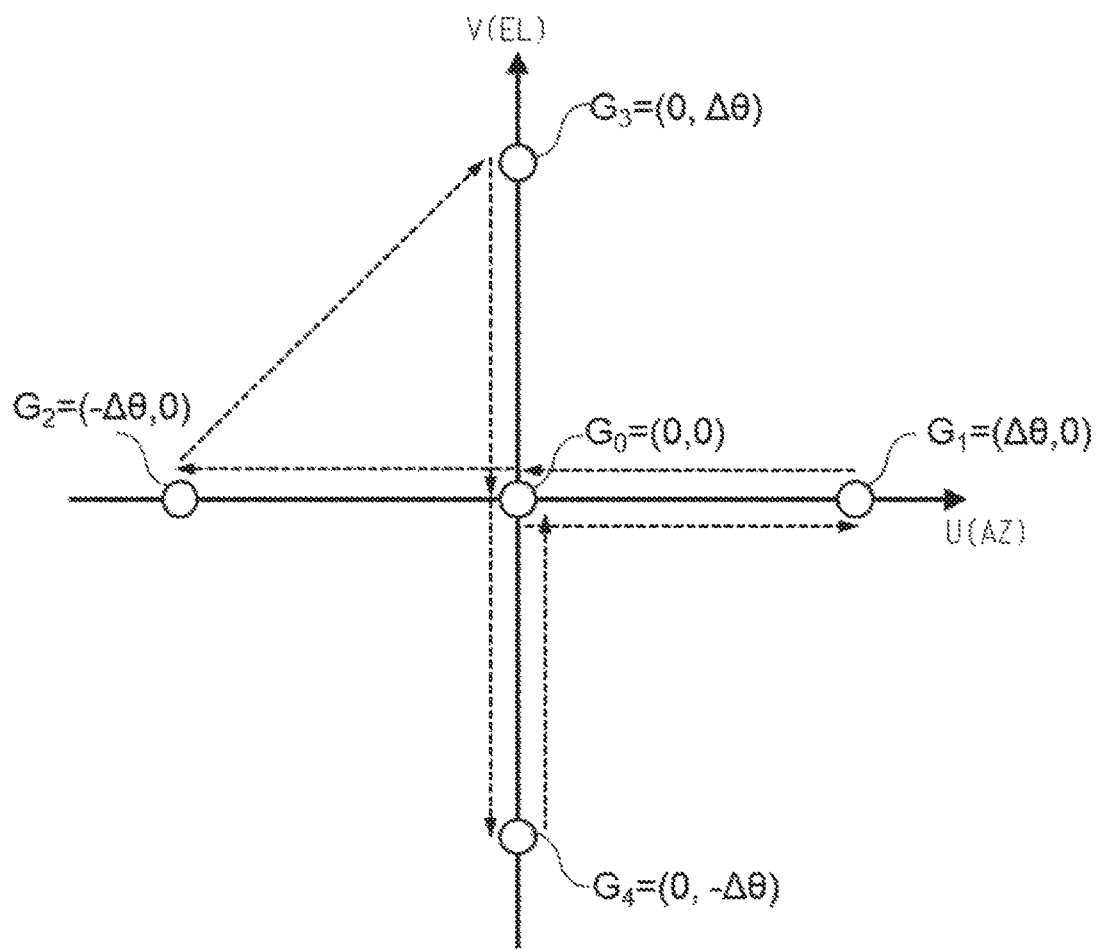
FIG. 30 is a diagram illustrating an example of a trajectory in which the orientation direction is changed during program tracking by the antenna control device according to Embodiment 3.

The program controller 28B, defining the direction toward the calibration tower 71 as a reference direction, makes the orientation direction of the antenna 1 to change in a range that is within a predetermined maximum angle difference. FIG. 30 is a diagram illustrating an example of a trajectory in which the orientation direction is changed during program tracking by the antenna control device according to Embodiment 3. The direction in which the antenna 1 faces rightly the calibration tower 71 is set as reference celestial sphere point $G_o=(0, 0)$. The orientation direction of the antenna 1 is changed clockwise or counterclockwise in the U-direction by the offset angle $\Delta\theta$. That is, the orientation direction changes to $G_1=(\Delta\theta, 0)$ and $G_2=(-\Delta\theta, 0)$. Furthermore, the orientation direction of the antenna 1 is changed positively and negatively in the V-direction by the $\Delta\theta$. That is, the orientation direction changes to $G_3=(0, \Delta\theta)$ and $G_4=(0, -\Delta\theta)$. At $G_j$ (j=1, 2, 3, 4), the orientation direction is stationary for at least a predetermined time. The offset angle $\Delta\theta$ is determined such that the offset angle $\Delta\theta$ exists in a linear region in which sensitivity coefficients are linear. The linear region is a region in which the $|\Delta\theta|$ is less than or equal to, for example, approximately 0.25 of the half width.

Since both the calibration tower 71 and the antenna 1 are installed on the ground, the orientation direction of the antenna 1 changes in a state in which the elevation angle of the antenna 1 is close to zero. Therefore, the U-direction offset angle $\Delta\theta$, as it is, may be set as the change in the command value of the azimuth angle.

The error measurement data generator 31 generates error measurement data 55 in a state in which the command value and the actual measurement value of the orientation direction of the antenna 1 are matched each other and are stationary at $G_j$ (j=1, 2, 3, 4). Here, each of the measurement angle error signals (Xj, Yj) is measured for each of $G_j$ (j=1, 2, 3, 4).

Figure 31:
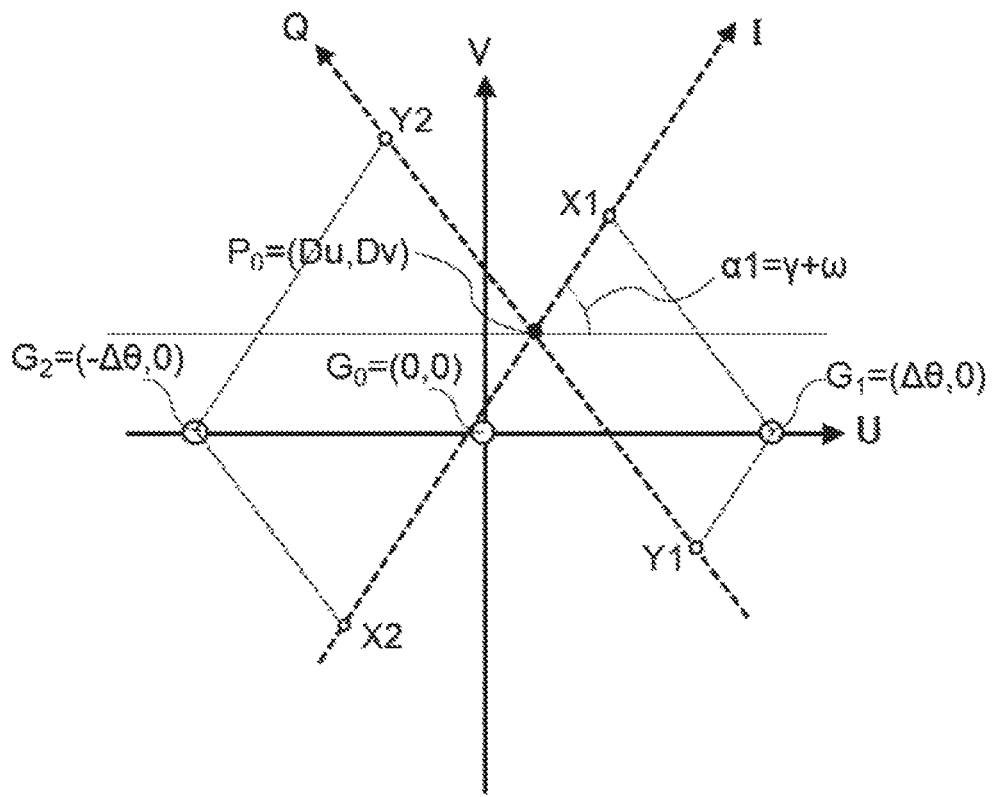
FIG. 31 is a diagram illustrating a measurement angle error signal that is obtained in a case where the orientation direction is changed on the U-axis in order to calculate the correction parameter by the antenna control device according to Embodiment 3.
Figure 32:
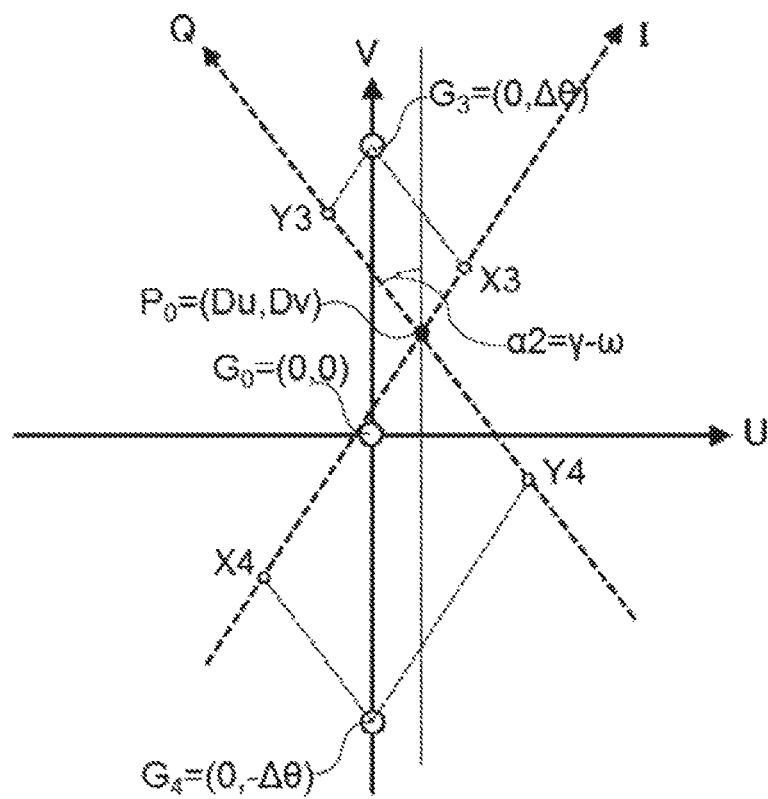
FIG. 32 is a diagram illustrating a measurement angle error signal that is obtained in a case where the orientation direction is changed on the V-axis in order to calculate the correction parameter by the antenna control device according to Embodiment 3.

The correction value calculator 32B calculates the phase correction value $\gamma$, the AZ sensitivity coefficient Ku, and the EL sensitivity coefficient Kv, and the orthogonality $\omega$ as follows. The relationship between the measurement angle error signals (X1, Y1) and (X2, Y2) with respect to $G_1$ and $G_2$ on the U-axis is illustrated in FIG. 31. The relationship between the measurement angle error signals (X3, Y3) and (X4, Y4) with respect to $G_3$ and $G_4$ on the V-axis is illustrated in FIG. 32.

$$\alpha 1 = \tan^{-1}((Y1-Y2)/(X1-X2)) \quad (67)$$

$$\alpha 2 = \tan^{-1}((X3-X4)/(Y3-Y4)) \quad (68)$$

$$\gamma = (\alpha 1 + \alpha 2)/2 \quad (69)$$

$$\omega=(\alpha 1-\alpha 2)/2 \quad (70)$$

$$Ku=\sqrt{((X1-X2)^2+(Y1-Y2)^2)}\times\cos(2\omega)/2/\Delta\theta \quad (71)$$

$$Kv=\sqrt{((X3-X4)^2+(Y3-Y4)^2)}\times\cos(2\omega)/2/\Delta\theta \quad (72)$$

$$Du=-((X1+X2+X3+X4)\times\cos(\omega-\gamma)+(Y1+Y2+Y3+Y4)\times\sin(\omega-\gamma))/4/Ku \quad (73)$$

$$Dv=-((X1+X2+X3+X4)\times\sin(\omega+\gamma)+(Y1+Y2+Y3+Y4)\times\cos(\omega+\gamma))/4/Kv \quad (74)$$

The U-axis and the V-axis are direction respectively are a first direction and a second direction orthogonal on the celestial sphere with the reference celestial sphere point $G_0$ being the reference. The orientation direction is stationary for a predetermined time at two celestial sphere points $G_1$ and $G_2$ on the U-axis being the first direction. The orientation direction is stationary for a predetermined time at two celestial sphere points $G_3$ and $G_4$ on the V-axis being the second direction. The correction value calculator 32B calculates at least the phase correction value γ by using the equation for the error measurement data measured at the celestial sphere points $G_1$ and $G_2$ and the equation for the error measurement data measured at the celestial sphere points $G_3$ and $G_4$.

Figure 33:
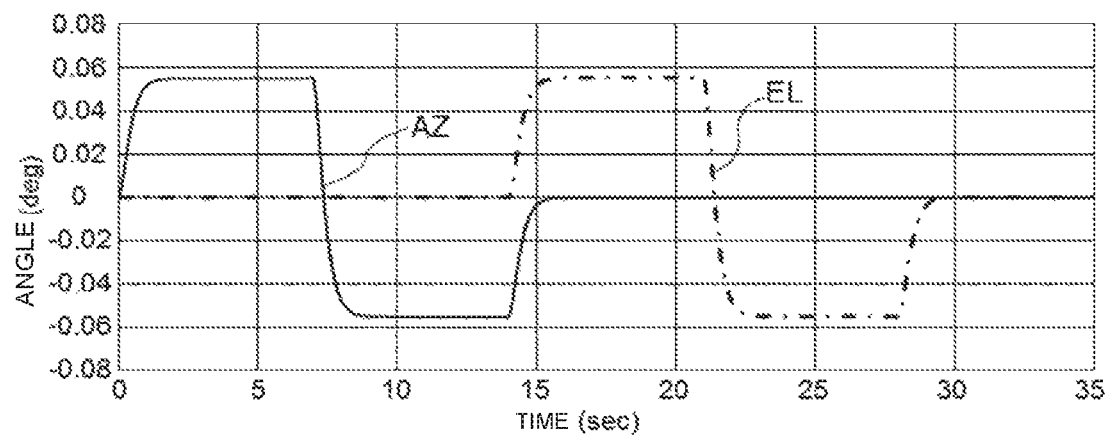
FIG. 33 is a diagram illustrating a time sequence example in which the antenna is automatically driven by the antenna control device according to Embodiment 3.

The operation is described. A time sequence example for driving automatically the antenna is illustrated in FIG. 33. In the current example where the antenna drive controller 27 is a servo-type that does not overshoot, data acquisition is easy. In the current example, the time during which the antenna 1 is oriented toward a single celestial sphere point is 7 seconds, the data acquisition time is 3 seconds, and the data sampling time is 0.1 seconds. The time period during which data is acquired is 3 seconds anywhere from start to finish of the 7-second time period during which the antenna 1 is oriented toward a single celestial sphere point. The correction parameters (ω, γ, Ku, Kv, Du, Dv) are calculated using the method indicated from Equation (71) to Equation (76) with respect to the value obtained by averaging the data acquired in the 3-second data acquisition time period.

Figure 34:
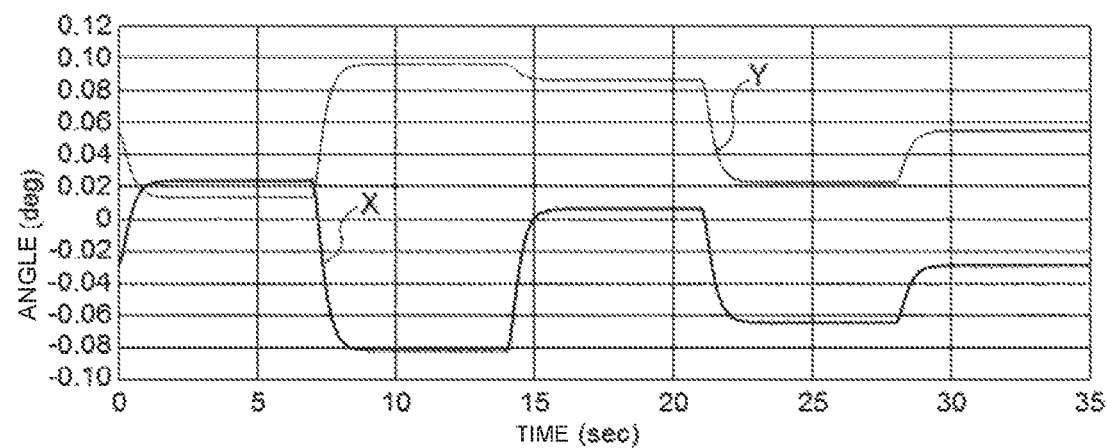
FIG. 34 is a diagram illustrating measurement angle error signals generated by tracking receiver without superimposed noise in a case where the antenna is automatically driven as illustrated in FIG. 33.

FIG. 34 illustrates the simulation results of measurement angle error signals X and Y. In FIG. 34, it is set that each actual measurement value is not superimposed with any noise. The measurement angle error signal X is represented by a bold solid line and the measurement angle error signal Y is represented by a solid line.

The simulation conditions are as follows.
Antenna beam half width (beam width)=0.2°
Offset angle Δθ=0.055°
Orthogonality ω=−5°
Phase correction value γ=43°
AZ sensitivity coefficient=1.2
EL sensitivity coefficient=0.85
U-direction prediction value error=0.05°
V-direction prediction value error=−0.03°

In the case of FIG. 34, the results of calculation by the correction value calculator 32B are as indicated below. Since no noise exists, values equal to the set conditions can be correctly calculated. The same results can be obtained by the correction value calculator 32A of Embodiment 2. The correction value calculator 32A uses all data during the time period including time when the orientation direction of the antenna is changing. The initial values of the correction value calculator 32A are the correction parameters calculated by the correction value calculator 32B.
Orthogonality ω=−5.00°
Phase correction value γ=43.00°
AZ sensitivity coefficient Ku=1.200
EL sensitivity coefficient Kv=0.850
U-direction prediction value error Du=0.05000°
V-direction prediction value error Dv=−0.03000°

Figure 35:
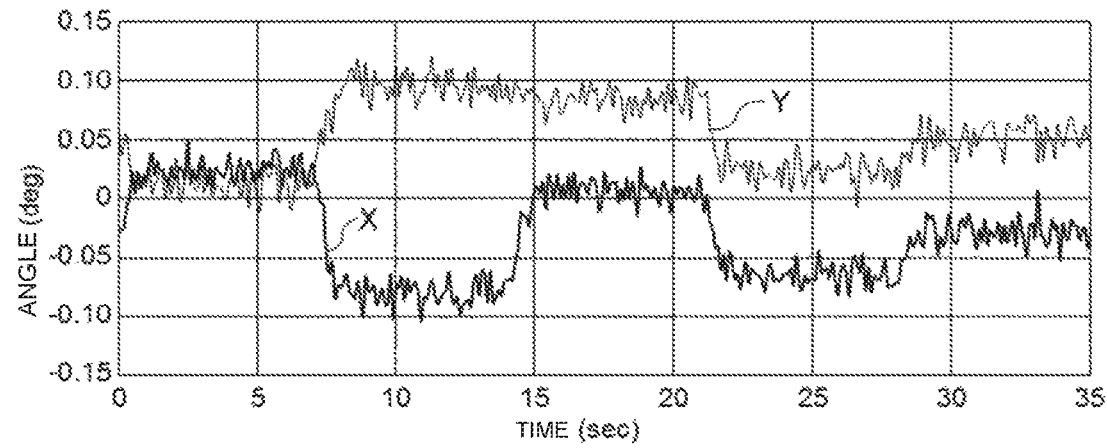
FIG. 35 is a diagram illustrating an example of measurement angle error signals generated by tracking receiver with superimposed noise in the case where the antenna is automatically driven as illustrated in FIG. 33.

The simulation results of the measurement angle error signals in the case where noise superimposing on the measurement angle error signal is approximated using a Gauss random number and the effective value of that magnitude is set to be 0.01° rms are illustrated in FIG. 35. The actual measurement value of the orientation direction of the antenna 1 is not superimposed with noise. In FIG. 35, the noise is approximately 18% of the offset angle.

In the case of FIG. 35, the results of calculation by the correction value calculator 32B of Embodiment 3 are as follows.
(Calculation Results of the Correction Value Calculator 32B of Embodiment 3)
Orthogonality ω=−5.62°
Phase correction value γ=43.80°
AZ sensitivity coefficient Ku=1.188
EL sensitivity coefficient Kv=0.820
U-direction prediction value error Du=0.04998°
V-direction prediction value error Dv=−0.03047°

The results of calculation by the correction value calculator 32A of Embodiment 2 are as follows.
(Calculation Results of the Correction Value Calculator 32A of Embodiment 2)
Orthogonality ω=−5.51°
Phase correction value γ=43.96°
AZ sensitivity coefficient Ku=1.192
EL sensitivity coefficient Kv=0.846
U-direction prediction value error Du=0.04981°
V-direction prediction value error Dv=−0.02915°

Even if noise exists, both the correction value calculator 32B and the correction value calculator 32A can calculate the phase correction value γ and so on quite accurately.

Figure 36:
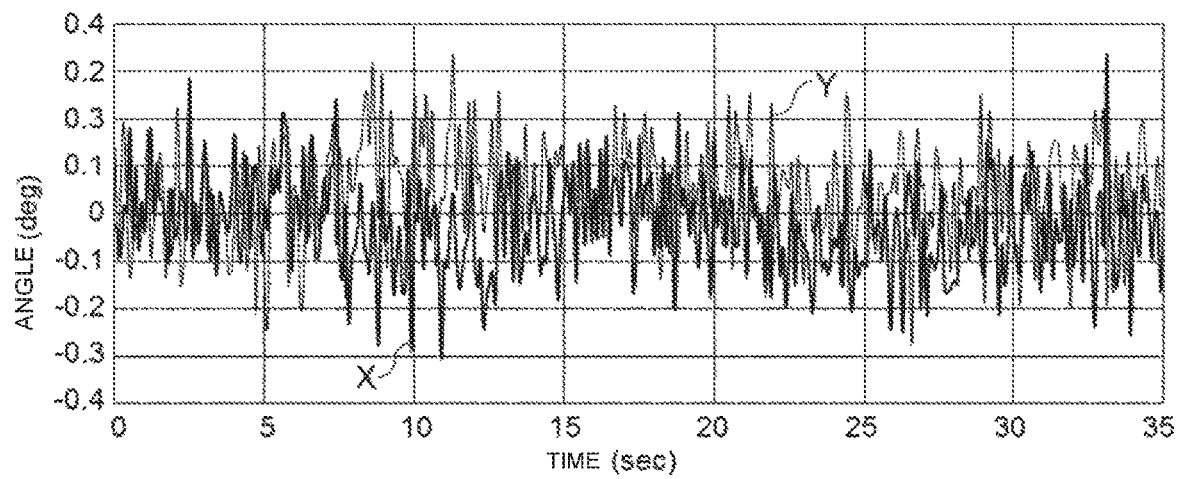
FIG. 36 is diagram illustrating another example of measurement angle error signals generated by tracking receiver with superimposed noise in the case where the antenna is automatically driven as illustrated in FIG. 33.

The simulation results of the measurement angle error signals in the case where magnitude of the noise is set to be 0.1° rms as illustrated in FIG. 36. In FIG. 36, the noise is approximately 180% of the offset angle Δθ.

In the case of FIG. 36, the results of calculation by the correction value calculator 32B of Embodiment 3 are as follows.
(Calculation Results of the Correction Value Calculator 32B of Embodiment 3)
Orthogonality ω=−13.77°
Phase correction value γ=53.70°
AZ sensitivity coefficient Ku=1.019
EL sensitivity coefficient K=0.551
U-direction prediction value error Du=0.05101°
V-direction prediction value error Dv=−0.0370°

The results of calculation by the correction value calculator 32A of Embodiment 2 are as follows.
(Calculation results of the correction value calculator 32A of Embodiment 2)
Orthogonality ω=−10.00°
Phase correction value γ=52.61°
AZ sensitivity coefficient Ku=1.106
EL sensitivity coefficient Kv=0.825
U-direction prediction value error Du=0.04659°
V-direction prediction value error Dv=−0.02135°

In FIG. 36, the noise is 10 times of that in FIG. 35. Both the correction value calculator 32B and the correction value calculator 32A calculate correction parameters that do not cause the antenna servo system to oscillate, and thus it can be said that these methods are effective against noise.

In Embodiment 3, phase adjustment and sensitivity adjustment can be performed automatically by the calibration tower (collimation). Erroneous operation by human can be prevented and work efficiency can be enhanced.

Figure 37:
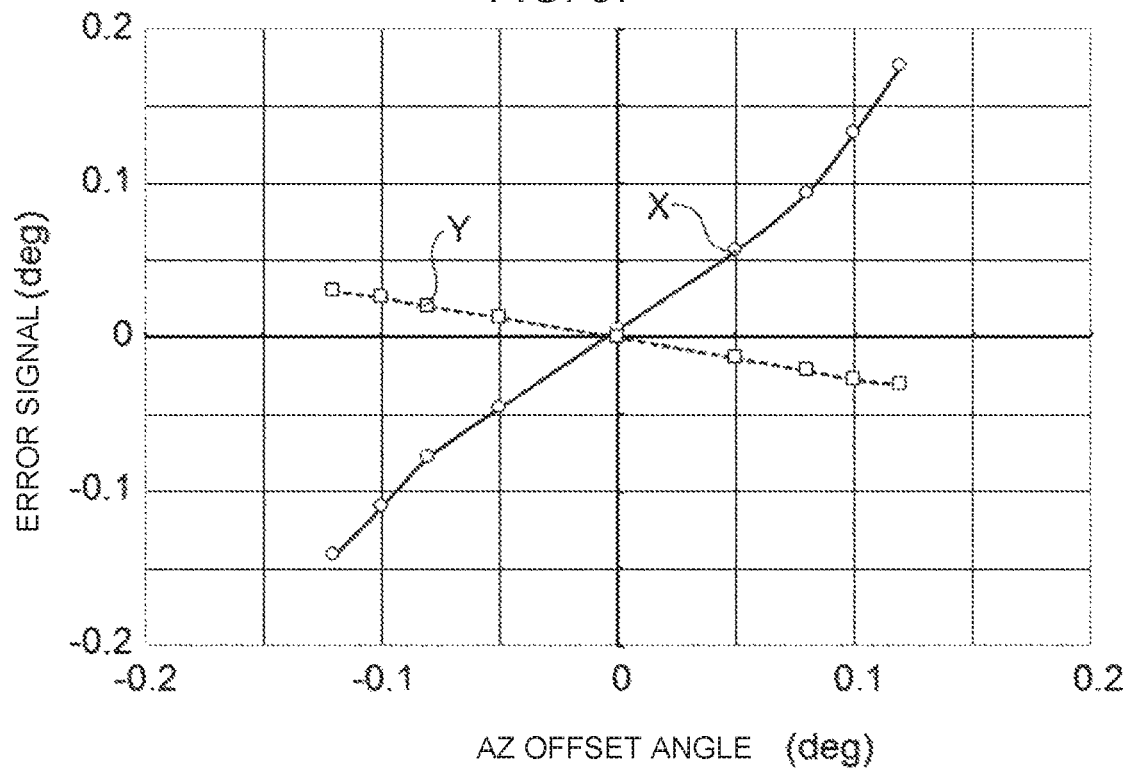
FIG. 37 is a diagram illustrating measurement angle error signals not being corrected and obtained in a case where the azimuth angle is changed by the antenna control device according to Embodiment 3.
Figure 38:
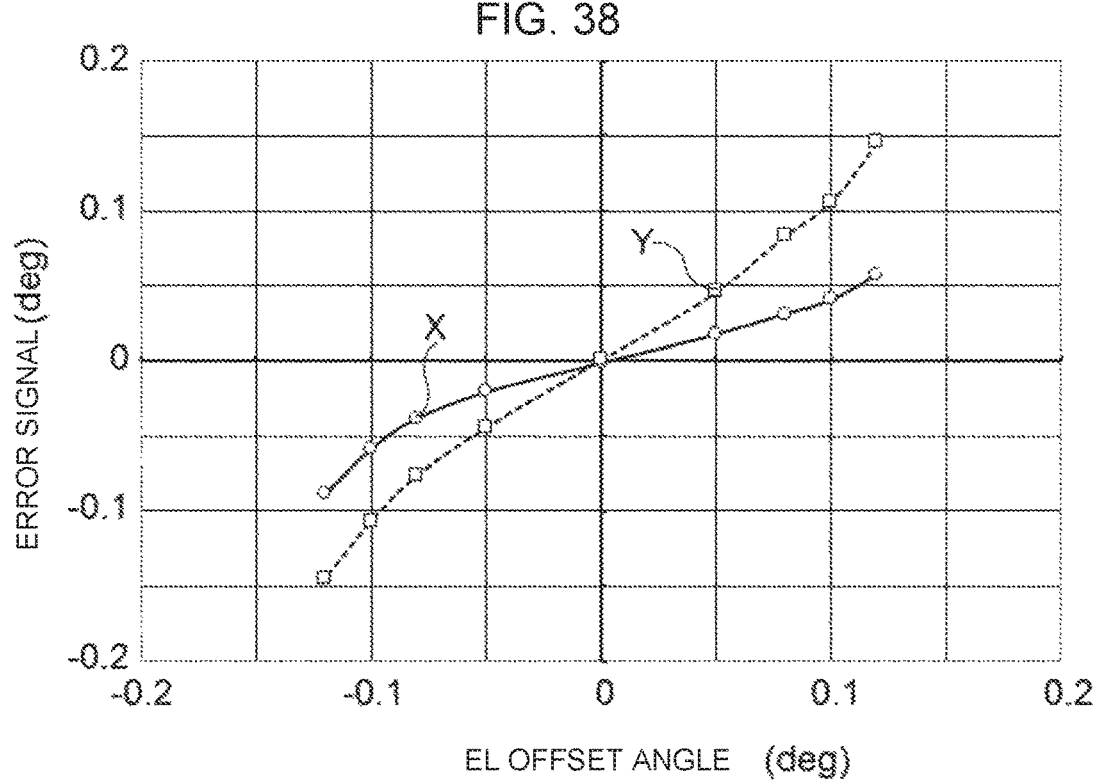
FIG. 38 is a diagram illustrating measurement angle error signals not being corrected and obtained in a case where the elevation angle is changed by the antenna control device according to Embodiment 3.
Figure 39:
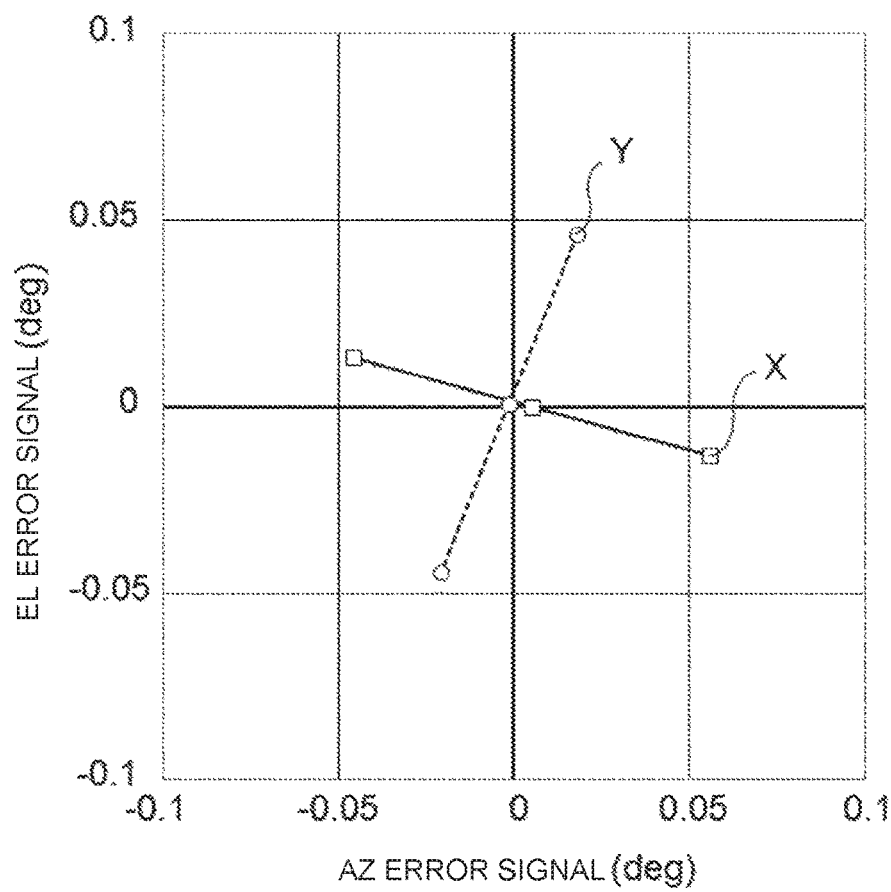
FIG. 39 is a diagram illustrating four points of measurement angle error signals used for correction by the antenna control device according to Embodiment 3.

The correction parameters calculated at 4 points existing in the linear region can be used in a non-linear region effectively. FIG. 37 to FIG. 42 are used to describe this. FIG. 37 is a diagram illustrating measurement angle error signals that are not corrected by correction parameters such as the phase correction value in the case where the azimuth angle is changed. FIG. 38 is a diagram illustrating measurement angle error signals that are not corrected in the case where the elevation is changed. FIG. 39 is a diagram illustrating measurement angle error signals at 4 points in a linear region used for correction.

FIG. 39 illustrates a case in which the measurement results are as follows.

Figure 40:
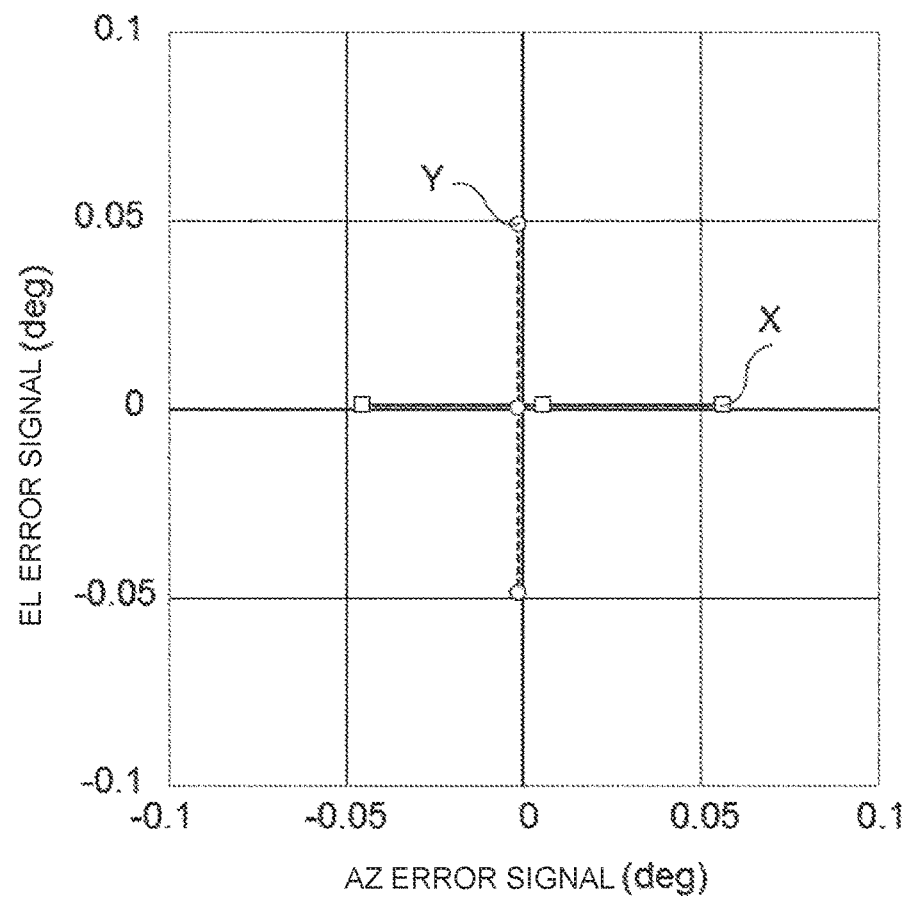
FIG. 40 is a diagram illustrating measurement angle error signals corrected at four points by the antenna control device according to Embodiment 3.

$\Delta\theta=0.05°$,
$X1=0.056°, Y1=-0.013°$
$X2=0.046°, Y2=0.013°$
$X3=0.018°, Y3=0.046°$
$X4=-0.021°, Y4=-0.045°$ The correction value calculator 32B calculates as follows.
$\alpha1=14.5°$
$\alpha2=23.2°$
$\gamma=18.8°$
$\omega=-4.4°$
$Ku=1.04$
$Kv=0.97$
$Du=-0.0016°$
$Dv=-0.0008°$ When correction is performed using the parameters calculated by the correction value calculator 32B, the measurement angle error signals at 4 points can be obtained as illustrated in FIG. 40. In FIG. 40, the measurement angle error signal X exists on the U-axis and the measurement angle error signal Y exists on the V-axis. It can be understood that the corrections are performed properly.

Figure 41:
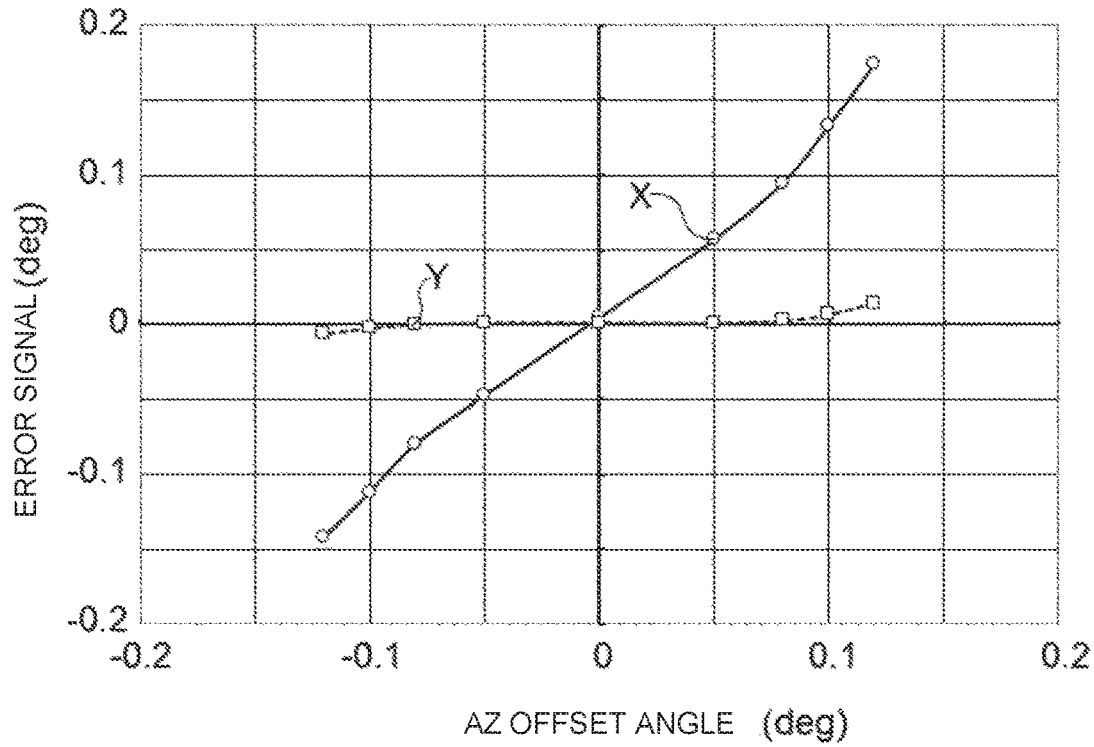
FIG. 41 is a diagram illustrating corrected measurement angle error signals obtained in a case where the azimuth angle is changed by the antenna control device according to Embodiment 3.
Figure 42:
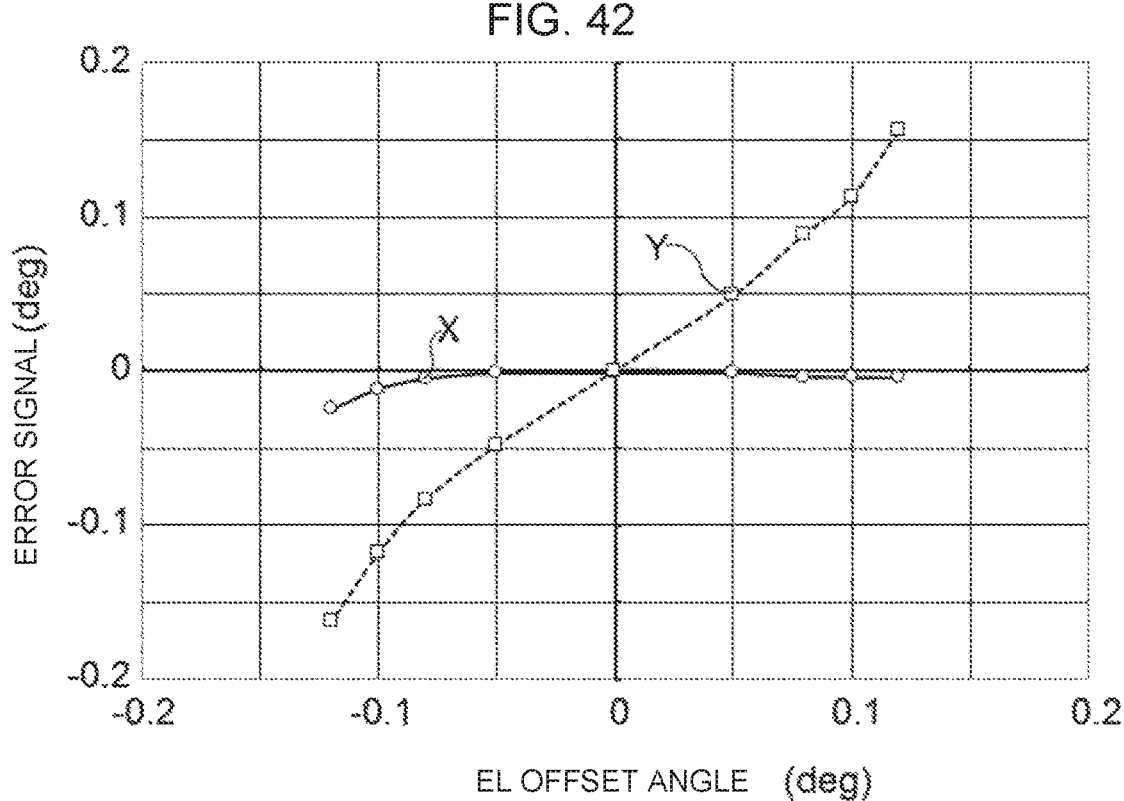
FIG. 42 is a diagram illustrating corrected measurement angle error signals obtained in a case where the elevation angle is changed by the antenna control device according to Embodiment 3.

FIG. 41 illustrates the corrected measurement angle error signals in the case where the azimuth angle is changed. FIG. 42 illustrates the corrected measurement angle error signals in the case where the elevation angle is changed. It can be understood that the corrections are performed almost properly even in the non-linear region. The simulation results illustrated in FIG. 41 and FIG. 42 show that the correction could be made even in the non-linear region by using the phase, orthogonality, and the sensitivity coefficients calculated using data at the 4 points, and that data at 4 points are sufficient for automatic adjustment using a calibration tower (collimation).

As a modified example, the error measurement data 55 may be generated at the reference celestial sphere point $G_o$ and the phase correction value $\gamma$ and so on may be calculated based on $G_j$ (j=0, 1, 2, 3, 4). The correction value calculator 32C in such a modified example calculates, for example, as follows.

$\alpha1=(\frac{1}{2})\times\tan^{-1}((Y1-Y2)/(X1-X2))+(\frac{1}{4})\times\tan^{-1}((Y1-Y0)/(X1-X0))+(\frac{1}{4})\times\tan^{-1}((Y2-Y0)/(X2-X0))$ $\alpha2=((\frac{1}{2})\times\tan^{-1}((X3-X4)/(Y3-Y4))+(\frac{1}{4})\times\tan^{-1}((Y3-Y0)/(X3-X0))+(\frac{1}{4})\times\tan^{-1}((Y4-Y0)/(X4-X0))$ $\gamma=(\alpha1+\alpha2)/2$ $\omega=(\alpha1-\alpha2)/2$ $Ku=(\cos(2\omega)/4\Delta\theta)\times(\sqrt{((X1-X2)^2+(Y1-Y2)^2)}+\sqrt{((X1-X0)^2+(Y1-Y0)^2)}+\sqrt{((X2-X0)^2+(Y2-Y0)^2)})$ $Kv=(\cos(2\omega)/4\Delta\theta)\times(\sqrt{((X3-X4)^2+(Y3-Y4)^2)}+\sqrt{((X3-X0)^2+(Y3-Y0)^2)}+\sqrt{((X4-X0)^2+(Y4-Y0)^2)})$ $Du=-((4\times X0+3\times(X1+X2+X3+X4))\times\cos(\omega-\gamma)+(4\times Y0+3\times(Y1+Y2+Y3+Y4))\times\sin(\omega-\gamma))/16/Ku$ $Dv=-((4\times X0+3\times(X1+X2+X3+X4))\times\sin(\omega+\gamma)+(4\times Y0+3\times(Y1+Y2+Y3+Y4))\times\cos(\omega+\gamma))/16/Kv$ Celestial sphere points may be set for generating the error measurement data 55 at more than 3 points on the U-axis. $\alpha1$ and other parameters may be determined such that the sum of squares of the post-correction residuals is minimized similar to that in Embodiment 1. Celestial sphere points may be set for generating the error measurement data 55 at more than 3 points on the V-axis. $\alpha2$ and other parameters may be determined such that the sum of squares of the post-correction residuals is minimized similar to that in Embodiment 1. Celestial sphere points may be set for generating the error measurement data 55 at positions not on the U-axis or the V-axis. $\gamma$, $\omega$, and other parameters may be calculated by taking into account at the same time all celestial sphere points for generating the error measurement data 55 similar to that in Embodiment 1.

In this Embodiment 3 as well, since the phase correction value and the sensitivity coefficients can be calculated correctly even in the case where the signal-to-noise ratio of the difference signal is low, the measurement angle error signals can be corrected appropriately, and thus the communication counterpart can be tracked more accurately than with conventional methods.

Embodiment 4

Figure 43:
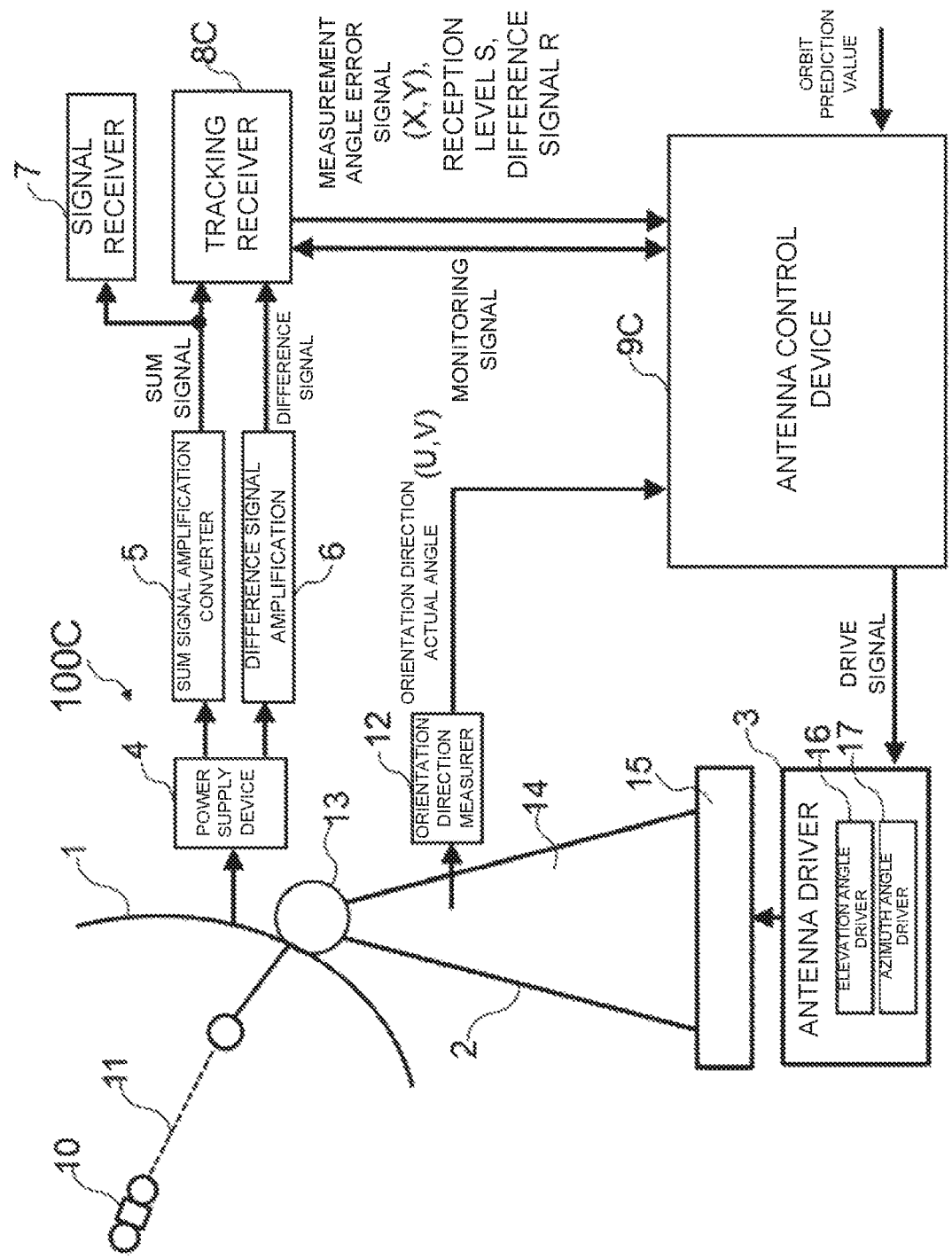
FIG. 43 is a diagram illustrating a configuration of an antenna system including an antenna control device according to Embodiment 4 of the present disclosure.

Embodiment 4 is a case where the signal intensity of the difference signal is received by an antenna control device and the offset angle $\Delta\theta$ is changed in accordance with the signal intensity of the difference signal. Here, although this embodiment is a modification of Embodiment 2, this can be similarly applied to Embodiment 1 as well. FIG. 43 is a diagram illustrating a configuration of an antenna system including an antenna control device according to Embodiment 4 of the present disclosure. A tracking receiver 8C also outputs the signal intensity of the difference signal (difference signal level R).

Figure 44:
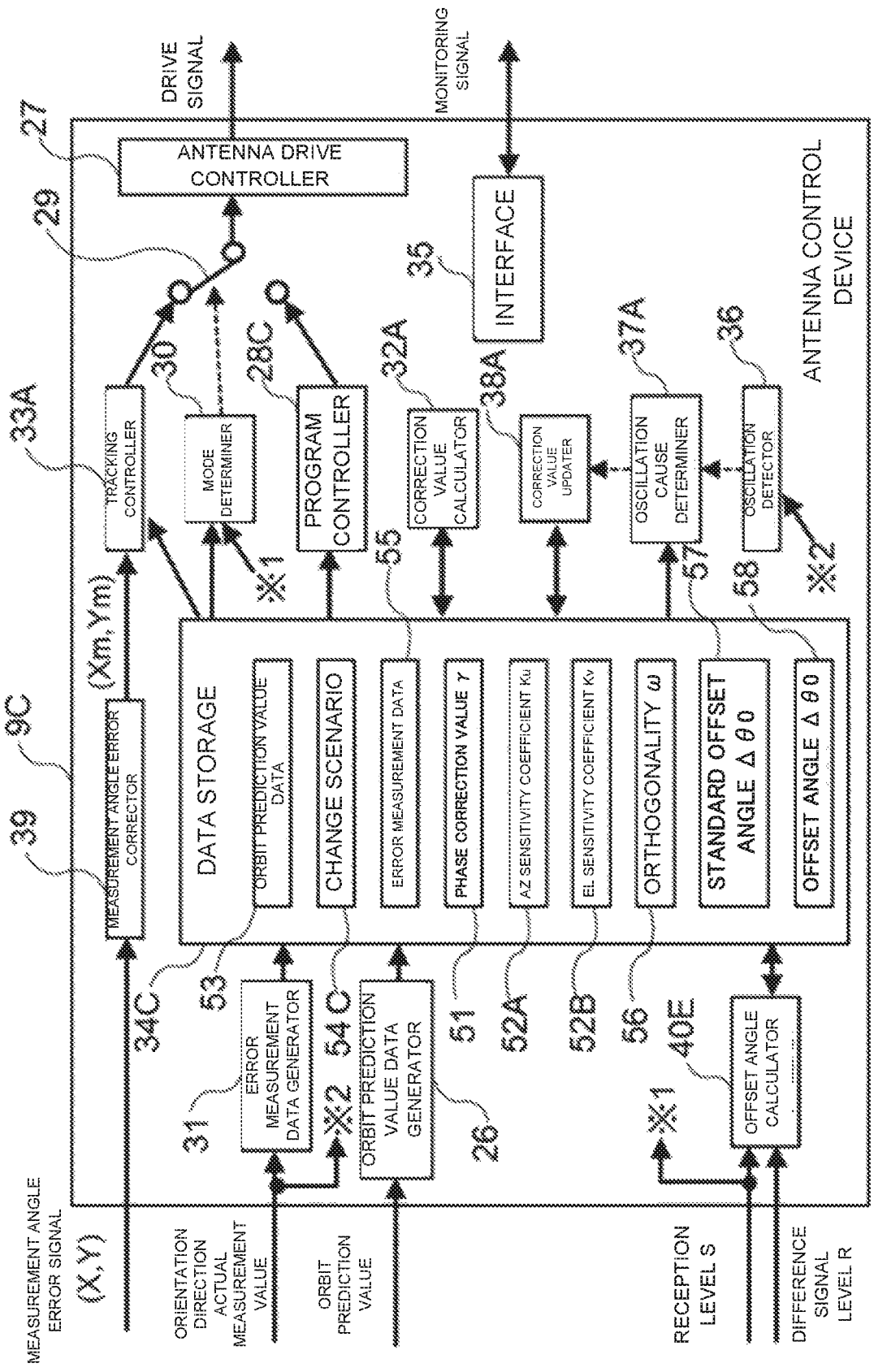
FIG. 44 is a diagram illustrating a configuration of the antenna control device according to Embodiment 4.

FIG. 44 is a block diagram illustrating a configuration of the antenna control device according to Embodiment 4. The points that differ from those in FIG. 19 of Embodiment 2 are described. An antenna control device 9C that is included in an antenna system 100C includes an offset angle calculator 40. The offset angle calculator 40 changes the offset angle $\Delta\theta$ in accordance with the difference signal level R. In a case where the difference signal level R is low, the offset angle $\Delta\theta$ is increased such that a signal intensity is greater than or equal to the lower limit value. The data storage 34C is also modified. The data storage 34C is modified to include a standard offset angle 57 and an offset angle 58. A change scenario 54E is a scenario in which the offset angle 58 is used to change the command value of the orientation direction. A program controller 28C uses a changeable offset angle $\Delta\theta$ to perform program control.

The standard offset angle 57 is an angle used as offset angle $\Delta\theta$ in a case where the difference signal level R is sufficiently high. The offset angle 58 is an offset angle that is calculated by the offset angle calculator 40 in accordance with the difference signal level R.

In order to describe the function of the offset angle calculator 40, the following variables are defined.

Δθ0: Standard offset angle.
Δθmax: Upper limit value of offset angle Δθ. For example, approximately 60% of the half width of the antenna 1 is set.
R: Difference signal level.
Rmin: Lower limit value with respect to the difference signal level R.
S: Reception level.
Smin: Lower limit value with respect to the reception level S.
fr (Δθ, R): Function for predicting the difference signal level R with respect to the offset angle Δθ. R increases as Δθ increases.
fs (Δθ, S): Function for predicting the reception level S with respect to the offset angle Δθ. S decreases as Δθ increases.

Here the fr (Δθ, R) and fs (Δθ, S) are functions derived by approximating the antenna pattern by a gauss function, for example. The standard offset angle Δθ0 is determined such that calculation accuracy of the correction parameters calculated using the error measurement data of N-pieces is greater than or equal to the required accuracy in a case where the difference signal level R is the lower limit value Rmin.

The offset angle calculator 40 calculates the offset angle in accordance with the difference signal level R and the reception level S as follows.

(a) In a case where R≥Rmin, it is determined that Δθ=Δθ0. At Δθ=Δθ0, a sufficient difference signal level R is obtained.

(b) In a case where S≥Smin, it is determined that Δθ=Δθ0. The reception level S is low and a further reduction in the reception level cannot be allowed.

(c) In a case where R<Rmin and S>Smin, a Δθ that satisfies S≥Smin, R≥Rmin, and Δθ≤Δθmax is determined. For satisfying the conditions, it is preferable to have a small Δθ. In a case where a Δθ that satisfies all of the conditions cannot be obtained, a Δθ is determined that satisfies as many conditions as possible, with the highest priority given to S≥Smin, followed by Δθ≤Δθmax, and then R≥Rmin.

(c) In the case where R<Rmin and S>Smin, the case is divided into several cases as follows and the offset angle is determined for each case.

(c1) When fs (Δθmax, S)≥Smin and fr (Δθmax, R)<Rmin, it is determined that Δθ=Δθmax. Since the reception level S is sufficiently high, it can be set that Δθ=Δθmax. However, since the difference signal level R is low, even though it is set that Δθ=Δθmax, it cannot be set that R=Rmin. It is determined that Δθ=Δθmax, such that R is as high as possible.

(c2) When fs (Δθmax, S)≥Smin and fr (Δθmax, R)≥Rmin, a Δθ is determined within a range of Δθmax≥Δθ≥Δθr, here Δθr is Δθ satisfying fr (Δθ, R)≥Rmin. Since the reception level S is sufficiently high, the Δθ is determined only considering to make a difference signal level R to be greater than or equal to the lower limit value Rmin.

(c3) In a case where there exists Δθs that is a Δθ satisfying fs (Δθ, S)=Smin, Δθ<Δθmax, and fr (Δθ, R)≥Rmin, a Δθ is determined within a range of Δθs≥Δθ≥Δθr, here Δθr is a Δθ satisfying fr (Δθ, R)=Rmin.

(c4) In a case where fr (Δθs, R)<Rmin, it is determined that Δθ=Δθs. The difference signal level R is made to be as high as possible in a range in which the reception level S is greater than or equal to the lower limit value.

If, in the above, Δθ is determined to be within a range, the minimum Δθ in the range may be determined. If the difference signal level R and the reception signal S are divided into multiple ranges, a Δθ determined to satisfy the condition of each range in the multiple ranges may be used.

Figure 45:
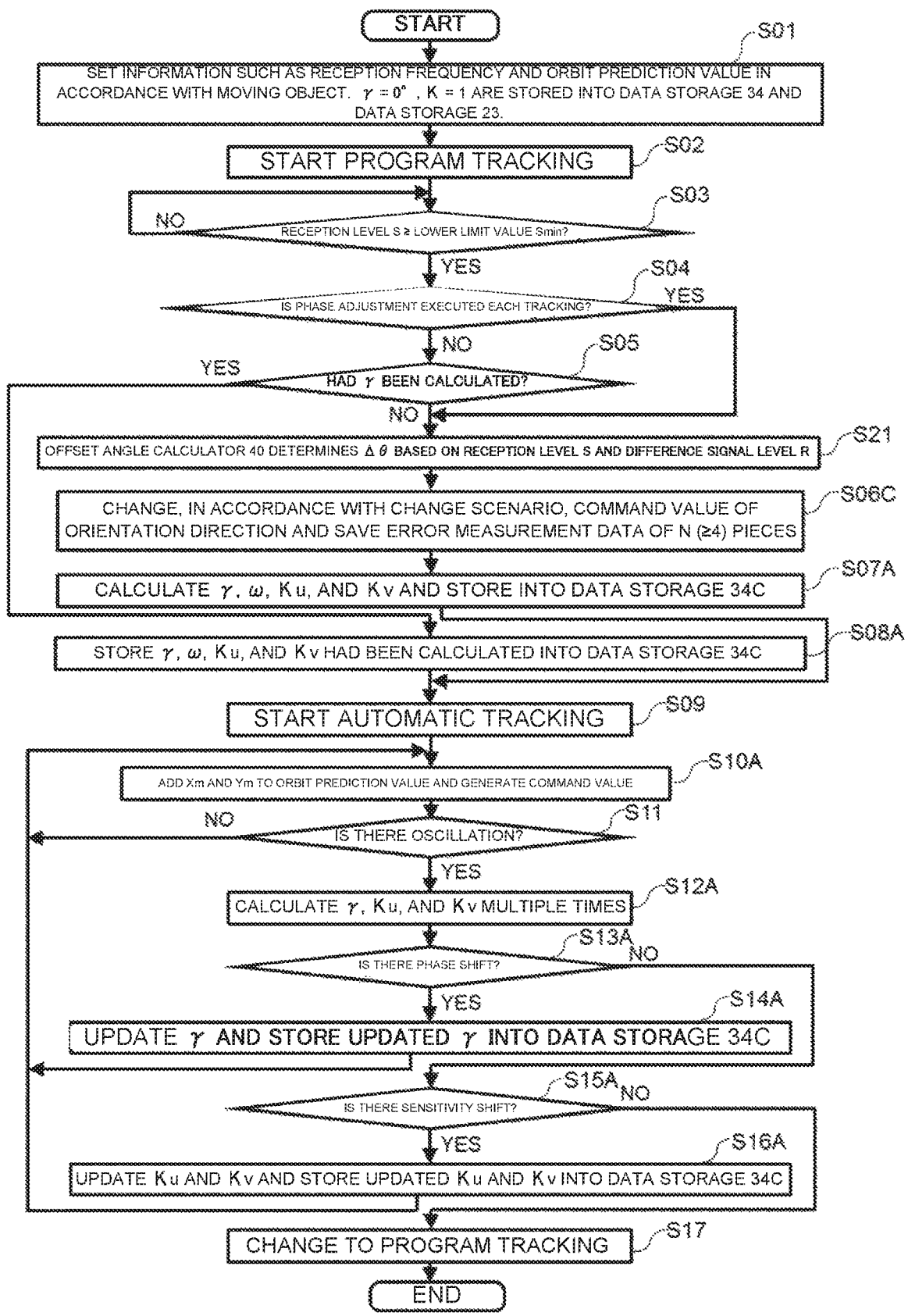
FIG. 45 is a flowchart illustrating operation of the antenna control device according to Embodiment 4.

The operation is described with reference to FIG. 45. FIG. 45 is a flowchart illustrating operation of the antenna control device according to Embodiment 4. The points that differ from those in FIG. 7 of Embodiment 1 are described.

Step S21 is added immediately before step S06C. In S21, the offset angle calculator 40 determines the offset angle Δθ based on the reception level S and the difference signal level R. In S06C, the orientation direction of the antenna is changed in accordance with a change scenario 54C in which the offset angle Δθ is used.

Since the offset angle Δθ is determined in accordance with the difference signal R, correction parameters such as the phase correction value γ can be calculated in a state in which the signal intensity of the difference signal is higher than that in Embodiment 2 and without causing the reception level S to be reduced more than necessary.

The determining of the offset angle Δθ based on the difference signal level R is equivalent to determining the offset angle Δθ in accordance with the signal-to-noise ratio (SN ratio) provided that the level of noise is constant. The offset angle Δθ may be determined based on the SN ratio of the difference signal instead of the difference level R. The offset angle calculator is a change reference angle determiner that determines an offset angle Δθ such that the signal intensity of the difference signal or the signal-to-noise ratio is greater than or equal to a lower limit value.

Embodiment 5

Figure 46:
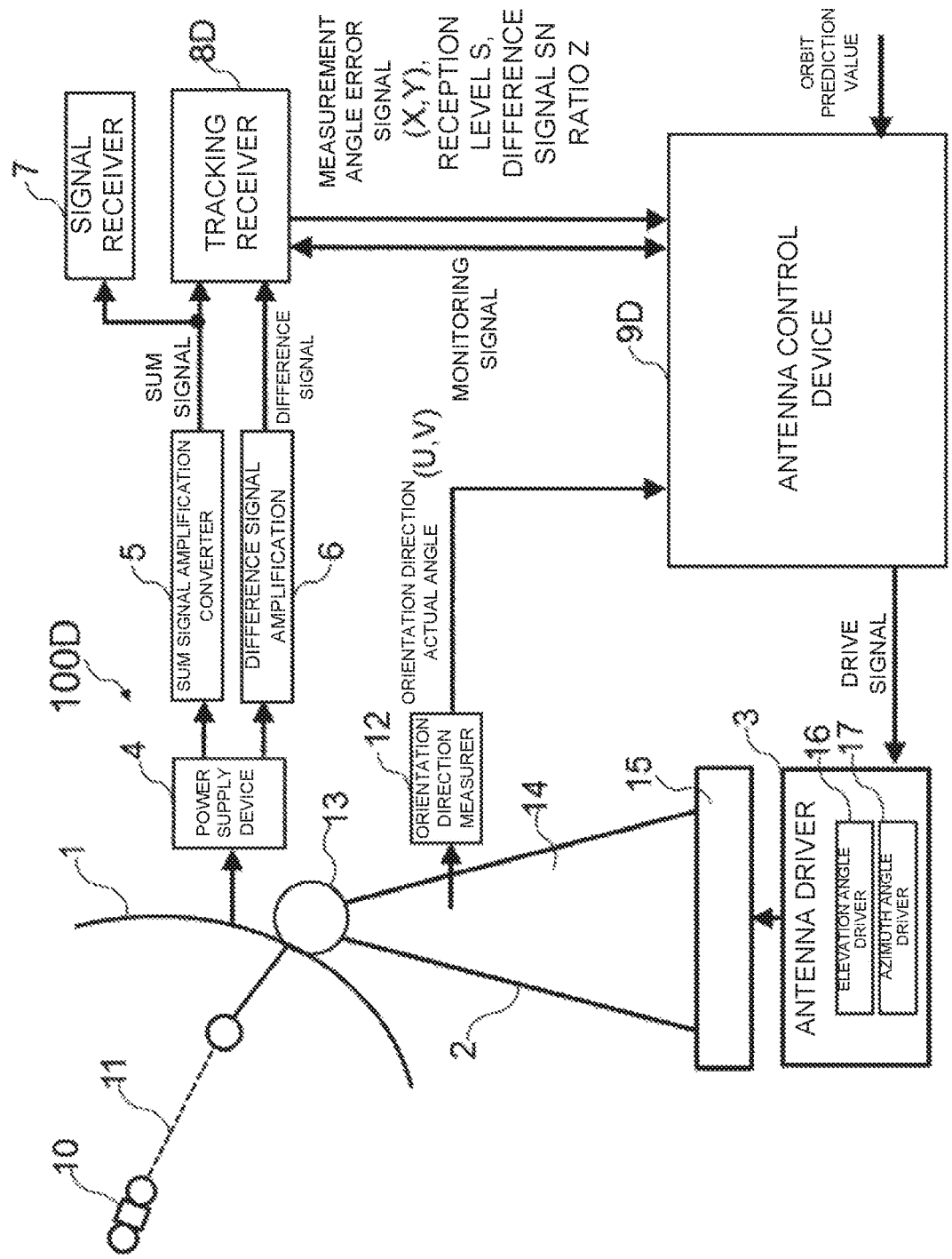
FIG. 46 is a diagram illustrating a configuration of an antenna system including an antenna control device according to Embodiment 5 of the present disclosure.
Figure 47:
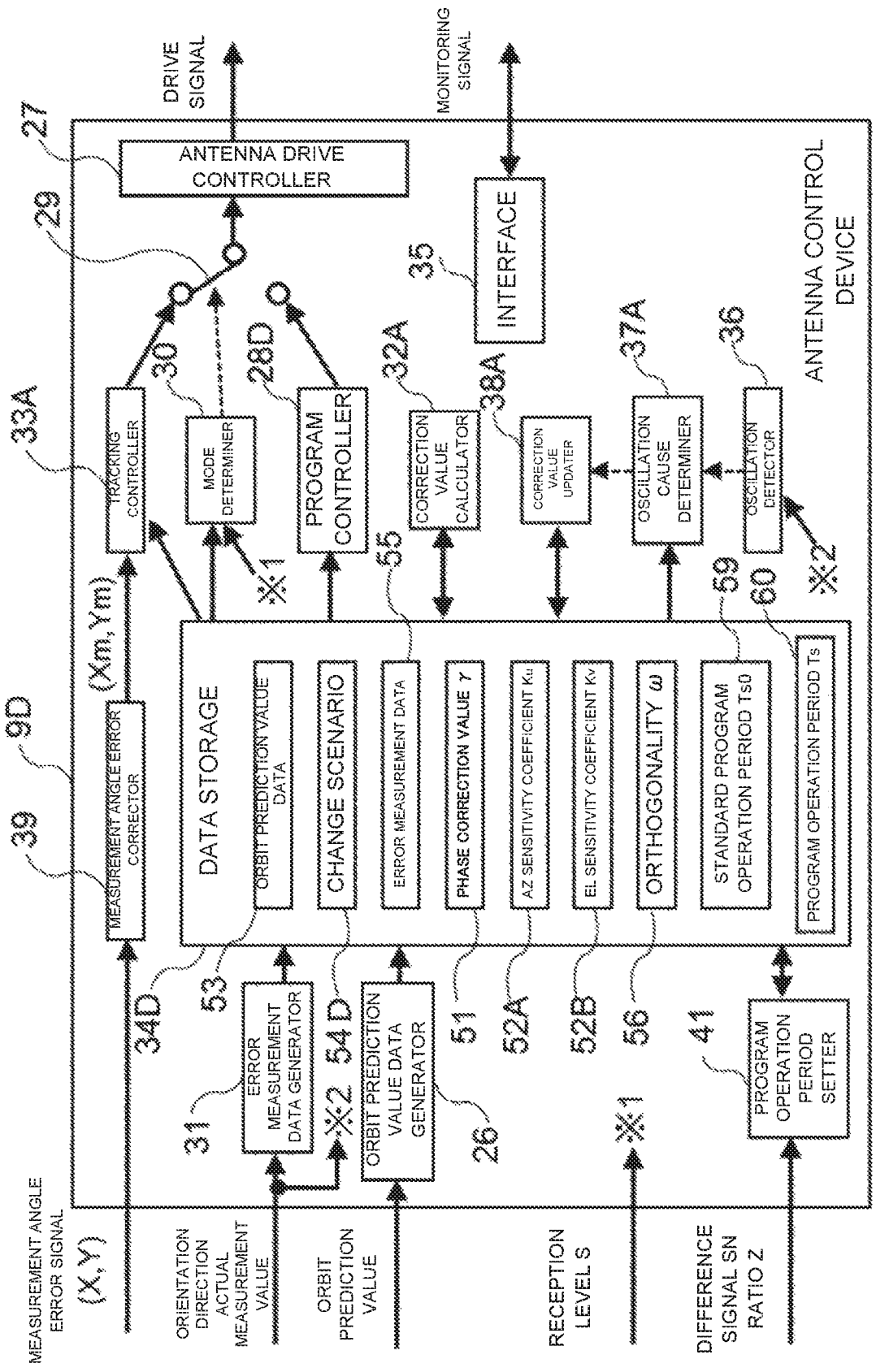
FIG. 47 is a block diagram illustrating a configuration of an antenna control device according to Embodiment 5.

Embodiment 5 is a case in which a SN ratio of a difference signal is received by the antenna control device and a length of a period for performing program tracking is changed in accordance with the SN ratio of the difference signal. FIG. 46 is a diagram illustrating a configuration of an antenna system including an antenna control device according to Embodiment 5 of the present disclosure. A tracking receiver 8D outputs the SN ratio Z of the difference signal to an antenna control device 9D. FIG. 47 is a block diagram illustrating a configuration of the antenna control device according to Embodiment 5. The points that different from those in FIG. 19 of Embodiment 2 are described.

The antenna control device 9D included in the antenna system 100D includes a program operation period setter 41. The program operation period is a time period during which the command value of the orientation direction is changed in accordance with the change scenario. The program operation period setter 41 changes the length of the program operation period in accordance with the SN ratio of the difference signal. The program operation period setter 41 increases the length of the program operation period in a case where the SN ratio of the difference signal is less than or equal to a lower limit value. The program controller 28D uses a changeable program operation period to perform program control.

The program operation period is set such that the calculation accuracy of the correction parameters calculated by the correction value calculator 32A is greater than or equal to a predetermined accuracy. Reason being, the values that minimize the average of signals containing error have improved SN ratio than that of the original signal. Where the SN ratio of an original signal is denoted as Z, the SN ratio of an average value of signals of β-pieces is expressed as Z×√(β). The value that minimizes the square error with respect to data of β-pieces of a single variable is the average value of data of β-pieces. It can be considered that the SN ratio of variable value that minimizes the square error of multiple variables also is $Z \times \sqrt{(B)}$.

A data storage 34D is also modified. The data storage 34D includes a standard program operation period 59 and a program operation period 60. The change scenario 54D is a scenario that uses the program operation period 60 in changing the command value of the orientation direction. The standard program operation period 59 is a length of time (program operation period) during which program tracking is performed in accordance with the change scenario 54D in the case where the difference signal level R is sufficiently high. The program operation period 60 is a program operation period set by the program operation period setter 41. The error measurement data 53 is generated at a predetermined time interval during operation in accordance with the change scenario 54D. The number of pieces of error measurement data to be generated during operation in accordance with the change scenario 54D is proportional to the program operation period. Determining the program operation period is determining the count number N of the error measurement data used by the correction value calculator.

To describe the functions of the program operation period setter 41, the following variables are defined.
Ts: The program operation period.
Ts0: Standard program operation period.
Tmax: Upper limit value of the program operation period.
Z: SN ratio of the difference signal.
Zmin: Lower limit value with respect to the SN ratio of the difference signal.

The number N of error measurement data for the standard program operation period Ts0 can be determined such that calculation accuracy of the correction parameters calculated based on the error measurement data of N-pieces is greater than or equal to the required accuracy in a case where the SN ratio Z of the difference signal is the lower limit value Zmin.

The program operation period setter 41 sets the program operation period Ts in accordance with the SN ratio Z of the difference signal as follows.
 (a) In a case where Z≥Zmin, it is determined that Ts=Ts0. At Ts0, a sufficient SN ratio Z of the difference signal is obtained.
 (b) In a case where Z<Zmin. it is determined that Ts=min (Ts0×√(Zmin/Z), Tmax). Since setting Ts to some tens of minutes is not practical, it is determined that Tmax is the upper limit.

The program operation period Ts may be set for each range of the SN ratio of the difference signal. A Ts for each range may be determined (i) such that the calculation accuracy of the correction parameters is greater than or equal to the predetermined accuracy and (ii) to be monotonically non-decreasing with respect to increases in the SN ratio.

Figure 48:
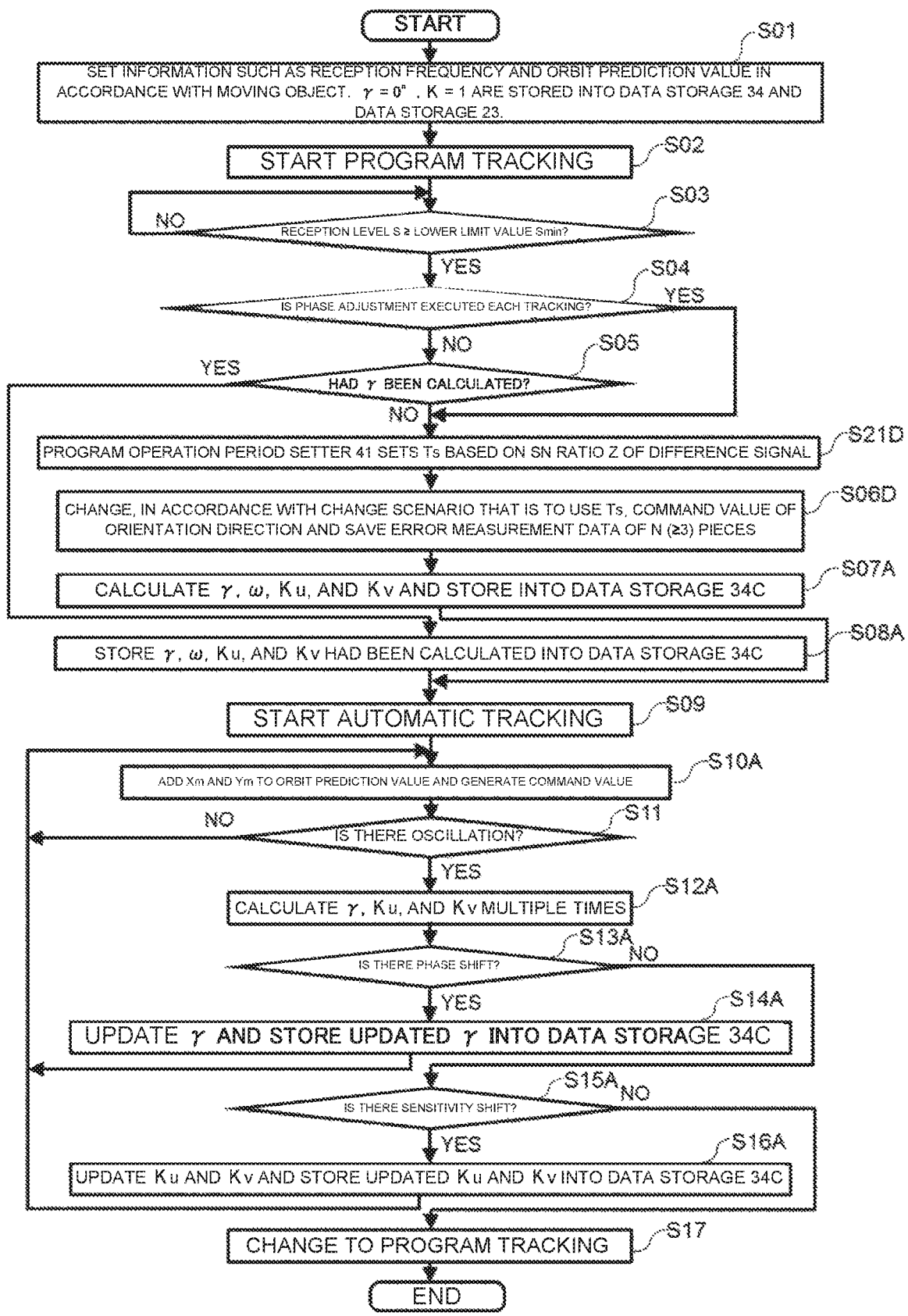
FIG. 48 is a flowchart illustrating operation of the antenna control device according to Embodiment 5.

The operation is described with reference to FIG. 48. FIG. 48 is a flowchart illustrating operation of the antenna control device according to Embodiment 5. The points that differ from those in FIG. 45 of Embodiment 4 are described.

In step S21D, the program operation period setter 41 sets the program operation period Ts based on the SN ratio Z of the difference signal. In S06D, the command value of the orientation direction of the antenna is changed in accordance with the change scenario in which program operation period Ts is used.

Since the program operation period Ts is determined in accordance with the SN ratio Z of the difference signal, correction parameters such as the phase correction value γ can be calculated at calculation accuracy that is greater than or equal to the predetermined accuracy.

In a case where not the SN ratio but the signal intensity of the difference signal is below the lower limit value, the program operation period Ts may be determined. The program operation period setter is a data count number determiner that determines a program operation period to be monotonically non-decreasing with respect to decreases in signal intensity or a signal-to-noise ratio in a case where the signal intensity or the signal-to-noise ratio of the difference signal is below a threshold.

Embodiment 6

Figure 49:
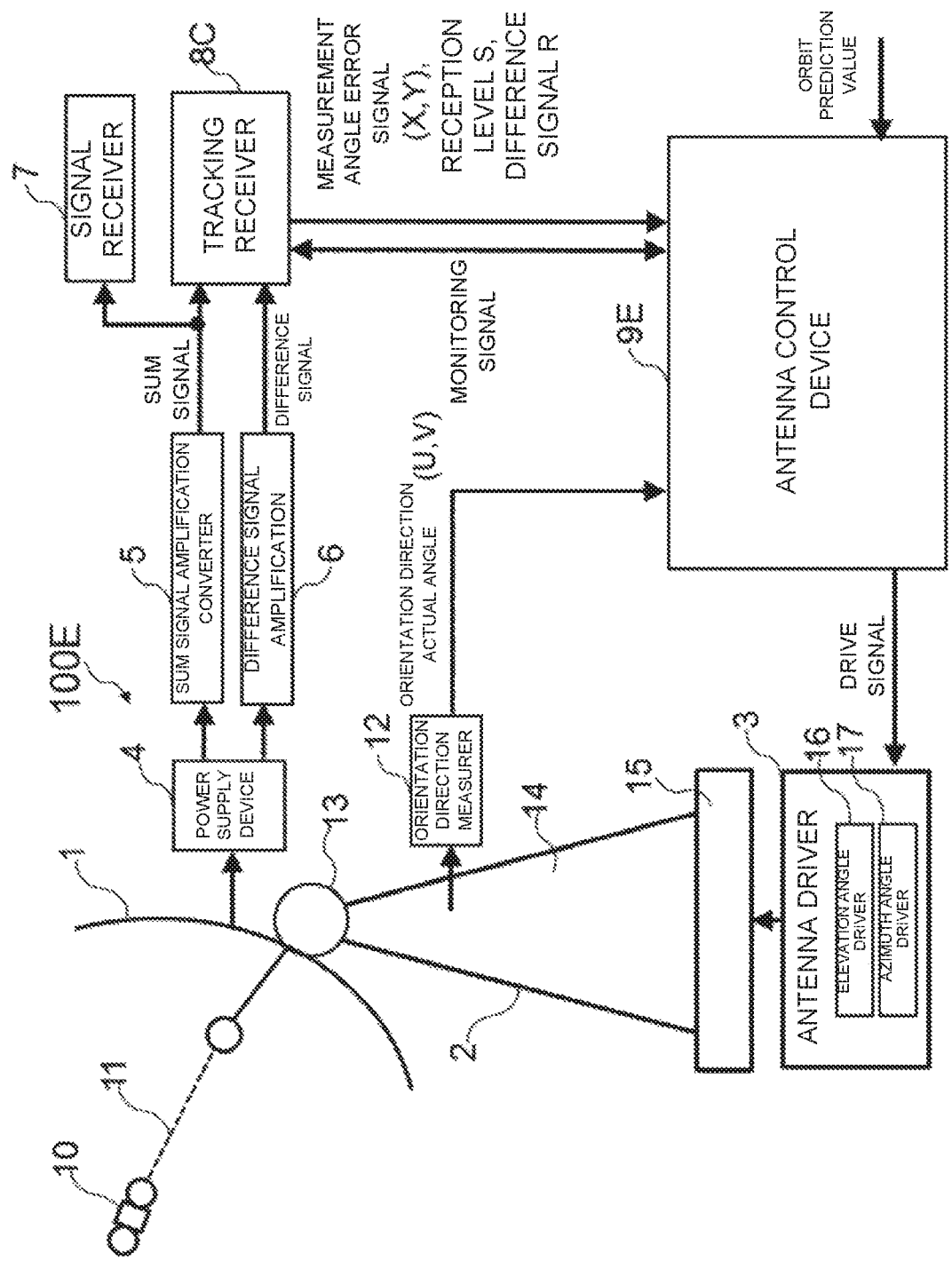
FIG. 49 is a diagram illustrating a configuration of an antenna system including an antenna control device according to Embodiment 6 of the present disclosure.
Figure 50:
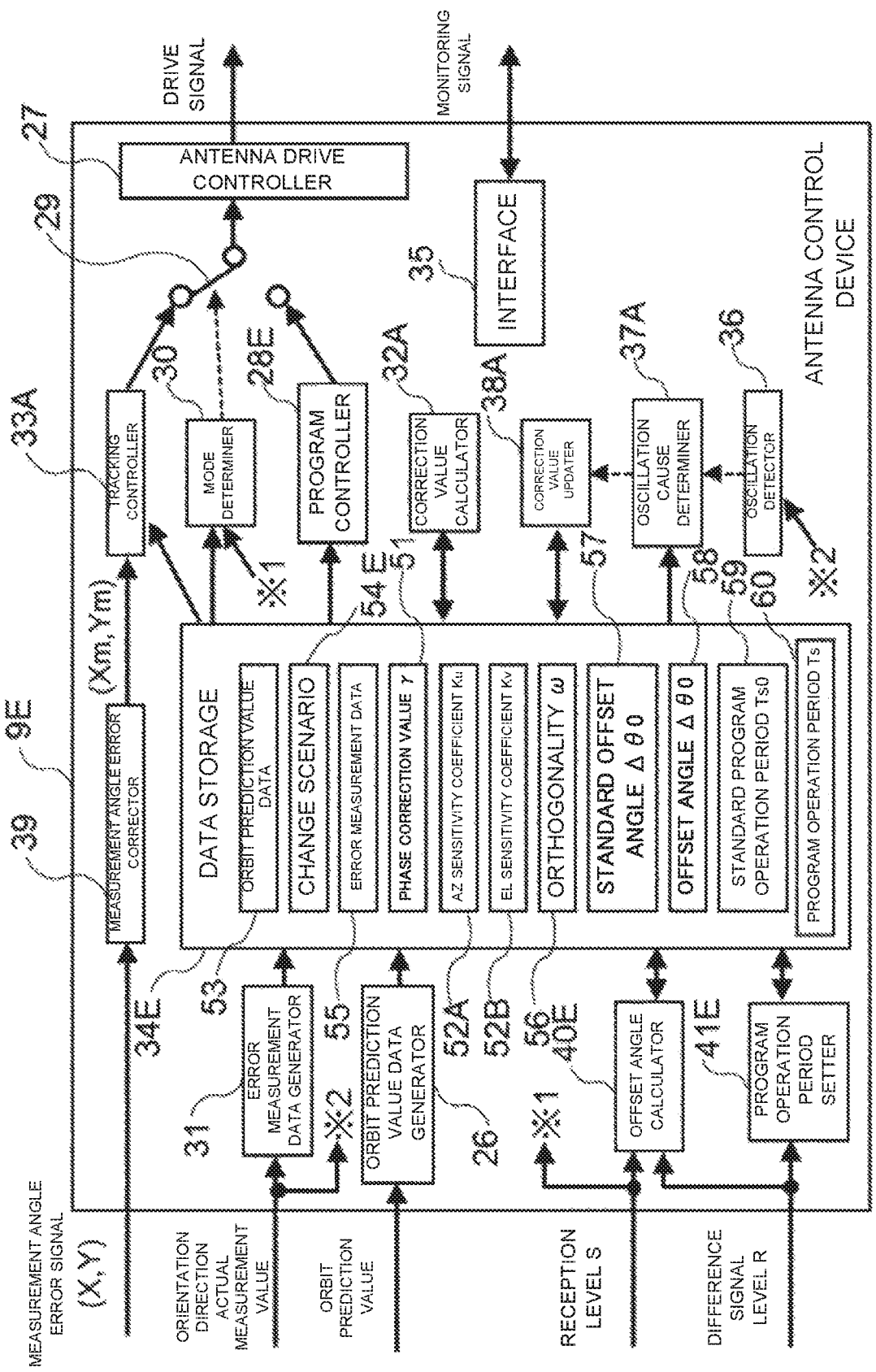
FIG. 50 is a block diagram illustrating a configuration of the antenna control device according to Embodiment 6.

Embodiment 6 is a case in which a difference signal level is received by antenna control device and an offset angle and a length of a period for performing program tracking is changed in accordance with the difference signal level. Although the calculation accuracy of the correction parameters calculated by the correction value calculator 32A in a case where either the offset angle or the length of the period is changed during which program tracking is performed cannot reach or exceed the predetermined accuracy, the predetermined accuracy can be reached or exceeded by changing both the offset angle and the length of time during which the program tracking is performed. FIG. 49 is a diagram illustrating a configuration of an antenna system including an antenna control device according to Embodiment 6 of the present disclosure. A tracking receiver 8C outputs a difference signal R to an antenna control device 9D. FIG. 50 is a block diagram illustrating a configuration of the antenna control device according to Embodiment 6. The points that differ from those in FIG. 44 of Embodiment 4 are described.

The antenna control device 9E that is included in an antenna system 100E includes a program operation period setter 41E. The program operation period setter 41E changes the length of a program operation period in accordance with the difference signal level R. In a case where the difference signal R is less than or equal to a lower limit value, the program operation period setter 41E increases the length of the program operation period such that the difference signal level R is greater than or equal to the lower limit value. A data storage 34E also includes the standard program operation period 59 and the program operation period 60. The change scenario 54E is a scenario in which the offset angle 58 and the program operation period 60 are used to change the command value of the orientation direction. An offset angle calculator 40E is also modified. A program controller 28E uses a changeable offset angle Δθ and a changeable program operation period Ts to perform program control.

The number N of the error measurement data for a case in that the standard offset angle Δθ0 and the standard program operation period Ts0 is determined such that calculation accuracy of the correction parameters calculated based on the error measurement data of N-pieces is greater than or equal to the required accuracy in a case where the difference signal level R is the lower limit value Rmin.

The manner in which the program operation period Ts is determined by the program operation period setter 41E where lengthening the program operation period Ts is applied preferentially, the offset angle Δθ is changed in a case in which calculation accuracy of the correction parameters cannot reach or exceed the predetermined accuracy by lengthening the program operation period Ts. Since the lengthening of the program operation period Ts does not bring a reduction in the reception level S, it is preferable lengthening the program operation period Ts is applied preferentially in a case where not reducing the reception level S is given higher priority.

The program operation period setter 41E sets the program operation period Ts in accordance with the difference signal R as follows.
  (a) In a case where R≥Rmin, it is determined that Ts=Ts0.
     At Ts0, sufficient difference signal delve R is obtained.
  (b) In a case where R<Rmin, it is determined that Ts=min (Ts0×√(Rmin/R), Tmax).

Using R×√(Ts/Ts0) as R, the offset angle calculator 40E operates similarly to the offset angle calculator 40.

In a case where the offset angle Δθ is determined first, the offset angle calculator 40E operates similarly to the offset angle calculator 40. By using the R predicted by fr (Δθ, R), the program operation period setter 41E operates similarly to a case when the program operation period Ts is determined first.

In a case where the offset angle Δθ can make the difference signal level R to be R≥Rmin. it is determined that Ts=Ts0. Otherwise, it is determined that Ts=min (Ts0×√(Rmin/R), Tmax).

The operation is described with reference to FIG. 51. FIG. 51 is a flowchart illustrating operation of the antenna control device according to Embodiment 5. The points that differ from those in FIG. 48 of Embodiment 5 are described.

In step S21E, the program operation period setter 41E sets the program operation period Ts based on the difference signal level R In the same step, the offset angle calculator 40E determines the offset angle Δθ based on the reception level S and the difference signal level R The difference signal level R is a value considering the program operation period Ts.

In step S06E, the command value of the orientation direction of the antenna is changed in accordance with a change scenario in which the offset angle Δθ and the program operation period Ts is used.

Since the offset angle Δθ and the program operation period Ts are determined in accordance with the difference signal level R without causing the reception level S to be reduced more than necessary, and thus the correction parameters such as the phase correction value γ can be calculated with the SN ratio of the difference signal in a state that is better than that in Embodiment 2.

In the present disclosure, a free combination of the embodiments or a modification or omission of each embodiment can be made without departing from the scope of the present disclosure.

REFERENCE SIGNS LIST 100, 100A, 100B, 100C, 100D, 100E: Antenna system
1 Antenna
2 Antenna mount
3 Antenna driver
4 Power supply device
5 Sum signal amplification converter
6 Difference signal amplification converter
7 Signal receiver
8 Tracking receiver (Measurement angle processor)
9, 9A, 9B, 9C, 9D, 9E Antenna control device (control device)
10, 10B Moving object
11, 11B Radio wave
12 Orientation direction measurer
13 Elevation angle mount
14 Azimuth angle mount
15 Base
16 Elevation angle driver
17 Azimuth angle driver
18 Sum signal AGC circuit
19 Difference signal AGC circuit
20 90 degree phase shifter
21 I-signal detector
22 Q-signal detector
23 Data storage
24 Coordinate converter
25 Interface
26 Orbit prediction value data generator
27 Antenna drive controller
28, 28B, 28C, 28D, 28E Program controller
29 Toggle switch
30 Mode determiner
31 Error measurement data generator
32, 32A, 32B, 32C Correction value calculator
33, 33A, 33B Tracking controller
34, 34A, 34C, 34D, 34E Data storage
35 Interface
36 Oscillation detector
37, 37A Oscillation cause determiner (Phase shift detector. Sensitivity shift detector)
38 Correction value updater (Phase correction value updater, sensitivity coefficient value updater)
39 Measurement angle error corrector
40, 40E Offset angle calculator
41, 41E Program operation period setter
51 Phase correction value
52 Sensitivity coefficient
52A AZ sensitivity coefficient (Azimuth angle sensitivity coefficient)
52B EL sensitivity coefficient (Elevation angle sensitivity coefficient)
53 Orbit prediction value data
54 Change scenario
55 Error measurement data
56 Orthogonality
57 Standard offset angle
58 Offset angle (change reference angle)
59 Standard program operation period
60 Program operation period
71 Calibration tower (test radio wave source)
81 Azimuth angle actual measurement value
82 Azimuth angle servo system tracking error
83 Elevation angle actual measurement value
84 Elevation angle servo system tracking error

The invention claimed is:

1. A control device, comprising:
  antenna drive control circuitry a configured to receive an inputted command value of an orientation direction and to control an antenna driver to change the orientation direction, the orientation direction being a direction in which an antenna configured to receive radio waves from a communication counterpart to generate reception signals is oriented, such that a difference between the command value and the orientation direction approaches zero,
  orbit prediction value circuitry configured to acquire an orbit prediction value of the communication counterpart;
  program control circuitry configured to generate the command value being changed in accordance with a predetermined change scenario, the change scenario indicating a time transition of an amount by which the orientation direction is changed from the orbit prediction value, and to output the generated command value to the antenna drive control circuitry;

error measurement data generation circuitry configured to generate error measurement data including (i) an arrival direction error obtained from a sum signal and a difference signal of the reception signals, the arrival direction error representing a difference between the orientation direction and an arrival direction being a direction from which the radio waves come and arrive, and (ii) an orientation direction actual measurement value being an actual measurement value of the orientation direction when the reception signals used to obtain the arrival direction error are received;

correction value circuitry configured to calculate, based on at least three pieces of the error measurement data being obtained at conditions in which the program control circuitry outputs the command values being different from each other, a phase correction value being an angle by which the arrival direction error is rotated; and tracking control circuitry configured to output, to the antenna drive control circuitry, as the command value, a value obtained by adding (i) the arrival direction error corrected based on the phase correction value to (ii) the orientation direction actual measurement value.

2. The control device according to claim 1, wherein the correction value circuitry is further configured to calculate the phase correction value such that a sum of squares of post-correction residuals for the at least three pieces of the error measurement data is minimized, the post-correction residual being a difference between (i) a value of either one of an actual measurement value error and the arrival direction error, corrected based on the phase correction value and (ii) a value of the other one, the actual measurement value error being a difference between the arrival direction and the orientation direction actual measurement value.

3. The control device according to claim 1, wherein
the correction value circuitry is further configured to calculate the phase correction value and a sensitivity coefficient being a value of a ratio between an actual measurement value error and the arrival direction error, the actual measurement value error being a difference between the arrival direction and the orientation direction actual measurement value, and
the tracking control circuitry is further configured to output, to the antenna drive control circuitry, as the command value, a value obtained by adding (i) the arrival direction error corrected based on the phase correction value and the sensitivity coefficient to (ii) the orientation direction actual measurement value.

4. The control device according to claim 3, wherein the correction value circuitry is further configured to calculate the phase correction value and the sensitivity coefficient such that a sum of squares of post-correction residuals for the at least three pieces of the error measurement data is minimized, the post-correction residual being a difference between (i) a post-correction actual measurement value error and (ii) a post-correction arrival direction error, the post-correction actual measurement value error and the post-correction arrival direction error being the actual measurement value error and the arrival direction error obtained by correcting either one of the actual measurement value error and the arrival direction error, based on each of the phase correction value and the sensitivity coefficient.

5. The control device according to claim 3, wherein
the correction value circuitry is further configured to calculate, based on at least four pieces of the error measurement data being obtained at conditions in which the program control circuitry outputs the command values being different from each other, the phase correction value, an azimuth angle sensitivity coefficient, and an elevation angle sensitivity coefficient, the azimuth angle sensitivity coefficient being a sensitivity coefficient in an azimuth angle direction and the elevation angle sensitivity coefficient being a sensitivity coefficient in an elevation angle direction, and
the tracking control circuitry is further configured to output, to the antenna drive control circuitry, as the command value, a value obtained by adding (i) the arrival direction error corrected based on the azimuth angle sensitivity coefficient and the elevation angle sensitivity coefficient to (ii) the orientation direction actual measurement value.

6. The control device according to claim 5, wherein the correction value circuitry is further configured to correct either one of the actual measurement value error and the arrival direction error, based on each of the phase correction value, the azimuth angle sensitivity coefficient, and the elevation angle sensitivity coefficient, and to calculate the phase correction value, the azimuth angle sensitivity coefficient, and the elevation angle sensitivity coefficient such that a sum of squares of post-correction residuals for the at least four pieces of the error measurement data is minimized, the post-correction residual being a difference between (i) a post-correction actual measurement value error and (ii) a post-correction arrival direction error, the post-correction actual measurement value error and the post-correction arrival direction error being the actual measurement value error and the arrival direction error obtained by correcting either one of the actual measurement value error and the arrival direction error, based on each of the phase correction value, the azimuth angle sensitivity coefficient, and the elevation angle sensitivity coefficient.

7. The control device according to claim 5, wherein
the correction value circuitry is further configured to calculate the phase correction value, an orthogonality expressing a difference between (i) an angle between two axes where quadrature detection is performed on the sum signal and the difference signal and (ii) a 90 degree angle, the azimuth angle sensitivity coefficient, and the elevation angle sensitivity coefficient, and
the tracking control circuitry is further configured to output, to the antenna drive control circuitry, as the command value, a value obtained by adding (i) the arrival direction error corrected based on the phase correction value, the orthogonality, the azimuth angle sensitivity coefficient, and the elevation angle sensitivity coefficient to (ii) the orientation direction actual measurement value.

8. The control device according to claim 7, wherein the correction value circuitry is further configured to calculate the phase correction value, the orthogonality, the azimuth angle sensitivity coefficient, and the elevation angle sensitivity coefficient such that a sum of squares of post-correction residuals for the at least four pieces of the error measurement data is minimized, the post-correction residual being a difference between (i) a post-correction actual measurement value error and (ii) a post-correction arrival direction error, the post-correction actual measurement value error and the post-correction arrival direction error being the actual measurement value error and the arrival direction error obtained by correcting either one of the actual measurement value error and the arrival direction error, based on each of the phase correction value, the orthogonality, the azimuth angle sensitivity coefficient, and the elevation angle sensitivity coefficient.

9. The control device according to claim 3, wherein
the correction value circuitry is further configured to calculate, based on at least four pieces of the error measurement data being obtained at conditions in which the program control circuitry is further configured to output the command values being different from each other, the phase correction value, an orthogonality expressing a difference between (i) an angle between two axes where quadrature detection is performed on the sum signal and the difference signal and (ii) a 90 degree angle, and the sensitivity coefficient, and
the tracking control circuitry outputs, to the antenna drive control circuitry, as the command value, a value obtained by adding (i) the arrival direction error corrected based on the phase correction value, the orthogonality, and the sensitivity coefficient to (ii) the orientation direction actual measurement value.

10. The control device according to claim 9, wherein the correction value circuitry is further configured to calculate the phase correction value, the orthogonality, and the sensitivity coefficient such that a sum of squares of post-correction residuals for the at least four pieces of the error measurement data is minimized, the post-correction residual being a difference between (i) a post-correction actual measurement value error and (ii) a post-correction arrival direction error, the post-correction actual measurement value error and the post-correction arrival direction error being the actual measurement value error and the arrival direction error obtained by correcting either one of the actual measurement value error and the arrival direction error, based on each of the phase correction value, the orthogonality, and the sensitivity coefficient.

11. The control device according to claim 3, further comprising:
sensitivity shift detection circuitry configured to detect a sensitivity shift when sensitivity coefficients calculated while the tracking control circuitry is in operation are within a range having a predetermined width, the range not including a value one; and
sensitivity coefficient circuitry configured to update the sensitivity coefficient when the sensitivity shift detection circuitry detects the sensitivity shift.

12. The control device according to claim 1, wherein
the correction value circuitry is further configured to calculate, based on at least four pieces of the error measurement data being obtained at conditions in which the program control circuitry outputs the command values being different from each other, the phase correction value and an orthogonality expressing a difference between (i) an angle between two axes where quadrature detection is performed on the sum signal and the difference signal and (ii) a 90 degree angle, and
the tracking control circuitry is further configured to output, to the antenna drive control circuitry, as the command value, a value obtained by adding (i) the arrival direction error corrected based on the phase correction value and the orthogonality to (ii) the orientation direction actual measurement value.

13. The control device according to claim 12, wherein the correction value circuitry is further configured to correct either one of the actual measurement value error and the arrival direction error, based on each of the phase correction value, and the orthogonality, and to calculate the phase correction value and the orthogonality such that a sum of squares of post-correction residuals for the at least four pieces of the error measurement data is minimized, the post-correction residual being a difference between (i) a post-correction actual measurement value error and (ii) a post-correction arrival direction error, the post-correction actual measurement value error and the post-correction arrival direction error being an actual measurement value error and the arrival direction error obtained by correcting either one of the actual measurement value error and the arrival direction error, based on each of the phase correction value and the orthogonality, the actual measurement value error being a difference between the arrival direction and the orientation direction actual measurement value.

14. The control device according to claim 1, wherein
the program control circuitry is further configured to generate the command value within a range in which an angle difference with a prediction direction is less than or equal to a predetermined maximum angle difference, the prediction direction being the orientation direction predicted based on the orbit prediction value, the maximum angle difference being determined based on a drop in a signal intensity.

15. The control device according to claim 14, wherein the program control circuit is further configured to generate the command value forming a circle on a celestial sphere having a center located at the prediction direction.

16. The control device according to claim 1, further comprising:
phase shift detection circuitry configured to determine that a phase shift is occurring when phase correction values calculated while the tracking control circuitry is in operation are within a range having a predetermined width, the range not including zero degrees; and
phase correction circuitry configured to update the phase correction value when the phase shift detection circuitry detects the phase shift.

17. The control device according to claim 1, further comprising:
data count number circuitry configured to determine a count number of the error measurement data used by the correction value circuitry, to be monotonically non-decreasing with respect to decreases in a signal intensity or a signal-to-noise ratio of the difference signal when the signal intensity or the signal-to-noise ratio of the difference signal is below a threshold, the threshold being determined such that correction parameters including the phase correction value is calculated at a calculation accuracy being greater than or equal to a predetermined accuracy based on error measurement data generated by the error measurement data generation circuitry, wherein
the data count number circuitry determines the count number such that the correction value circuitry calculates the correction parameters at the calculation accuracy being greater than or equal to the predetermined accuracy.

18. The control device according to claim 1, further comprising:
change reference angle circuitry configured to determine a change reference angle used as a reference for changing the command value by the change scenario such that a signal sensitivity or a signal-to-noise ratio of the difference signal is greater than or equal to a lower limit value, the lower limit value being determined such that correction parameters including the phase correction value is calculated at a calculation accuracy being greater than or equal to a predetermined accuracy based on error measurement data generated by the error measurement data generation circuitry.

19. A control device, comprising:

antenna drive control circuitry configured to receive an inputted command value of an orientation direction and to control an antenna driver to change the orientation direction, the orientation direction being a direction in which an antenna configured to receive radio waves from a communication counterpart to generate reception signals is oriented, such that a difference between the command value and the orientation direction approaches zero;

program control circuitry configured to generate the command value being changed in accordance with a predetermined change scenario, the change scenario indicating a time transition of an amount by which the orientation direction is changed, and to output the generated command value to the antenna drive control circuitry;

error measurement data generation circuitry configured to generate error measurement data including (i) an arrival direction error obtained from a sum signal and a difference signal of the reception signals, the arrival direction error representing a difference between the orientation direction and an arrival direction being a direction from which the radio waves come and arrive and (ii) an orientation direction actual measurement value being an actual measurement value of the orientation direction when the reception signals used to obtain the arrival direction error are received;

correction value circuitry to calculate, based on at least three pieces of the error measurement data being obtained at conditions in which the program control circuitry outputs the command values being different from each other, a phase correction value being an angle by which the arrival direction error is rotated; and tracking control circuitry to output, to the antenna drive control circuitry, as the command value, a value obtained by adding (i) the arrival direction error corrected based on the phase correction value to (ii) the orientation direction actual measurement value, wherein the program control circuitry is further configured to (i) communicate temporarily with, as the communication counterpart, a test radio wave source installed on the ground at a predetermined position with respect to the antenna and emitting radio waves, and (ii) to generate the command value within a range in which an angle difference with a direction being from the antenna toward the test radio wave source is less than or equal to a predetermined maximum angle difference, the maximum angle difference being determined based on a drop in a signal intensity.

20. The control device according to claim 14, wherein the program control circuitry is further configured to generate the command value being changed in accordance with the change scenario in which the command value is stationary for a predetermined time at celestial sphere points including at least two celestial sphere points each having a predetermined angle difference from a reference direction being the direction toward the test radio wave source in each of a first direction and in a second direction that are mutually orthogonal on a celestial sphere, the error measurement data generation circuitry is further configured to generate the error measurement data by at least four celestial sphere points where the command value is stationary, and the correction value circuitry is further configured to calculate the phase correction value using an equation for the error measurement data measured at the celestial sphere points in the first direction and an equation for the error measurement data measured at the celestial sphere points in the second direction.

* * * * *